US012159519B2

(12) United States Patent
Baker et al.

(10) Patent No.: US 12,159,519 B2
(45) Date of Patent: Dec. 3, 2024

(54) MERCHANDISE DISPLAY SECURITY SYSTEMS AND METHODS

(71) Applicant: InVue Security Products Inc., Charlotte, NC (US)

(72) Inventors: Kyle Baker, Waxhaw, NC (US); Gary A. Taylor, Fort Mill, SC (US); Steven R. Bohon, Charlotte, NC (US); Jeffrey A. Grant, Charlotte, NC (US); Christopher J. Fawcett, Charlotte, NC (US); James Richard Terrell, II, Charlotte, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 17/838,791

(22) Filed: Jun. 13, 2022

(65) Prior Publication Data

US 2022/0309886 A1 Sep. 29, 2022

Related U.S. Application Data

(63) Continuation of application No. 17/261,757, filed as application No. PCT/US2020/031850 on May 7, 2020, now Pat. No. 11,361,635.

(Continued)

(51) Int. Cl.
*G08B 13/14* (2006.01)
*G08B 13/24* (2006.01)
(Continued)

(52) U.S. Cl.
CPC ..... *G08B 13/1427* (2013.01); *G08B 13/1445* (2013.01); *G08B 13/149* (2013.01);
(Continued)

(58) Field of Classification Search
CPC ........... G08B 13/1427; G08B 13/1445; G08B 13/149; G08B 13/2428; G08B 25/008; G08B 25/10
See application file for complete search history.

(56) References Cited

U.S. PATENT DOCUMENTS 6,392,547 B1 5/2002 Stewart et al.
6,577,239 B2 6/2003 Jespersen
(Continued)

FOREIGN PATENT DOCUMENTS

EP 2008255 B1 7/2011
EP 3138701 B1 12/2018
(Continued)

OTHER PUBLICATIONS

International Search Report and Written Opinion from corresponding International Application No. PCT/US2020/031850, dated Aug. 28, 2020 (13 pages).

(Continued)

*Primary Examiner* — John A Tweel, Jr.
(74) *Attorney, Agent, or Firm* — InVue Security Products Inc.

(57) ABSTRACT

Merchandise security systems and methods are provided. In one example, a merchandise security system includes a plurality of security devices arranged in a wireless network, wherein the plurality of security devices are arranged in a planogram and each configured to protect one or more items from theft, each of the plurality of security devices configured to wirelessly communicate data with a remote device. The system also includes a plurality of electronic keys arranged in the wireless network and configured to wirelessly communicate data with the plurality of security devices and/or the remote device. Each of the plurality of electronic keys is configured to operate the plurality of security devices. The system also includes a gateway con- (Continued)

figured to receive the data from the plurality of security devices and electronic keys via wireless communication, wherein the gateway is configured to communicate the data to the remote computing device.

32 Claims, 61 Drawing Sheets

Related U.S. Application Data

(60) Provisional application No. 62/909,506, filed on Oct. 2, 2019, provisional application No. 62/861,625, filed on Jun. 14, 2019, provisional application No. 62/855,433, filed on May 31, 2019, provisional application No. 62/854,160, filed on May 29, 2019, provisional application No. 62/844,551, filed on May 7, 2019.

(51) Int. Cl.
*G08B 25/00* (2006.01)
*G08B 25/10* (2006.01)

(52) U.S. Cl.
CPC ....... *G08B 13/2428* (2013.01); *G08B 25/008* (2013.01); *G08B 25/10* (2013.01)

(56) References Cited

U.S. PATENT DOCUMENTS

| | | | | |
|---|---|---|---|---|
| 6,724,316 | B2 | 4/2004 | Addy et al. | |
| 6,868,493 | B2 * | 3/2005 | Orlando | H04L 12/66 340/506 |
| 7,148,803 | B2 * | 12/2006 | Bandy | G01N 33/0075 340/505 |
| 7,474,215 | B2 | 1/2009 | Scott et al. | |
| 7,535,337 | B2 | 5/2009 | Overhultz et al. | |
| 7,538,680 | B2 | 5/2009 | Scott et al. | |
| 7,651,267 | B2 | 1/2010 | Gonzales et al. | |
| 7,737,844 | B2 | 6/2010 | Scott et al. | |
| 7,737,846 | B2 | 6/2010 | Belden, Jr. et al. | |
| 7,746,227 | B2 | 6/2010 | Keays | |
| 7,804,403 | B2 * | 9/2010 | Chantelou | G08B 25/10 340/539.1 |
| 7,944,354 | B2 | 5/2011 | Kangas et al. | |
| 8,253,559 | B2 | 8/2012 | Howard et al. | |
| 8,378,826 | B2 | 2/2013 | Mercier et al. | |
| 8,581,726 | B2 | 11/2013 | Piccoli et al. | |
| 8,717,165 | B2 | 5/2014 | Gernandt et al. | |
| 8,878,643 | B2 | 11/2014 | Grant et al. | |
| 8,878,673 | B2 | 11/2014 | Grant et al. | |
| 9,171,433 | B1 | 10/2015 | Kliegman et al. | |
| 9,245,432 | B2 | 1/2016 | Yang | |
| 9,298,954 | B1 | 3/2016 | Ewing | |
| 9,437,088 | B2 | 9/2016 | Phillips et al. | |
| 9,552,708 | B2 | 1/2017 | Grant et al. | |
| 9,728,054 | B2 | 8/2017 | Grant et al. | |
| 9,852,596 | B2 | 12/2017 | Alexis | |
| 9,892,604 | B2 * | 2/2018 | Blaser | G06F 21/34 |
| 9,898,907 | B1 | 2/2018 | Xin | |
| 9,928,703 | B2 | 3/2018 | Grant et al. | |
| 9,959,432 | B2 | 5/2018 | Blaser et al. | |
| 10,002,505 | B1 | 6/2018 | Grant et al. | |
| 10,157,522 | B2 | 12/2018 | Blaser et al. | |
| 10,210,681 | B1 | 2/2019 | Grant et al. | |
| 10,258,172 | B2 | 4/2019 | Grant et al. | |
| 10,290,031 | B2 | 5/2019 | Reid | |
| 10,362,439 | B2 | 7/2019 | Kao | |
| 10,475,307 | B2 | 11/2019 | Grant et al. | |
| 10,482,734 | B2 | 11/2019 | Phillips et al. | |
| 10,482,739 | B2 | 11/2019 | Grant et al. | |
| 2008/0100457 | A1 | 5/2008 | Gray | |
| 2012/0047972 | A1 | 3/2012 | Grant et al. | |
| 2014/0118145 | A1 | 5/2014 | Wawrzyniak et al. | |
| 2015/0097559 | A1 | 4/2015 | Baker | |
| 2015/0287304 | A1 | 10/2015 | Valiulis | |
| 2016/0335859 | A1 | 11/2016 | Sankey | |
| 2017/0162013 | A1 | 6/2017 | Jao | |
| 2018/0233012 | A1 | 8/2018 | Dey et al. | |
| 2018/0365948 | A1 | 12/2018 | Grant et al. | |
| 2019/0057563 | A1 | 2/2019 | Grant et al. | |
| 2019/0118845 | A1 | 4/2019 | Hannah et al. | |
| 2020/0051410 | A1 | 2/2020 | Grant et al. | |
| 2020/0074826 | A1 | 3/2020 | Grant et al. | |
| 2020/0082686 | A1 | 3/2020 | Phillips et al. | |
| 2020/0312107 | A1 | 10/2020 | Grant et al. | |
| 2021/0264754 | A1 | 8/2021 | Baker et al. | |

FOREIGN PATENT DOCUMENTS

| | | | |
|---|---|---|---|
| EP | 3039624 | B1 | 7/2019 |
| WO | 2007020071 | A1 | 2/2007 |
| WO | 2007025267 | A2 | 3/2007 |
| WO | 2010127293 | A1 | 11/2010 |
| WO | 2012159102 | A1 | 11/2012 |
| WO | 2015048120 | A1 | 4/2015 |
| WO | 2016210069 | A1 | 12/2016 |
| WO | 2017192443 | A1 | 11/2017 |

OTHER PUBLICATIONS

InVue Security Products Inc., “Systems and Methods for Protecting Retail Display Merchandise From Theft”, Technical Disclosure Commons, dated Dec. 27, 2017, retrieved from <https://www.tdcommons.org/invue/22>, (33 pages).

* cited by examiner

MERCHANDISE DISPLAY SECURITY SYSTEMS AND METHODS

CROSS REFERENCE TO RELATED APPLICATIONS

This application is a continuation of and claims the benefit of priority to U.S. application Ser. No. 17/261,757, filed on Jan. 20, 2021, which is a 371 U.S. national phase entry of International Application No. PCT/US2020/031850, filed on May 7, 2020, which is a non-provisional of and claims the benefit of priority to U.S. Provisional Application No. 62/844,551, filed on May 7, 2019, U.S. Provisional Application No. 62/854,160, filed on May 29, 2019, U.S. Provisional Application No. 62/855,433, filed on May 31, 2019, U.S. Provisional Application No. 62/861,625, filed on Jun. 14, 2019, and U.S. Provisional. No. 62/909,506, filed on Oct. 2, 2019, the entire disclosures of which are incorporated herein by reference.

FIELD OF THE INVENTION

The present invention relates generally to merchandise display security systems, devices, computer program products, and methods for protecting items of merchandise from theft and/or the exchange of various types of information in a wireless network.

BACKGROUND OF THE INVENTION

It is common practice for retailers to display relatively small, relatively expensive items of merchandise on a security device, such as a display hook or a display fixture, within security packaging commonly referred to as a "safer", or otherwise on a display surface. The security device or safer displays an item of merchandise so that a potential purchaser may examine the item when deciding whether to purchase the item. The small size and relative expense of the item, however, makes the item an attractive target for shoplifters. A shoplifter may attempt to detach the item from the security device, or alternatively, may attempt to remove the security device from the display area along with the merchandise. Items of merchandise may also be secured using a display stand to allow users to sample the item for potential purchase. In some instances, the security device is secured to a display support using a lock operated by a key, for example, a mechanical lock. In other instances, the security device is secured to the display support using a lock operated by an electronic key to arm and disarm the security device.

BRIEF SUMMARY

Various embodiments of merchandise security systems, devices, and methods are provided. In one example, a merchandise security system includes a plurality of security devices arranged in a wireless network, wherein the plurality of security devices are arranged in a planogram and each configured to protect one or more items from theft, each of the plurality of security devices configured to wirelessly communicate data with a remote device. The system also includes a plurality of electronic keys arranged in the wireless network and configured to wirelessly communicate data with the plurality of security devices and/or the remote device. Each of the plurality of electronic keys is configured to operate the plurality of security devices. The system also includes a gateway configured to receive the data from the plurality of security devices and electronic keys via wireless communication, wherein the gateway is configured to communicate the data to the remote computing device.

In another embodiment, a method for protecting items from theft is provided. The method includes a plurality of security devices wirelessly communicating in a wireless network, wherein the plurality of security devices are arranged in a planogram and each configured to protect one or more items from theft. The method also includes a plurality of electronic keys wirelessly communicating in the network with each of the plurality of security devices and electronic keys wirelessly communicating data. The method further includes a hub wirelessly receiving the data and information regarding the planogram, and the hub wirelessly communicating the data and the information regarding the planogram to a remote computing device.

In one example, a merchandise security system includes a plurality of security devices each configured to protect one or more items from theft. One or more of the plurality of security devices includes a tag containing data regarding an identification of the security device. The security system also includes a plurality of electronic keys configured to wirelessly communicate with the plurality of security devices for operating the plurality of security devices, wherein each of the plurality of electronic keys is configured to obtain the data from each of the plurality of security devices. The security system further includes a remote computing device configured to receive the data from the plurality of electronic keys via wireless communication and to assign a plurality of tags to each of the plurality of electronic keys for operating the plurality of security devices.

In another embodiment, a method for protecting items from theft is provided. The method includes a plurality of security devices each configured to protect one or more items from theft, one or more of the plurality of security devices comprising a tag containing data regarding an identification of the security device. The method also includes a plurality of electronic keys wirelessly communicating with the plurality of security devices for operating the plurality of security devices and for obtaining the data from each of the plurality of security devices. The method further includes a remote computing device wirelessly receiving the data from the plurality of electronic keys and assigning a plurality of tags to each of the plurality of electronic keys for operating the plurality of security devices.

Inventory sensors, systems, and methods for items of merchandise are provided. In one example, an inventory detector system includes at least one sensor configured to transmit a wireless signal for detecting the presence of one or more items of merchandise on a retail fixture. The inventory detector system also includes a monitoring device configured to wirelessly communicate with the sensor for determining that no items of merchandise are present on the retail fixture.

Security systems and methods for protecting retail display merchandise from theft are provided. For example, a security system includes a sensor configured to be attached to an item of merchandise, and a monitoring component configured to wirelessly communicate with the sensor, wherein the monitoring component and the sensor are configured to communicate with one another to determine a proximity of the item of merchandise relative to the monitoring component, and wherein the monitoring component and/or the sensor is configured to initiate a security signal based on the proximity.

In another embodiment, a method for securing an item of merchandise from theft is provided. The method includes communicating between a monitoring component and a sensor, the sensor attached to an item of merchandise, wherein the monitoring component and the sensor are configured to communicate with one another using a respective magnetic emitter and/or magnetic receiver. The method also includes initiating a first security signal at the monitoring component and/or sensor based on a proximity between the monitoring component and the sensor.

In another embodiment, a security system configured for securing an item of merchandise from theft is provided. The security system includes a sensor configured to be attached to an item of merchandise, the sensor comprising a magnetic emitter and/or a magnetic receiver. The security system also includes a monitoring component comprising a magnetic emitter and/or a magnetic receiver for communicating with the sensor, wherein the monitoring component and the sensor are configured to communicate with one another using the respective magnetic emitter and/or magnetic receiver to determine whether to initiate a security signal.

DETAILED DESCRIPTION OF EMBODIMENTS OF THE INVENTION

The following disclosure includes various embodiments of systems, devices, methods, and computer program products. Some embodiments disclosed are configured for use in a wireless network, for wireless inventory control, and/or for wirelessly tracking items within an environment. It should be understood that any combination of embodiments disclosed herein have been envisioned. Thus, discussion of one particular embodiment is not intended to be made at the exclusion of any other embodiments.

Referring now to the following FIGS. 1-42, one or more embodiments of a merchandise display security system are shown. In the embodiments shown and described herein, the system includes an electronic key and a merchandise security device. Merchandise security devices suitable for use with the electronic keys include, but are not limited to, a security display (e.g. alarming stand or device), security fixture (e.g. locking hook, shelf, cabinet, etc.), cabinet locks, door locks, cable wraps, cable locks, or security packaging (e.g. merchandise keeper) for an item of merchandise. However, an electronic key (also referred to herein as a programmable key or generally as a key) may be useable with any security device or locking device that utilizes power transferred from the key to operate a mechanical and/or electronic lock mechanism and/or utilizes data transferred from the key to authorize the operation of a lock mechanism and/or arming or disarming an alarm circuit. In other words, an electronic key is useable with any security device or locking device that requires power transferred from the key to the device and/or data transferred from the key to the device. Further examples of security devices and locking devices include, but are not limited to, a door lock, a drawer lock or a shelf lock, as well as any device that prevents an unauthorized person from accessing, removing or detaching an item from a secure location or position. Although the following discussion relates to a system for use in a retail store, it is understood that the system is also suitable for other industries, such as hospital, restaurants, etc. In some embodiments, the merchandise security systems, merchandise security devices, and electronic keys are similar to those disclosed in U.S. Publication No. 2012/0047972, entitled Electronic Key for Merchandise Security Device, U.S. Pat. No. 10,258,172, entitled Systems and Methods for Acquiring Data from Articles of Merchandise on Display, U.S. Pat. No. 10,210,681, entitled Merchandise Display Security Systems and Methods, U.S. Publ. No. 2018/0365948, entitled Tethered Security System with Wireless Communication, and U.S. Publication No. 2016/0335859, entitled Systems and Methods for Remotely Controlling Security Devices, the entire disclosures of which are incorporated herein by reference in their entirety.

Figure 1:
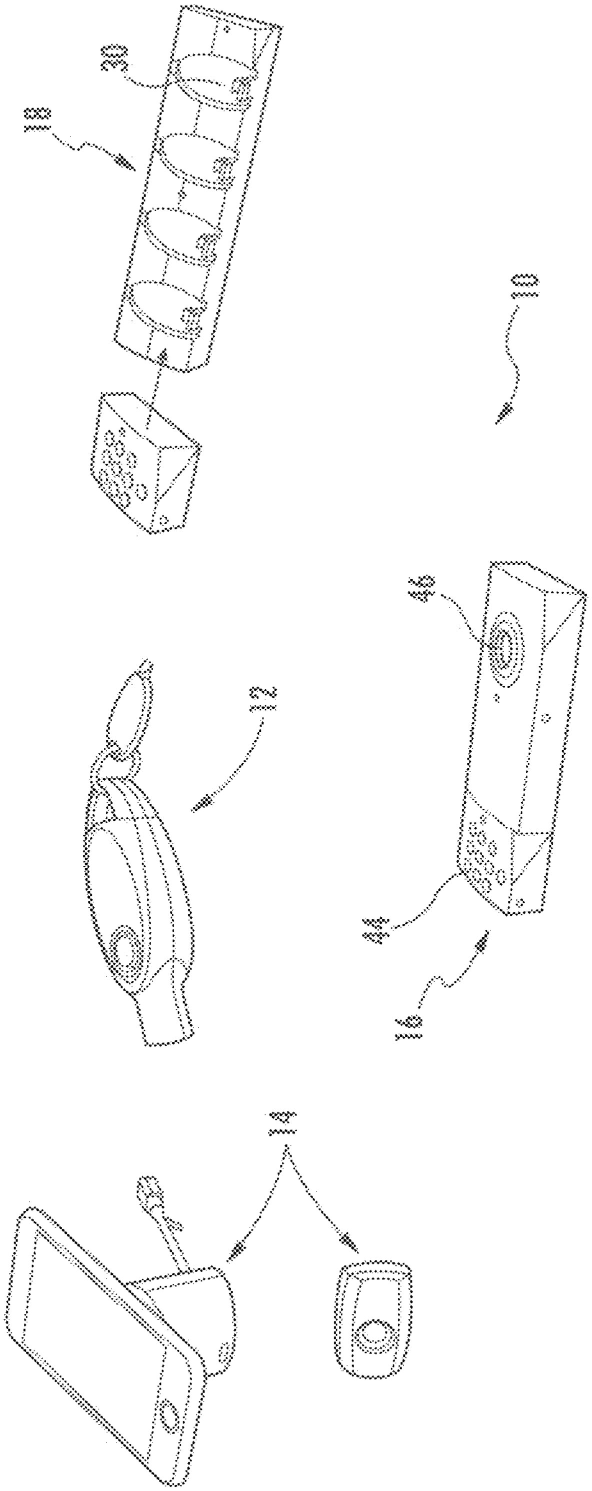
FIG. 1 illustrates a merchandise security system according to one embodiment of the present invention.
Figure 2:
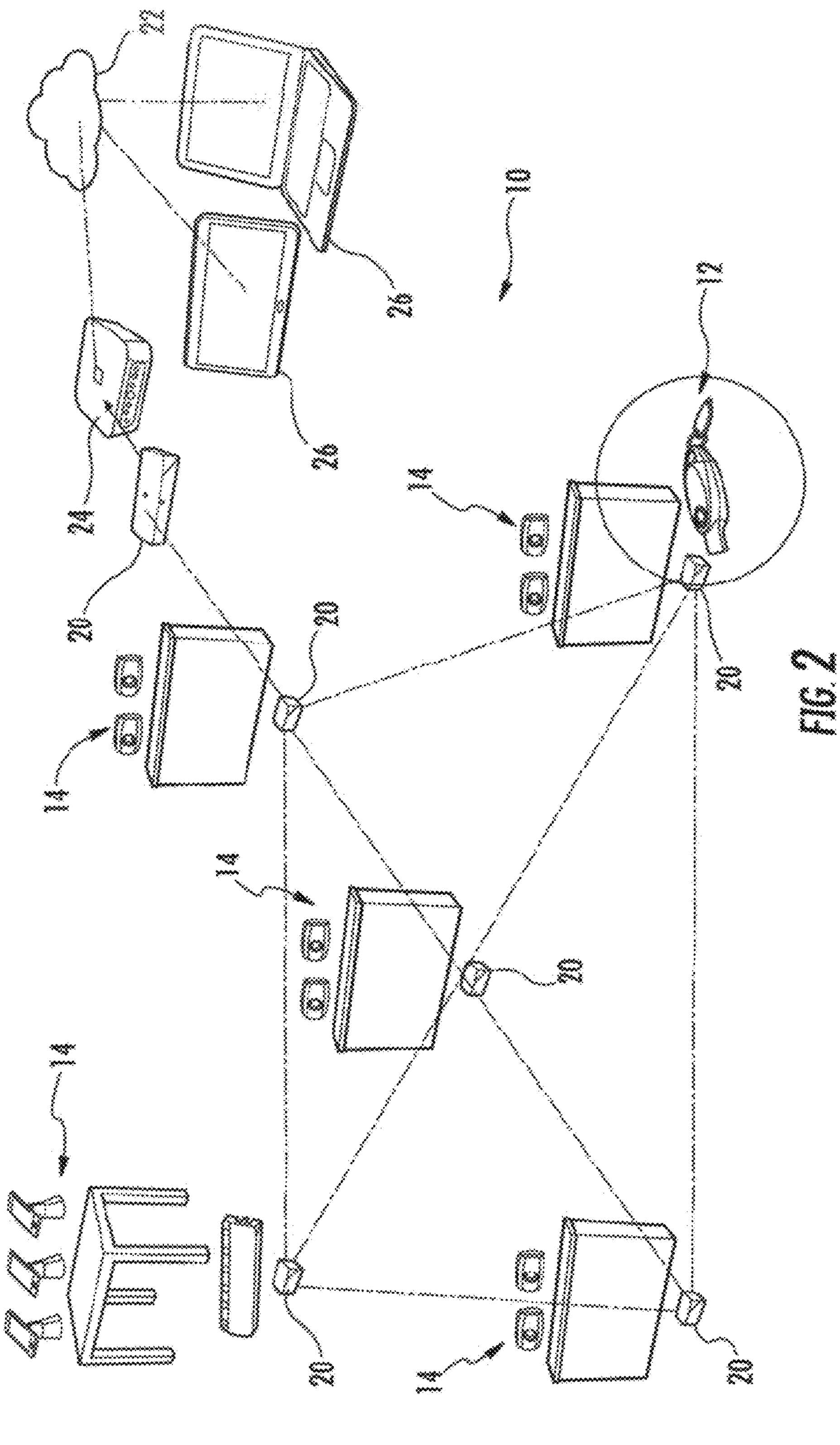
FIG. 2 illustrates a merchandise security system according to another embodiment of the present invention.

FIG. 1 illustrates one embodiment of a system 10. In this embodiment, the system generally includes an electronic key 12, one or more merchandise security devices 14, a programming or authorization station 16, and a charging station 18. FIG. 2 shows an embodiment of a system 10 that is part of a network of merchandise security devices. According to some embodiments, the network enables communication between a plurality of electronic keys and merchandise security devices. The network may be cloud-based and include a cloud 22 for receiving data from, and/or providing data to, the electronic keys and/or merchandise security devices. The cloud 22 may facilitate data transfer to one or more remote locations or devices 26 (e.g., a tablet or computer) where the data may be reviewed and analyzed. The remote devices 26 may be located at any desired location, such as in the same retail store as the security devices 14 and/or electronic keys 12. In some cases, the remote device 26 may belong to a retail store associate or a backend computer used by a retailer or corporation. The network may be a wireless network including a plurality of nodes 20 that are configured to communicate with one another, one or more electronic keys 12, and/or one or more merchandise security devices 14. The network may be any suitable network for facilitating wireless communication such as, for example, a mesh, star, multiple star, repeaters, IoT, etc. networks. The nodes 20 and/or security devices 14 may be located within one or more zones. In some cases, the nodes and the security devices may be integrated with one another such that the security device operates as a node. A gateway 24 or hub or "host" may be employed to allow for communication between the one or more nodes 20 and the cloud 22. In some embodiments, all communication within the network is wireless, such as via radio-frequency signals (e.g., Sub GHz ISM band or 2.4 GHz), Bluetooth, LoRa, and Wi-Fi, although other types of wireless communication may be possible.

Figure 3:
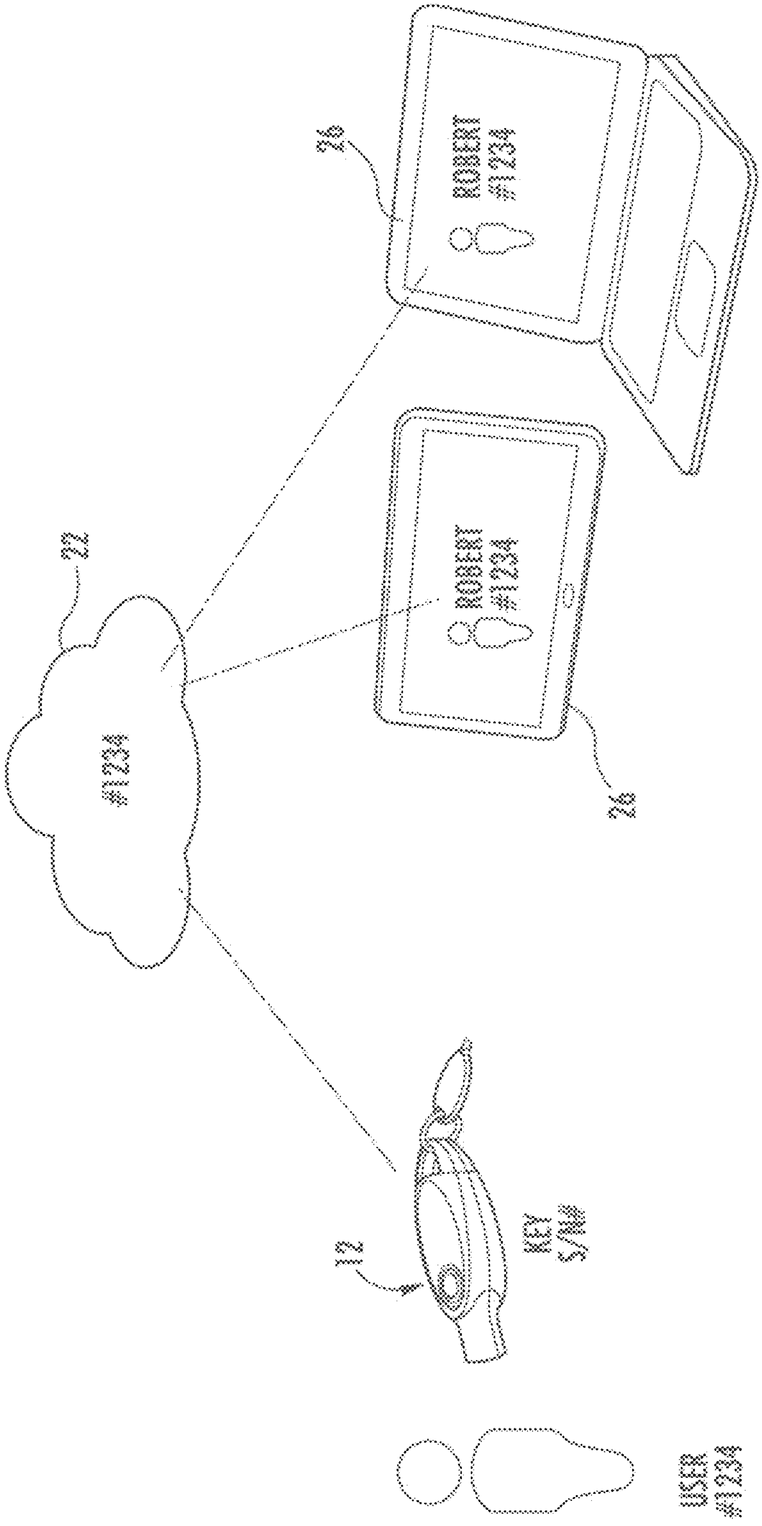
FIG. 3 illustrates a key in communication with a remote device via a cloud according to one embodiment.

In some embodiments, each merchandise security device 14 and/or electronic key 12 is configured to store various types of data. For example, each merchandise security device 14 and/or key 12 may store a serial number of one or more merchandise security devices 14, a serial number of one or more items of merchandise, the data and time of activation of the key, a user of the key, a serial number of the key, a location of the security device, a location of the item of merchandise, a department number within a retail store, number of key activations, a type of activation (e.g., "naked" activation, activation transferring only data, activation transferring power, activation transferring data and power), and/or various events (e.g., a merchandise security device has been locked, unlocked, armed, or disarmed). For instance, FIG. 3 shows that the identity of a user of an electronic key 12 may be communicated to a remote location or device 26. This information may be transmitted to the remote location or device 26 upon each activation of the key 12 or at any other desired period of time, such as upon communication with a programming or authorization station 16. Thus, the data transfer from the electronic key 12 and/or security device 14 may occur in real time or automatically in some embodiments. In some cases, the electronic key 12, security device 14, and/or programming station 16 may be configured to store the data and transfer the data to a remote location or device 26. Authorized personnel may use this data to take various actions using the remote device, such as to audit and monitor associate activity, authorize or deauthorize particular keys 12, determine the battery life of a key 12, audit merchandise security devices 14 (e.g., ensure the security devices are locked or armed), arm or disarm the security device, lock or unlock the security device, lock or unlock a sensor 25 attached to an item of merchandise to a base or stand 35 removably supporting the sensor, etc. (see, e.g., FIG. 30). Moreover, such information may be requested and obtained on demand using the remote device, such as from the electronic keys 12, security devices 14, and/or the programming station 16.

In some cases, the data may include battery analytics of an electronic key 12. For example, the battery analytics may include monitoring the battery voltage of an electronic key 12 when the key is placed on a charging station 18 and the time taken to reach full charge. These values may be used to determine depth of discharge. The battery analytics may be indicative of a battery that is nearing its end of life. A retailer or other authorized personnel may take various actions using this information, such as replacing the key or disabling the key to prevent battery swelling and housing failure.

In one embodiment, the electronic key 12 is configured to obtain data from a merchandise security device 14 (e.g., a security fixture). For example, the merchandise security device 14 may store various data regarding past communication with a previous electronic key 12 (e.g., key identification, time of communication, etc.), and when a subsequent electronic key communicates with the same merchandise security device, the data is transferred to the electronic key. Thus, the merchandise security device 14 may include a memory for storing such data. In some cases, the merchandise security device 14 includes a power source for receiving and storing the data, while in other cases, the power provided by the electronic key 12 is used for allowing the merchandise security device to store the data. The electronic key 12 may then communicate the data for collection and review, such as at a remote location or device 26. In some instances, communication between the electronic key 12 and the programming or authorization station 16 may allow data to be pulled from the electronic key and communicated, such as to a remote location or device 26. In other cases, the electronic key 12 may be configured to obtain data from merchandise security devices 14 (e.g., a security display), such as an identification of the merchandise security device, the type of item of merchandise on display, an identification of the item of merchandise, and/or the system health of the security device and/or the item of merchandise. The electronic key 12 may store the data and provide the data to a remote location or device 26 directly or upon communication with the programming or authorization station 16. As such, the electronic keys 12 may be a useful resource for obtaining various types of data from the merchandise security devices 14 without the need for wired connections or complex wireless networks or systems.

In one embodiment, the security device 14 may communicate its identifier using various techniques. For example, in some cases the security device 14 may have a memory configured to store a serial number and is able to communicate that serial number to the electronic key 12 using bi-directional communication. In instances where the security device 14 may not have a memory, power source, and/or the ability for bi-directional communication (e.g., a cable wrap or locking hook), the security device may have an RFID tag, an NFC tag, or the like that stores an identifier for the security device (e.g., a serial number). Such security devices may be similar to that disclosed in U.S. Pat. No. 9,133,649, entitled Merchandise Security Devices for Use with an Electronic Key, the entire disclosure of which is incorporated herein by reference in their entirety. In some examples, the tag may be attachable (e.g., via adhesive) to existing security devices 14 such that it is readily adaptable to current devices, or the tag may be integrated within the security device. The electronic key 12 may be configured to deliver power to the tag to read the identifier of the tag, such as for a passive tag, although the tags may be passive or active. The electronic key 12 may store a number of authorized identifiers in memory (e.g., via a look-up table) and may then determine if the read identifier is in its memory. Alternately, the electronic key 12 may be configured to wirelessly connect to a network device 26 with a look-up table. Either the electronic key 12 itself or the network device 26 can then determine if the particular key or user of that key is authorized to unlock the security device 14 with the read identifier. The identifier may be unique to the security device 14 or may be a more generic identifier, such as for example, a "6-sided box" or a department such as "healthcare" or all of the above. Once authorization has been obtained, only then will the electronic key be capable of delivering power to the security device 14 to successfully operate the lock and unlock it. If there is no authorization, the electronic key 12 does not continue this cycle, and the lock never unlocks. Thus, embodiments of the present invention may be configured to communicate with any type of security device 14 for performing various auditing, zone control, and planogram analysis based on identification of the security device.

In one embodiment, the electronic key 12 and security device 14 may communicate with one another via NFC to transmit data when the key and security device are positioned near one another or in direct contact with one another. An NFC tag may include various components, such as an antenna or a coil and one or more chips that define an electrical circuit. The antenna may be used for effectuating communication with an electronic key 12, which may be activated via a magnetic field. For example, a magnetic field may be generated by the electronic key 12 to communicate with an NFC tag.

In some embodiments where the electronic key 12 is configured to transfer power inductively, as explained in further detail below, and is equipped to communicate using NFC or RFID, the inductive coil of the key may be configured to use the same coil for both data transfer and power transfer. In some cases, the electronic key 12 is configured to switch the coil between an energy transfer mode and an NFC or RFID receiver circuit. In other examples, a plurality of security devices 14 may be "nested" with one another such that authorization to one of the nested security devices results in all security devices being disarmed or unlocked. For instance, a plurality of locks could be paired to one another such that successful communication between any one of the locks and the electronic key 12 results in all of the locks being unlocked.

In some embodiments, the merchandise security devices 14 include wireless functionality for communicating within the network. For example, the merchandise security devices may communicate wirelessly with each other, items of merchandise, electronic keys 12, remote devices, and/or nodes, including but not limited to communicating the various types of data discussed herein. Thus, in some cases, the remote devices may communicate directly with the security devices 14 and/or electronic keys 12.

One embodiment of such a wireless system includes various types of wireless networks capable of being used in conjunction with embodiments disclosed herein. In some cases, the wireless system includes fully integrated hardware, software, and data analytics which effectively eliminates or makes negligible the added hardware costs of a data integrated solution—all other features remaining constant. In some embodiments, the wireless system is configured to adapt to a changing market where an increasing number of smartphones leverage Qi based inductive charging and exposed data ports no longer exist. For instance, in an embodiment where the security device 14 includes a sensor 25 and a base or stand 35 (see, e.g., FIG. 30), the sensor may utilize Qi technology, such as a Qi coil that is configured to communicate with a corresponding coil in the item of merchandise. In addition, embodiments of the wireless system may be configured to provide a common wireless interface and IP gateway for future networked products leveraging the various wireless networks discussed herein. Various modes of operation can be implemented according to wireless system embodiments. In one example, a non-IP connected mode could be employed whereby a customer choosing not to subscribe to a SaaS service is able to leverage the wireless system's display merchandising and security features independent of a connection to an IP enabled network. Another mode may include an IP-connected mode, which may provide information, e.g., regarding security armed and power status and alarm alerts alarm activity on a local store basis. Additionally, this mode may provide access to other web applications such as product documentation, product videos, product selector guides and support contact information. An additional mode is also an IP-connected network that includes a SaaS subscription service that allows access to the full capabilities of the wireless system, such as the data communication among various devices described herein.

In some embodiments, wireless communication may occur using a proprietary wireless network, for example, each security device 14 may be configured to communicate with a central hub in a star network configuration. Each security device 14 may include a transceiver (e.g., a sub-GHz transceiver) configured to communicate data to and from a common central hub or "host" 24, such as the various types of information and data discussed herein, as well as information about power status and security breaches to the host without the need for a separate data connection to a smart hub or controller. It is understood that any number of nodes 20 could be employed to facilitate communication between the security devices 14 and the host, such one or more local nodes. In one embodiment, each security device 14 is configured to communicate its power and security status, security breaches (alarm notifications), as well as various other identification data for the security device and/or the item of merchandise, to the host 24. In some embodiments, an entire retail store may be serviced by a single host 24 without the need for repeaters and is not practically limited by the number of security devices in the network. In one embodiment, the host 24 may be configured to generate a security signal, such as an audible and/or a visible alarm signal. In some cases, the volume of the security signal is adjustable. When any security device 14 detects a security event, the security device is configured to send a signal to the host 24. The retailer has the option of choosing the level of notification for the security event, for example, a loud audible alarm, a lower volume, audible notification, or no audible alarm notification. Among other features, the system may include the ability to program alarm notifications. For instance, a retailer may choose silent alerts, optical alerts, and adjustable volume and tone audible alerts or combinations of these alerts. Additionally, the host 24 could be configured to indicate a security breach by changing colors (e.g., from gold to red and or by flashing intermittently). The audible and visual alert signals can be used independently or together.

As discussed herein, electronic keys 12 may be incorporated with the various system embodiments. Electronic keys 12 may be configured to disable any alarming security device 14 following a security event. However, the host 24 may be configured to continue to transmit a security signal, such as until the security device 14 is re-armed. Moreover, disabling a security signal on the host 24 may not affect the armed status of the remaining security devices 14 in the store, i.e., the security devices may operate one-to-one in every regard except for generation of security signals. Of course, a variety of types of electronic keys 12 as disclosed herein, including leveraging a secure application available on a smartphone, tablet or PC.

In some embodiments, a pre-emptive disarm for purposes of remerchandising items of merchandise or nightly removal of the item from an associated security device 14 may be employed. For example, a remote device 26 or other device of the retailer may be configured to automatically disarm one or more security devices 14 at a predetermined period of time. In some cases, a secure software application may permit a temporary suspension of alerts for a specific position of a security device 14 for a programmable period to permit re-merchandising. Once disarmed, the security device's transceiver will cease communicating until it is re-armed. For those customers operating in a "Non-IP Connected" mode can elect to silence the audible alarm of the security device 14 when remerchandising such that no audible alarm will sound, but the host may continue to generate a signal (e.g., light signal) until all security devices are re-armed.

As described herein, embodiments of the present invention may utilize a variety of wireless network configurations. In some cases, a common architecture would require two distinct network topologies. The first network may be a private wireless network for the exclusive use of the security devices 14 deployed instore. This network is separate from any private or public network operated by the retailer. The second network may be an IP Gateway between the private network and the Internet. This second network may be a connection on retailer's managed network or could be via a cellular modem. The gateway could be integrated into the host or be a separate device that connects to the host.

In some embodiments, the private network may be commonly used by all security devices 14 for internal data transfer and minimize frequency congestion for retailer managed networks. Moreover, in one example, the private network practically takes the form as a "star network"—with multiple individual nodes 20 performing individual functions and collecting and providing data. This data is wirelessly sent to and aggregated within a common "host". The host allows nodes 20 providing data wirelessly via the private network to deliver functionality and value to the customer independent of an Internet connection to a cloud-based application, such as alerting and reporting functionality. In one implementation, the host rather than the security device 14 would be configured to provide notification (e.g., in response to a security event) via audio, visual, and/or haptic response.

Various considerations may be taken into account regarding the private network. For instance, in selecting the appropriate, common network architecture for the private network, considerations of the size of the data packets and data rate required, the needed wireless range, potential for interference, power consumption, size, and/or cost of the network may be taken into account. In some applications, intermittent transmission of small data packets, with no need for higher data rates, may be used, which may benefit from a network with low power needs and long data range. Examples of private networks include various RF networks, such as Wi-Fi (2.4 GHz), Bluetooth (2.4 GHz) and Sub GHz (less than 1.0 GHz) ISM band networks. Some network stacks (controlling software) such as Zigbee and LoRa can run on both sub GHz and 2.4 GHz networks.

Another example embodiment of a wireless network system includes various types of security devices 14 and electronic keys 12 that may cooperate with one or more nodes 20, hubs 24, and/or remote devices 26 in a wireless network (see, e.g., FIGS. 26-42). Various types of security devices 14 may be employed in the system, such as those disclosed herein. For example, security devices 14 that include a sensor that is configured to be attached to an item (e.g., via adhesive and/or brackets). In some implementations, the sensor may be connected to a base or stand 35 with a tether 45 (see, e.g., FIGS. 30-32), or no tether may be used in some cases (see, e.g., FIGS. 32-33). Sensors 25 may take many different forms, such as, for example, standalone sensors (see, e.g., FIG. 36), "chairback" sensors (see, e.g., FIG. 33), sensors that provide power and security for the item of merchandise (e.g., via USB-C, micro-USB, etc. connectors) (see, e.g., FIG. 35), and/or sensors that only provide security (e.g., a sensor including a plunger switch) (see, e.g., FIG. 34). Similarly, the base 35 used to removably support a sensor 25 may also take different forms (see, e.g., FIG. 33 where a chairback sensor is used with electrical contacts for transferring power between the sensor and the base). Of course, the security devices 14 may be used in various industries such as retail stores and for a variety of items, such as merchandise or commercial items (e.g., tablet computers).

Figure 27:
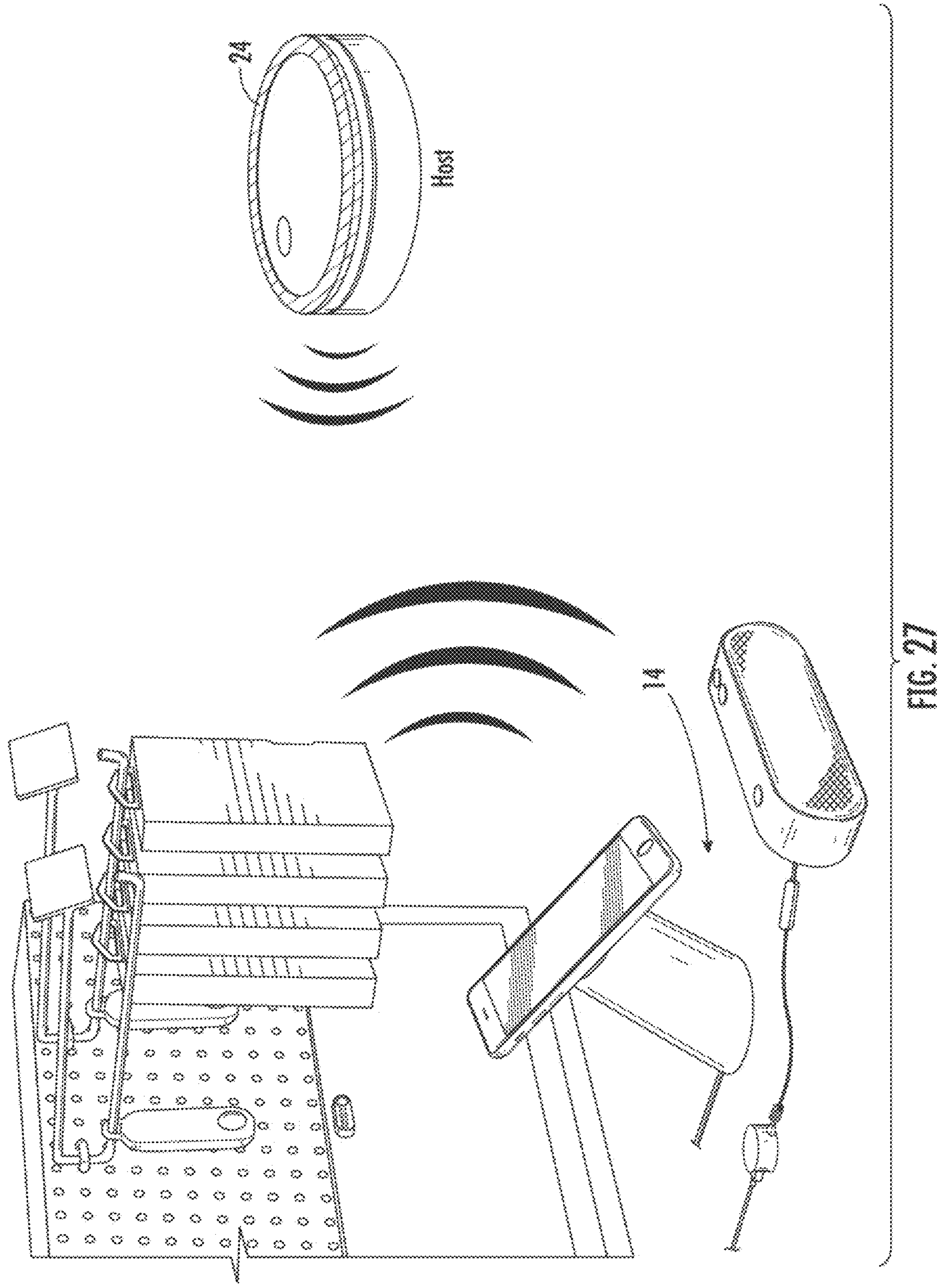
FIG. 27 is a perspective view of a system in a wireless network according to one embodiment.
Figure 28:
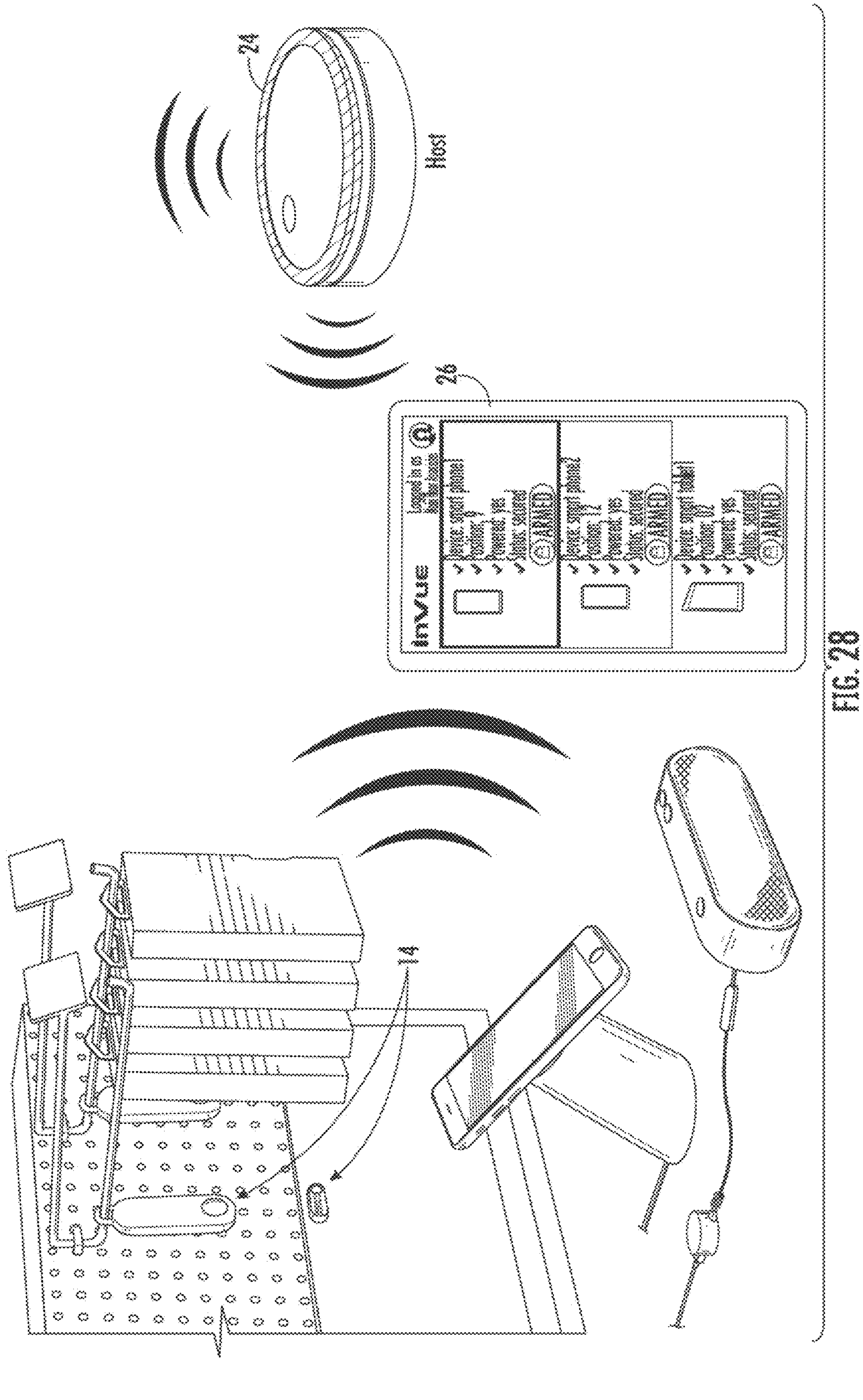
FIG. 28 is a perspective view of a system in a wireless network according to one embodiment.
Figure 29:
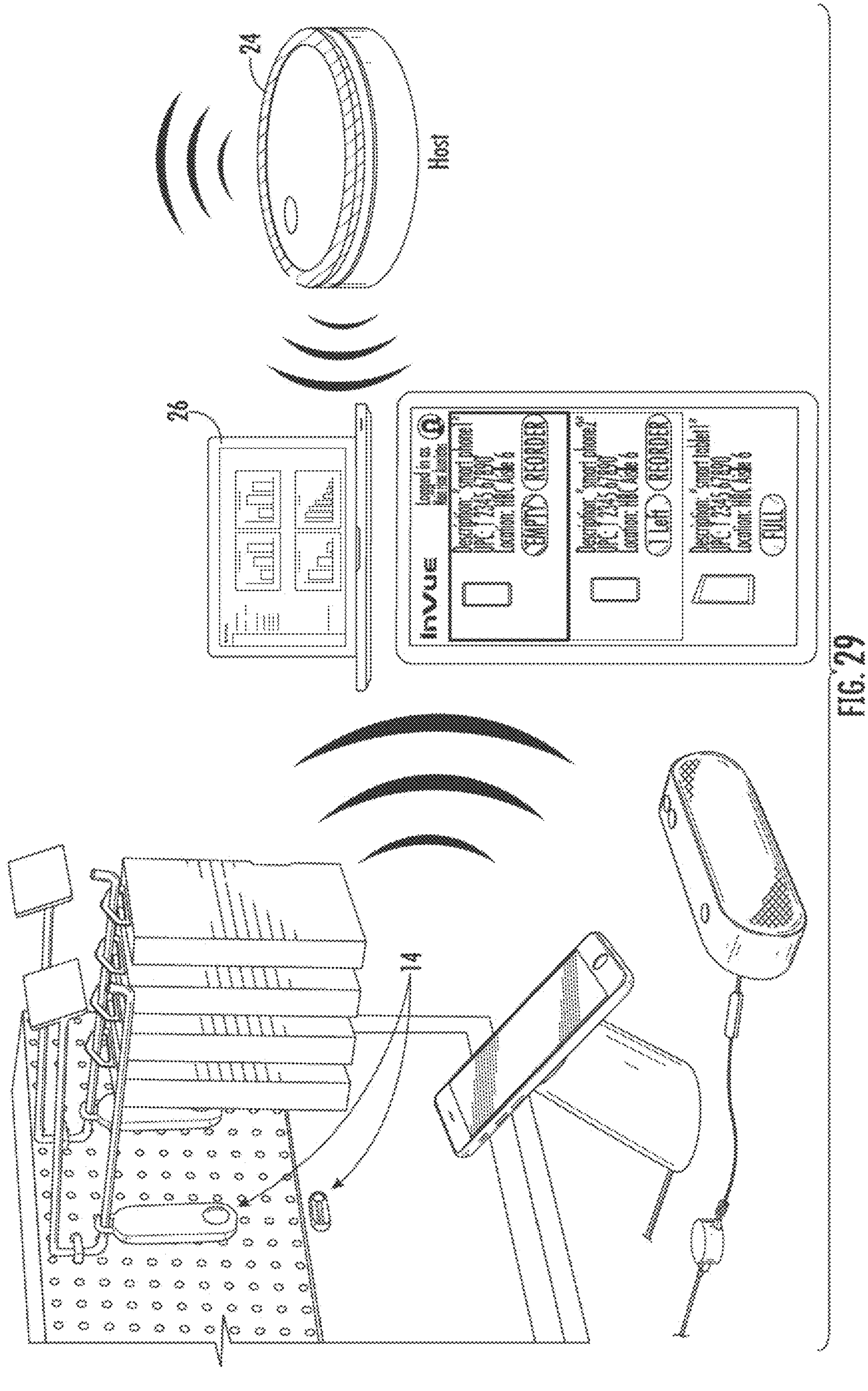
FIG. 29 is a perspective view of a system in a wireless network according to one embodiment.
Figure 30:
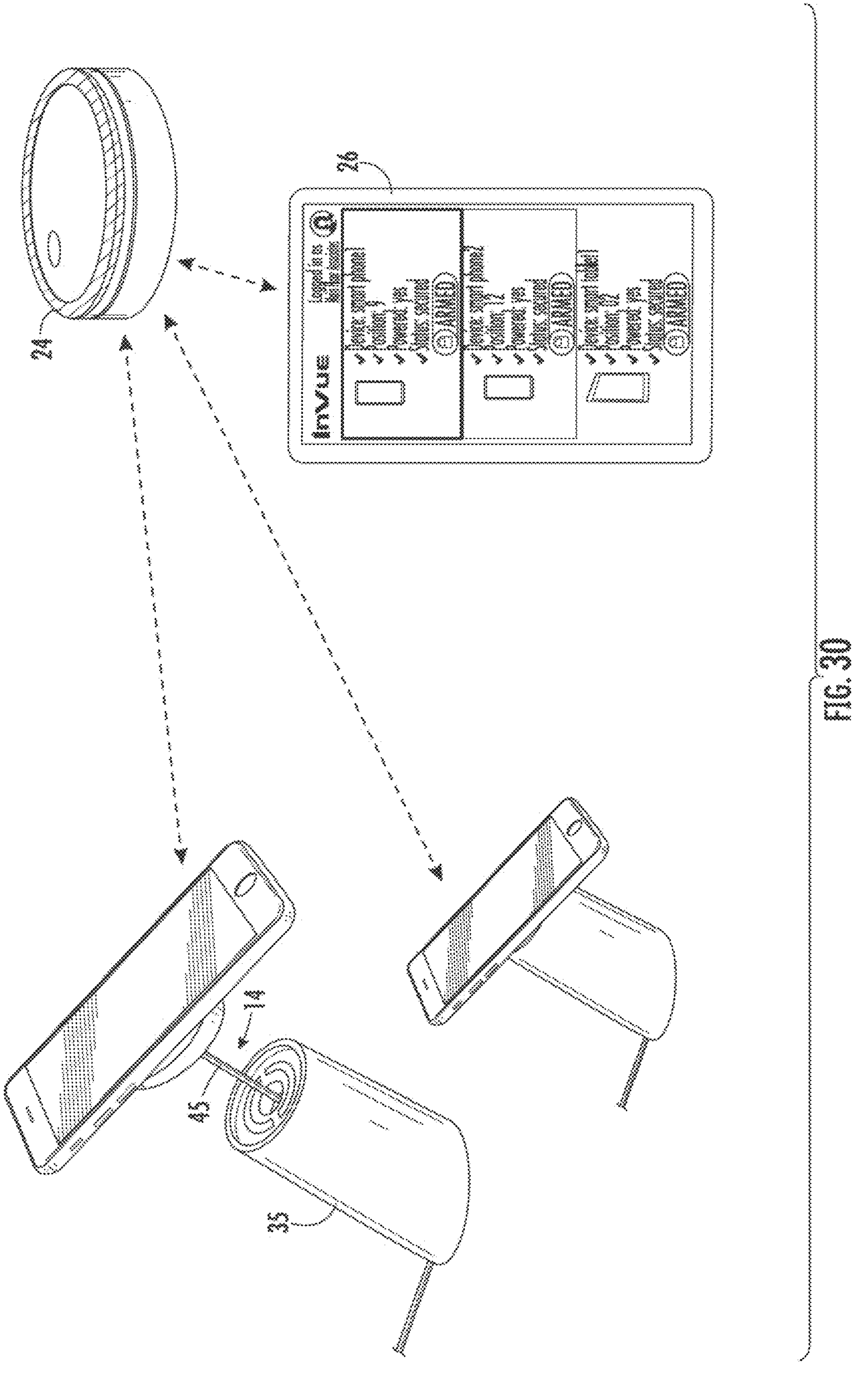
FIG. 30 is a perspective view of a system in a wireless network according to one embodiment.
Figure 31:
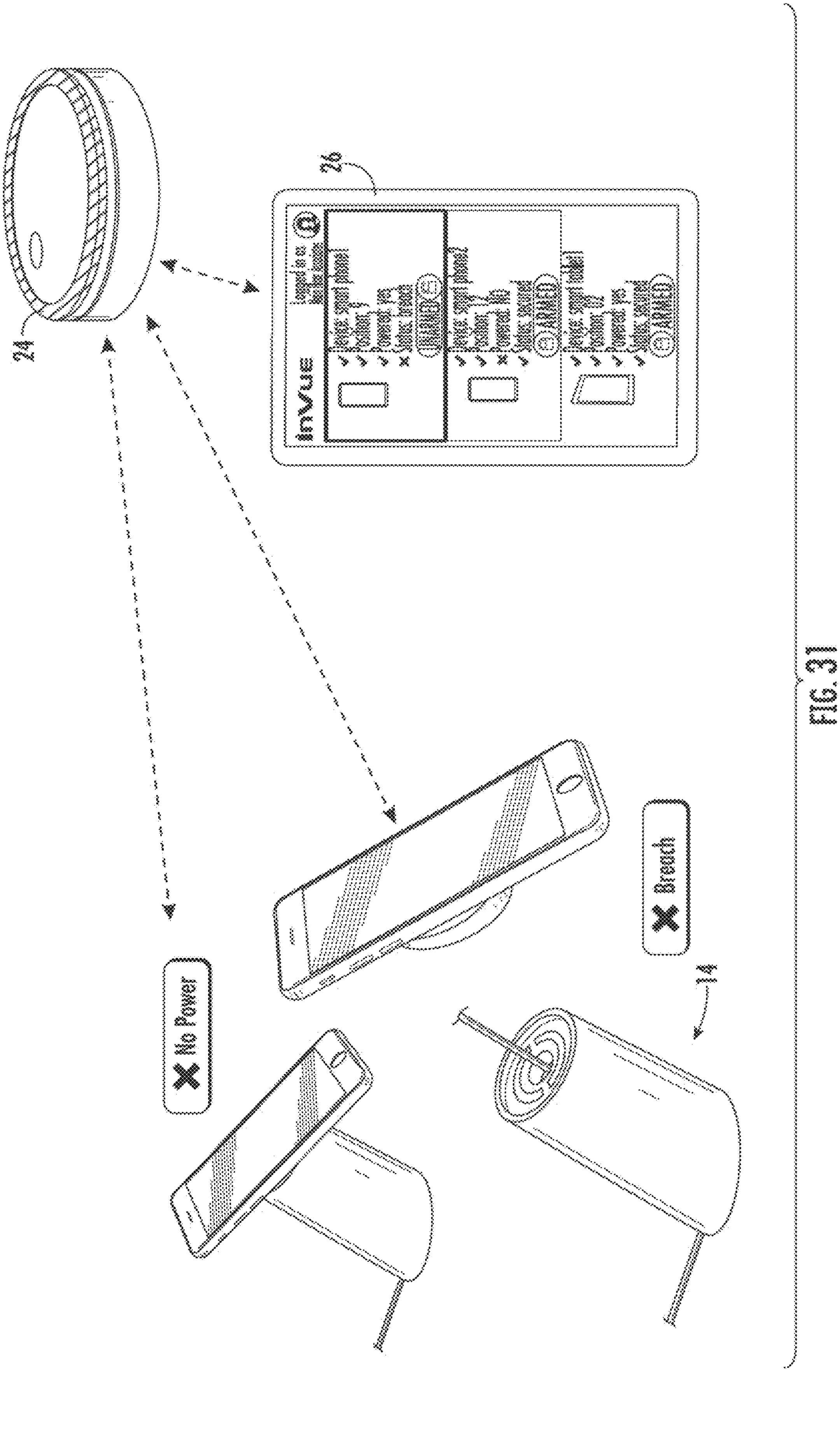
FIG. 31 is a perspective view of a system in a wireless network according to one embodiment.
Figure 32:
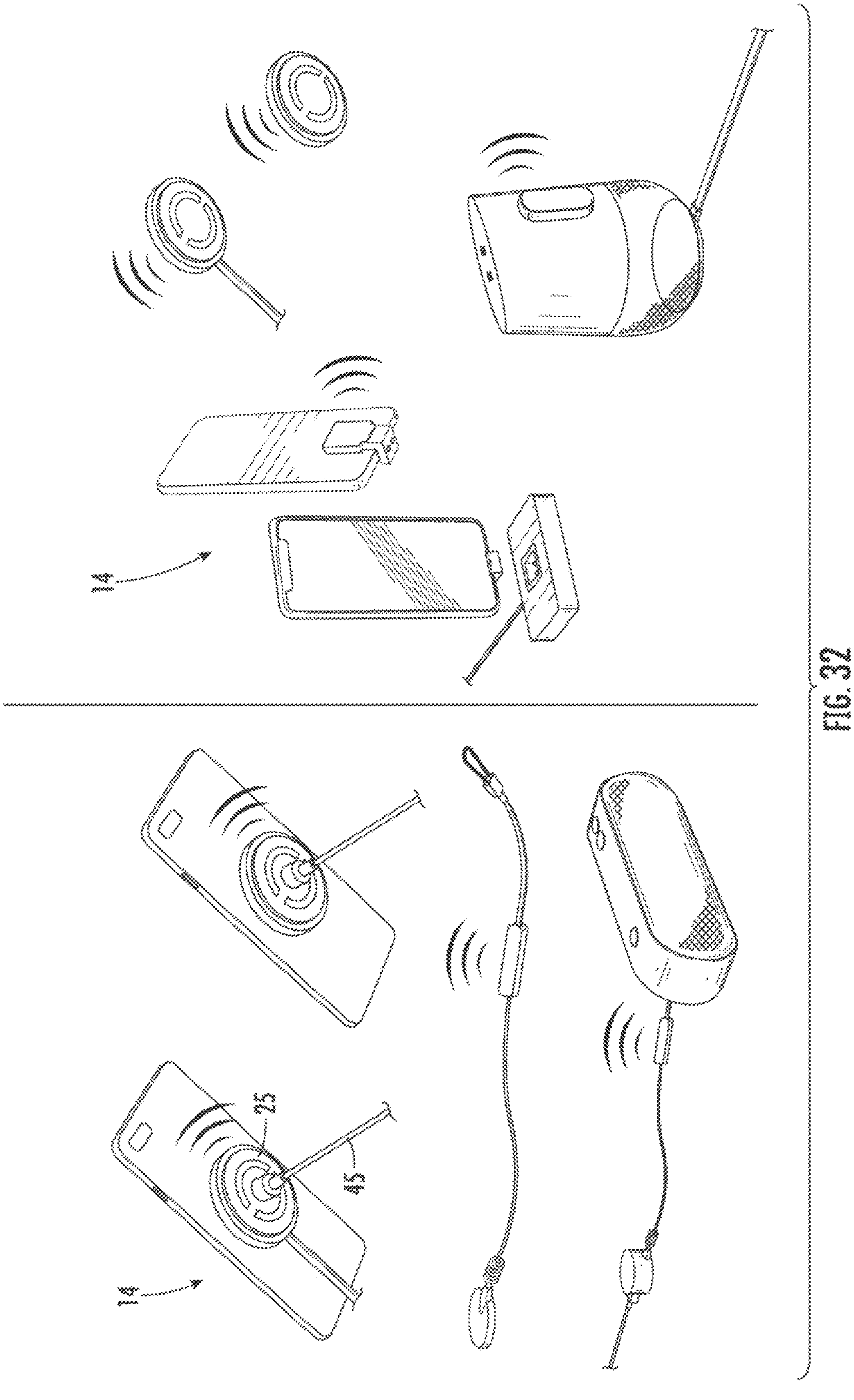
FIG. 32 shows various security devices configured for use in a wireless network according to additional embodiments.
Figure 33:
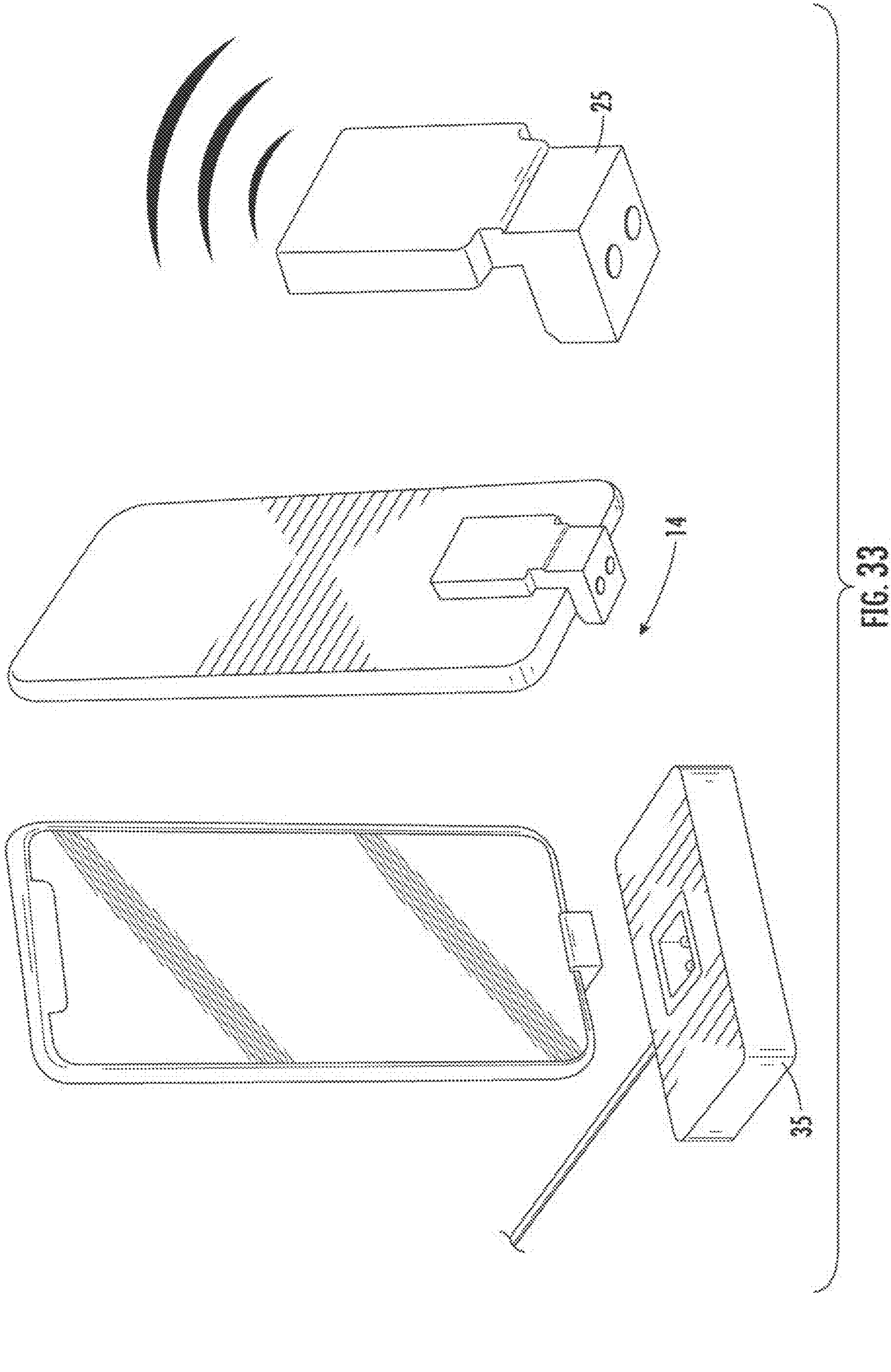
FIG. 33 shows a security device configured for use in a wireless network according to one embodiment.
Figure 34:
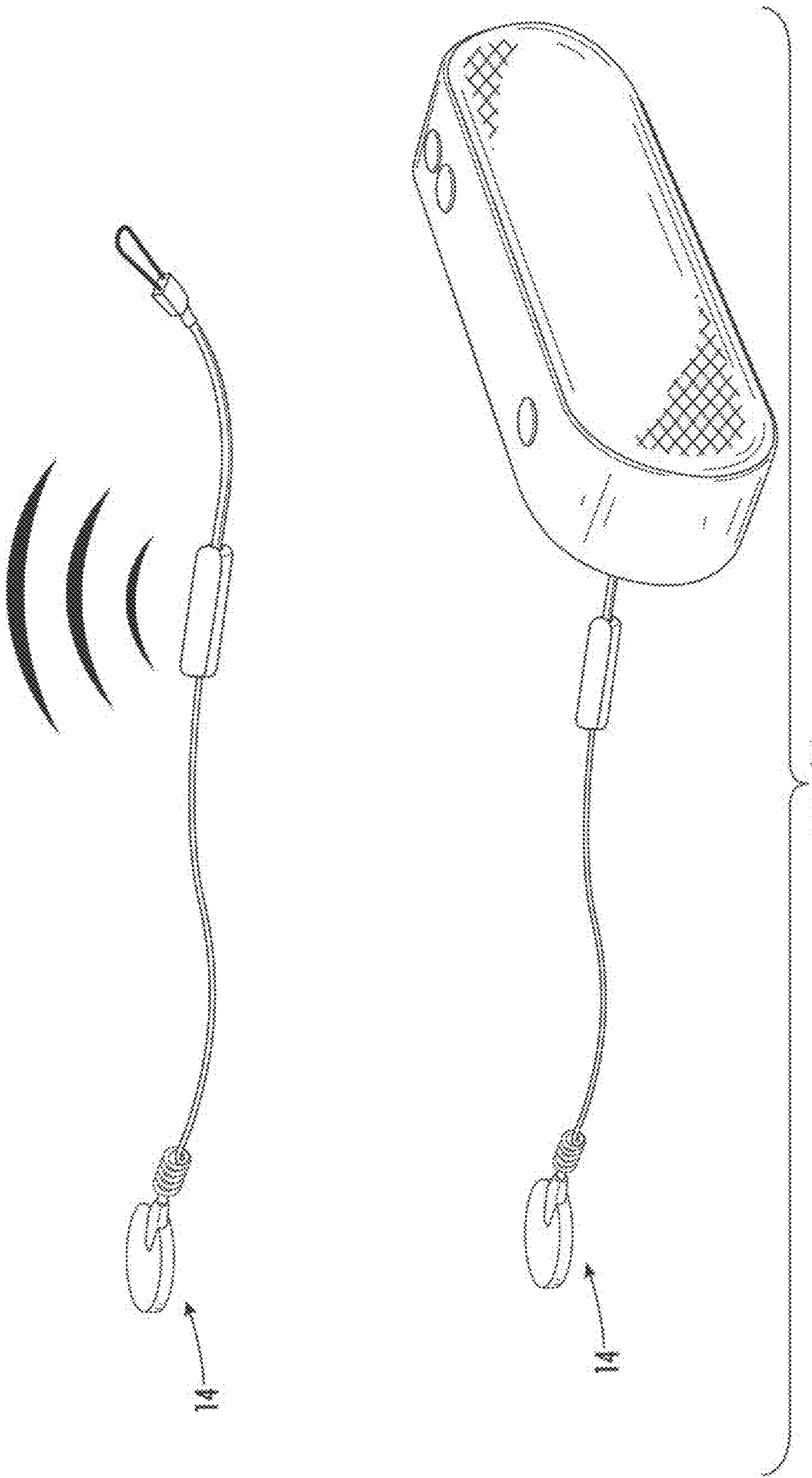
FIG. 34 shows a security device configured for use in a wireless network according to one embodiment.
Figure 35:
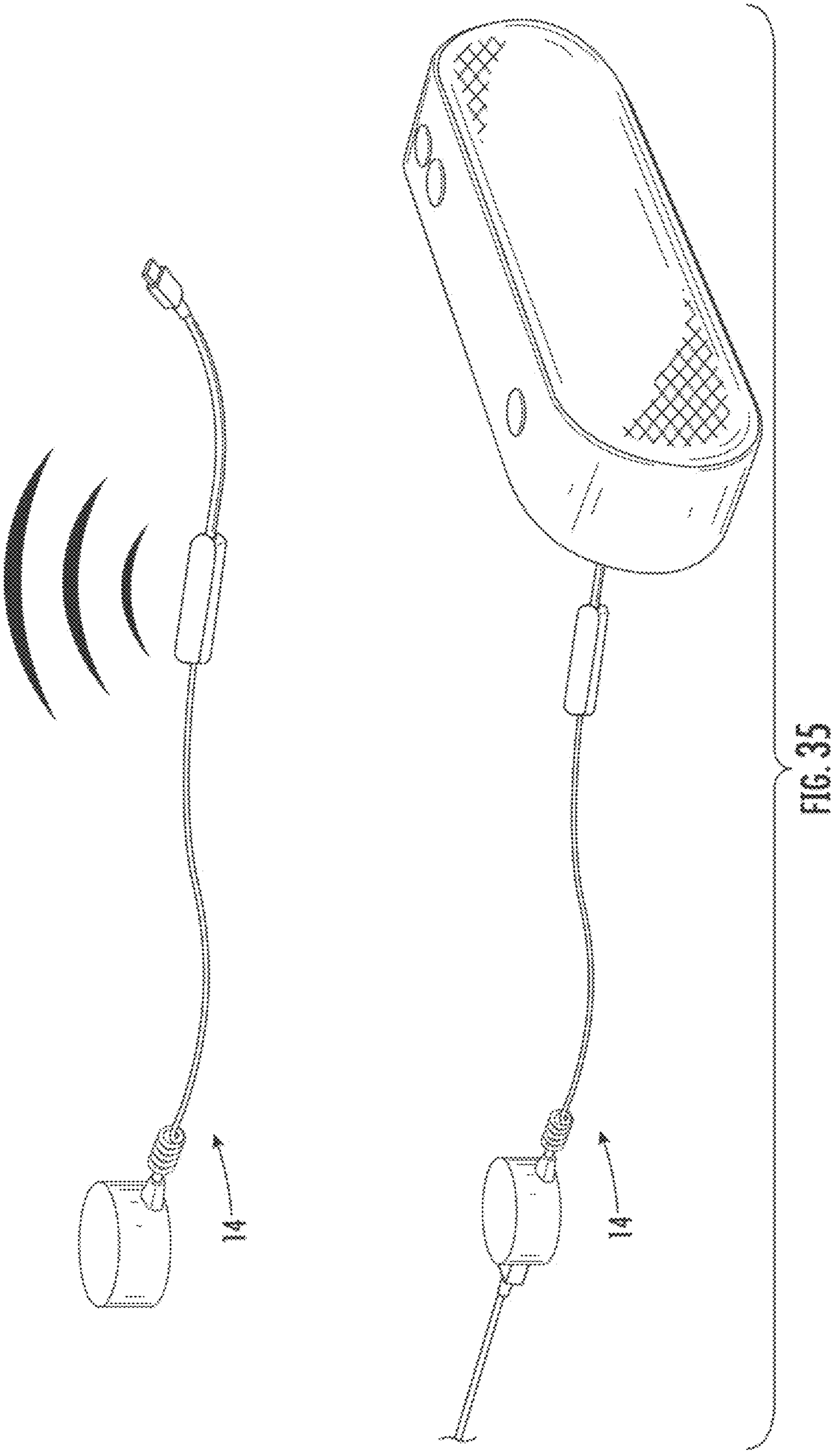
FIG. 35 shows a security device configured for use in a wireless network according to one embodiment.
Figure 36:
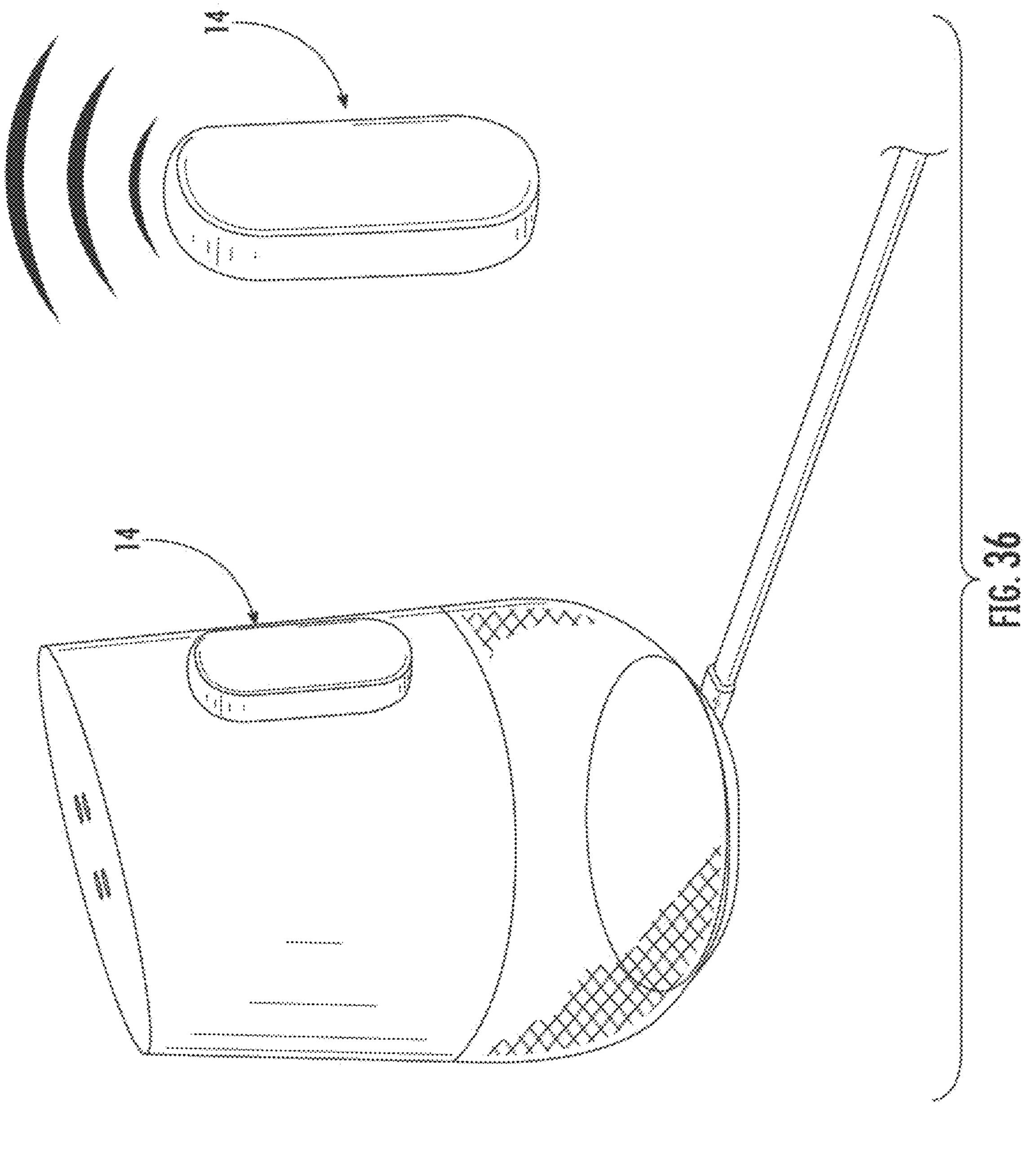
FIG. 36 shows a security device configured for use in a wireless network according to one embodiment.
Figure 37:
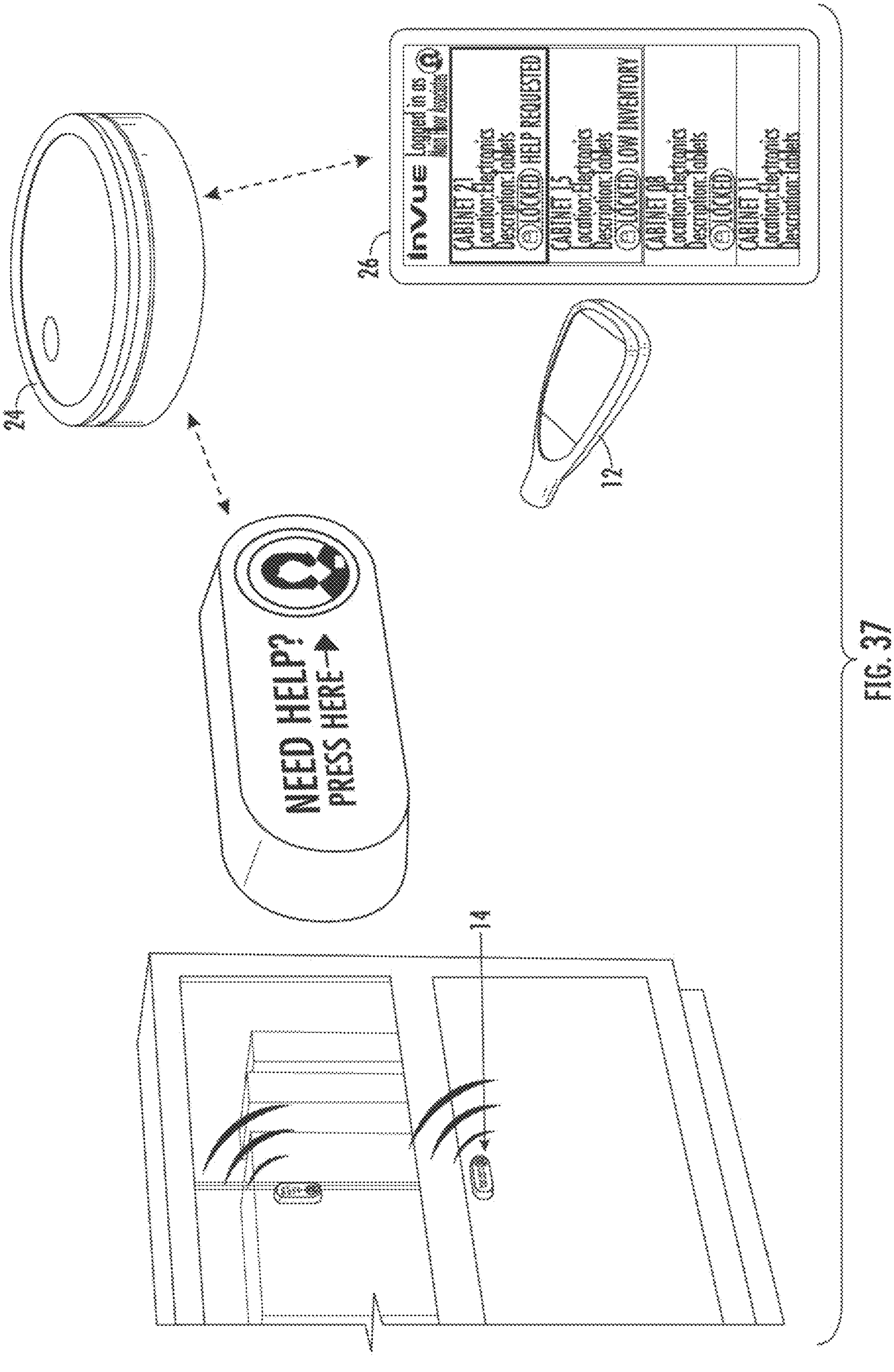
FIG. 37 is a perspective view of a system in a wireless network according to one embodiment.
Figure 38:
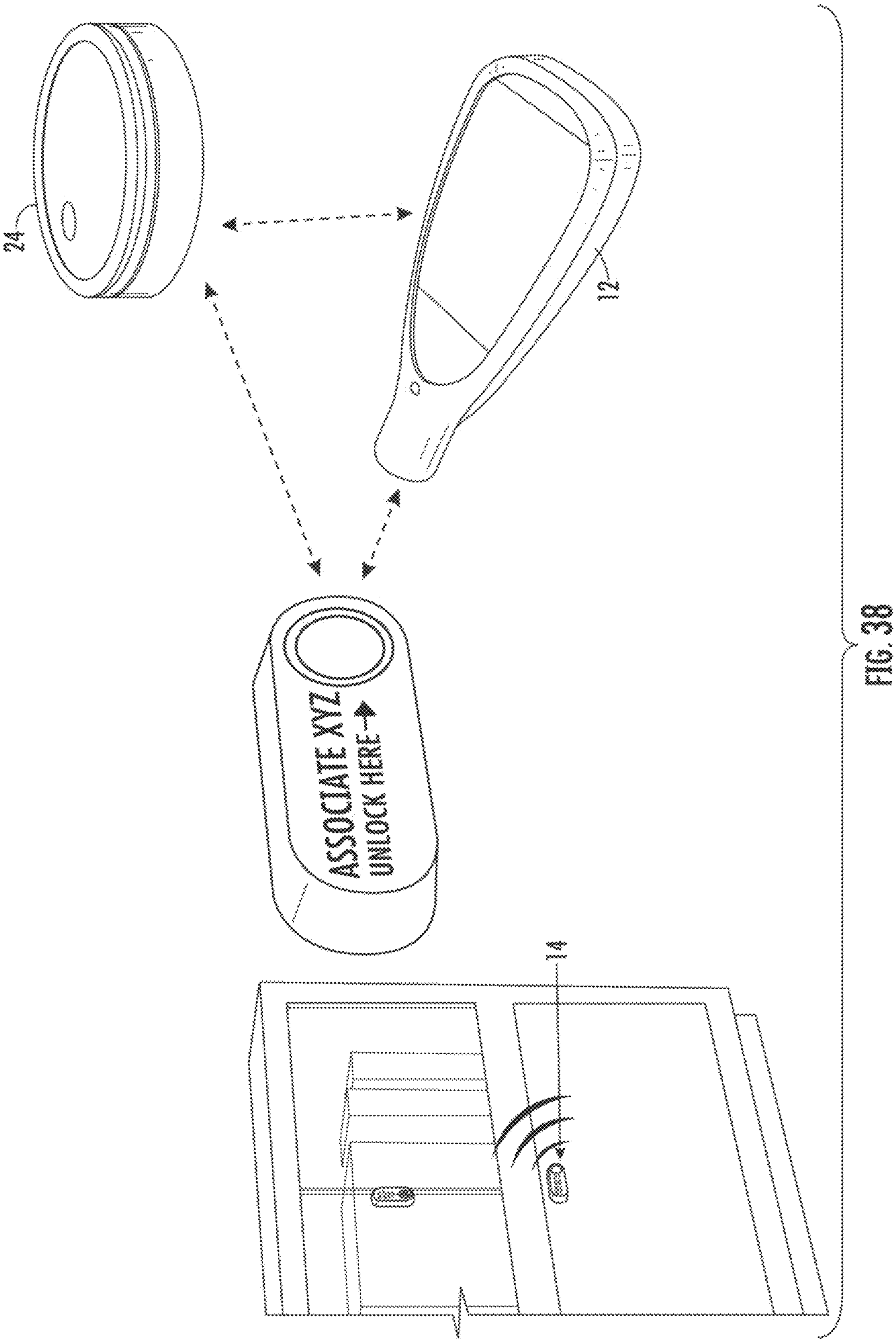
FIG. 38 is a perspective view of a system in a wireless network according to one embodiment.
Figure 39:
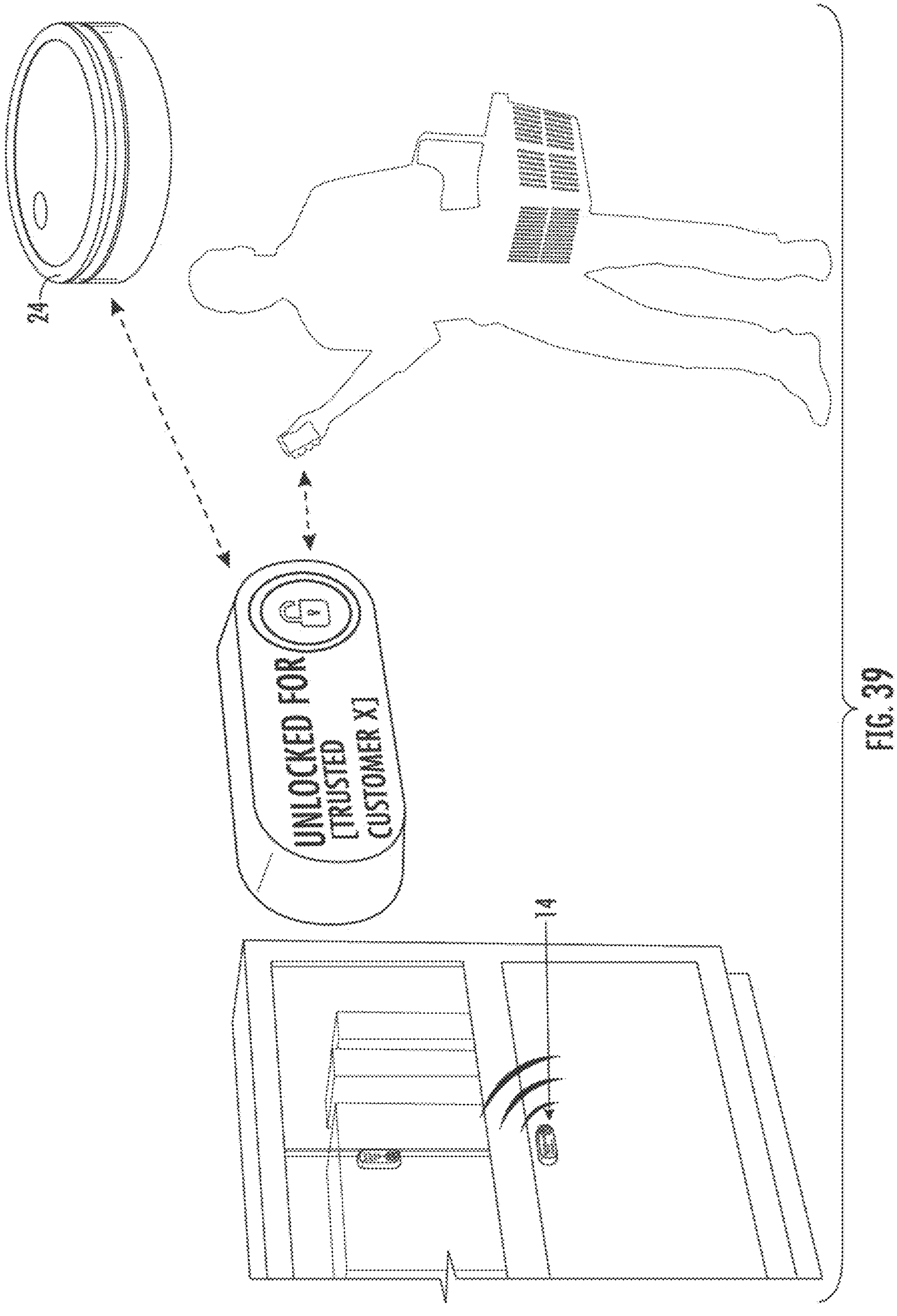
FIG. 39 is a perspective view of a system in a wireless network according to one embodiment.
Figure 40:
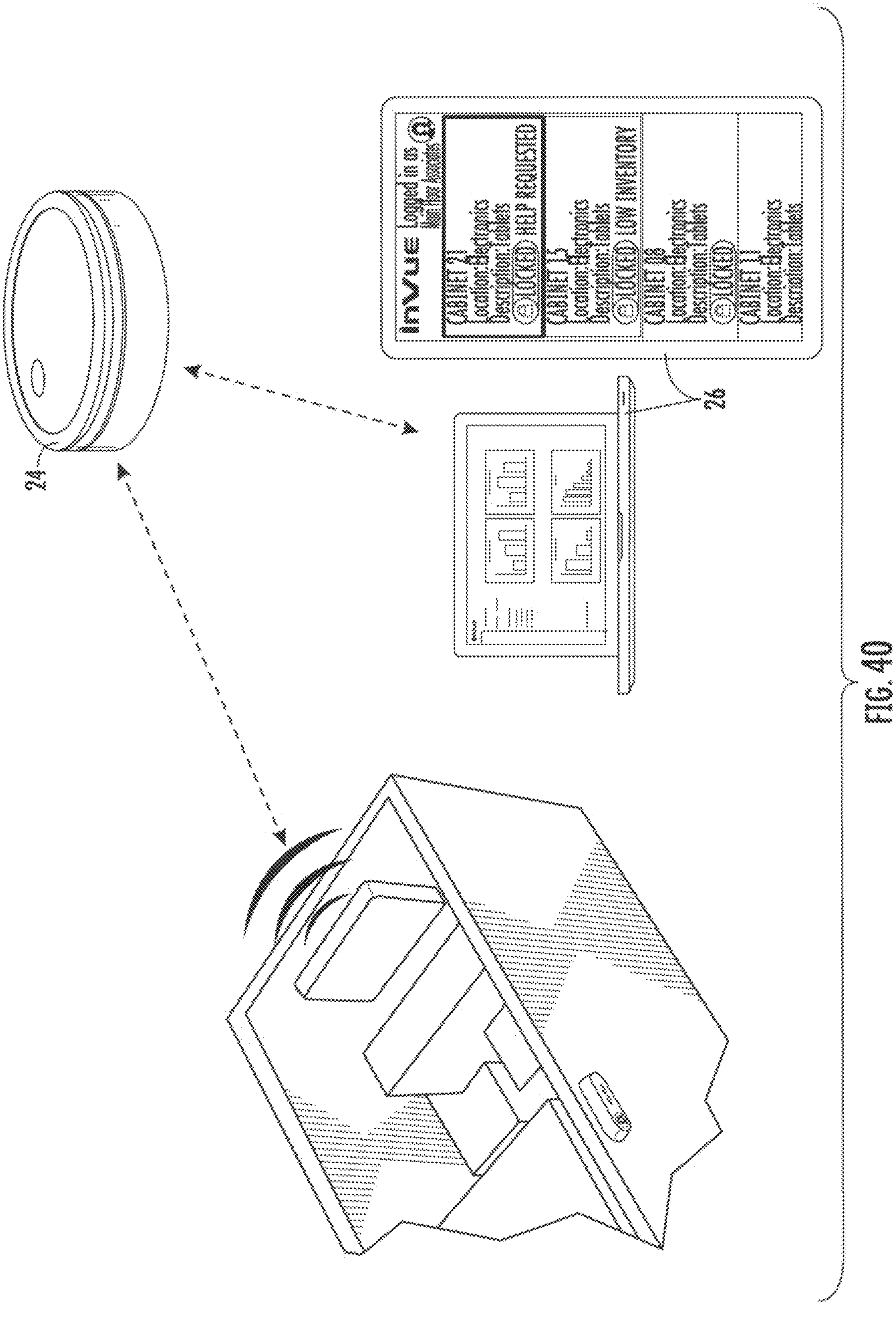
FIG. 40 is a perspective view of a system in a wireless network according to one embodiment.
Figure 41:
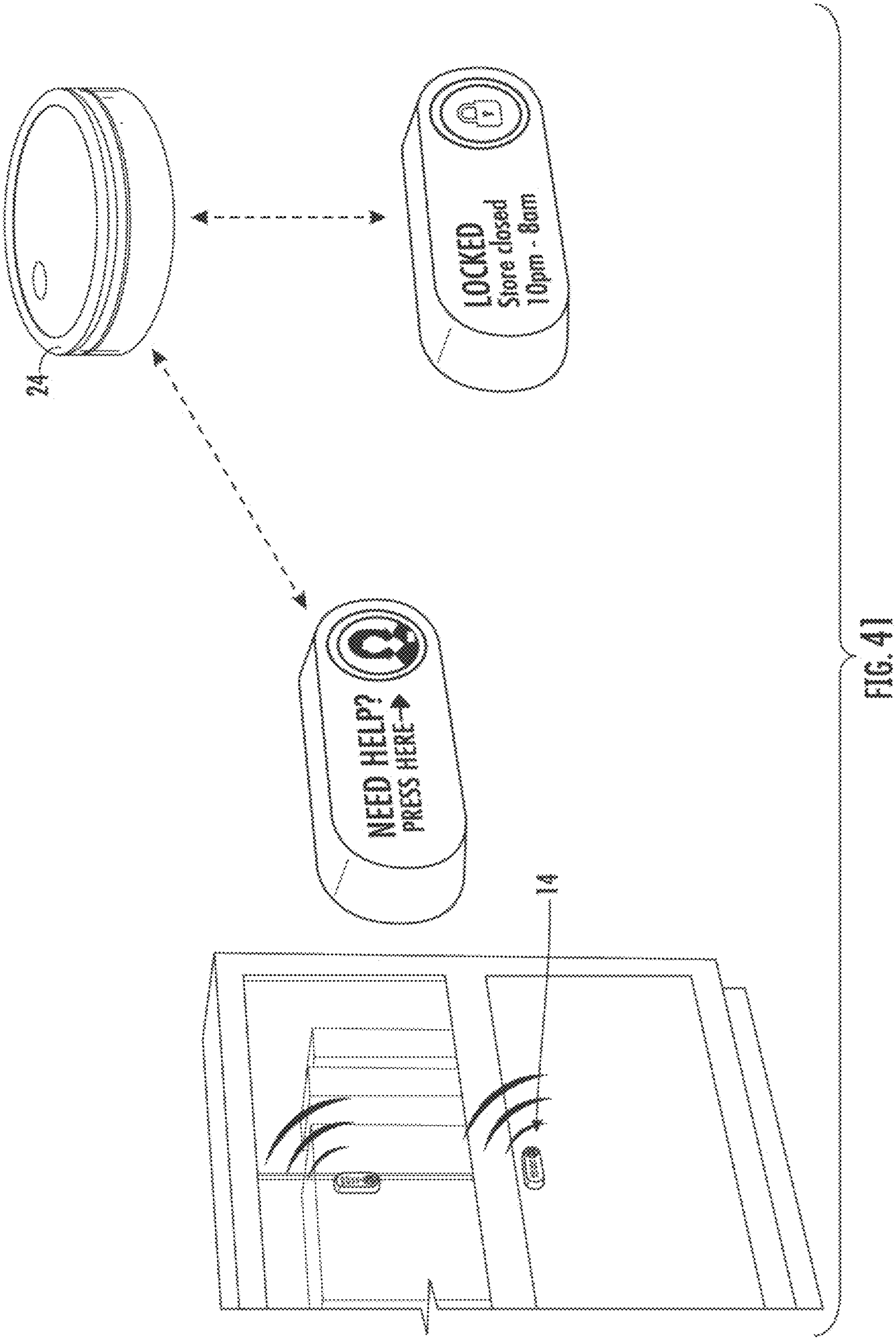
FIG. 41 is a perspective view of a system in a wireless network according to one embodiment.
Figure 42:
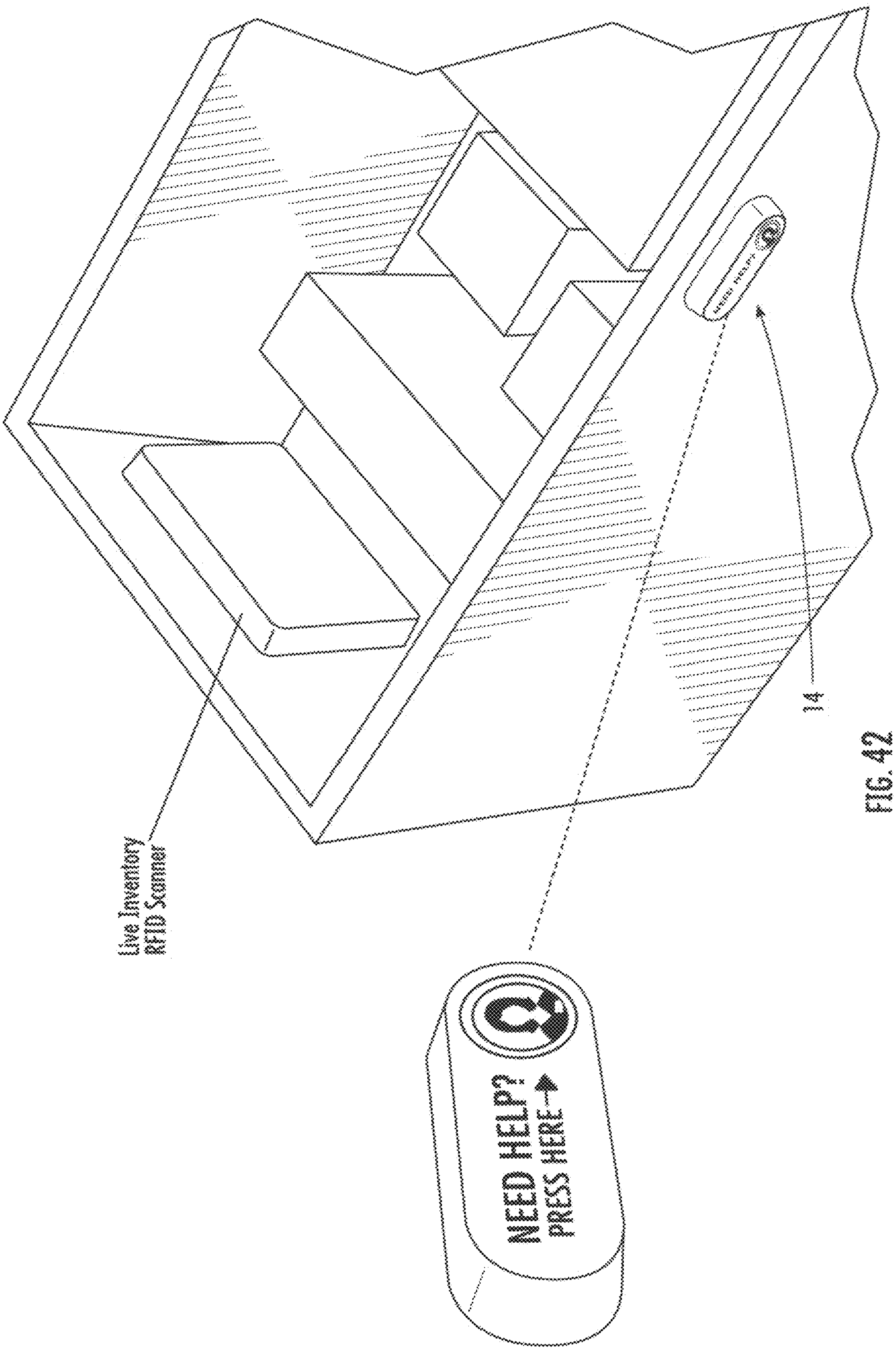
FIG. 42 is a perspective view of a system in a wireless network according to one embodiment.

As shown in FIGS. 27-29, various numbers and types of security devices 14 may be configured to communicate with one another in a network, such as a private wireless network as discussed above. A host or hub 24 may be configured to communicate with each of the plurality of security devices 14 in the network and provide various security signals, such as disclosed herein. An interface may be provided on the hub 24 for facilitating communication with an electronic key 12. FIG. 27 shows an example where the plurality of security devices 14 and hub 24 are configured to communicate in an IP network which may allow for various information and alerts to be provided to one or more remote devices 26 (e.g., system health, power status, alarm status, and/or inventory information). Moreover, FIG. 28 illustrates an example similar to FIG. 27 but where the system includes additional features via a SaaS subscription to enterprise software, such as for example, displaying planogram ("POG") compliance information, consumer activity, programmable KPI's, inventory re-stock thresholds, and/or inventory POG compliance. FIGS. 30-31 show various depictions of a plurality of security devices 14 in the form of a sensor and base which are configured to communicate with a hub 24 and a remote device 26 configured to receive notifications from the hub (e.g., no power at the security device or a breach has occurred). Furthermore, FIGS. 37-42 illustrate embodiments of security devices 14 in the form of locks that are configured to communicate in the wireless network with the hub 24. In these examples, a customer may be able to request assistance (e.g., via a call button on the security device 14) that enables a sales associate to be notified and to thereafter engage the customer or control the security device 14 with an electronic key 12 or remote device 26. The retail associate could use an electronic key 12 to unlock the security device 14 for the customer (see, e.g., FIG. 38), or use a remote device to unlock the security device. In some cases, the customer's mobile telephone may perform some of the functions disclosed herein ("Trusted Customer"), such as unlocking a security device 14 in response to receiving a wireless authorization signal (see, e.g., FIG. 39). For example, a Trusted Customer may be a customer who has purchased an item and is picking the item up in the store or one who has an account with the retailer and is purchasing the item using the customer's mobile device. In addition, various data may be collected regarding the security device 14, such as for example, the type of product that was removed from a cabinet or drawer protected by a lock, and allows for alerts to be provided to one or more remote devices (see, e.g., FIG. 40). The security devices 14 may be configured to automatically relock after an authorized opening and accessing the item of merchandise (see, e.g., FIG. 41), and various techniques may be employed to track items of merchandise added or removed from a cabinet or drawer, such as an RFID scanner that is configured to scan the product as the item is added or removed from the cabinet or drawer (see, e.g., FIG. 42).

In other embodiments and as discussed in more detail below, inventory information may be obtained regarding merchandise on a security device 14 such as a locking hook, information may be obtained regarding items of merchandise removed from a security device (e.g., a cabinet), and remote devices 26 may be used to obtain various types of information and provide various types of commands for controlling the security device and/or item of merchandise. Embodiments of wireless systems disclosed herein may provide for real time reporting of Who/What/When/Where/Why/How for interactions with security devices 14 and items of merchandise, be responsive/interactive, migrate from security focus to omni-channel experience enablement within the retail store, facilitate Trusted Customer engagement with security assets, allow to readily customize and expand the system, enable alternative business models such as SaaS models, connect local network of connected assets with central hub for local computing, and/or connect hub to cloud platform for providing alerts, reporting, system administration, daily operation. Embodiments may also provide a platform infrastructure having a centralized hub per retail store and several fit for purpose connected end security device assets such as stands, sensors, table managers, locks, cabinet sensors, inventory sensors, customer dwell sensors, etc. that all communicate with the hub. Due to the flexibility of wireless systems in some embodiments, customers do not need to pre-select which security devices 14 to purchase since the platform infrastructure is common. Furthermore, remote devices 26 and mobile devices used by retailers may allow retailers and store associates to dynamically interact with security devices 14 to make real-time decisions, such as responding to security events, restocking out of stock inventory, or responding to customer requests for assistance with secured items of merchandise.

Figure 4:
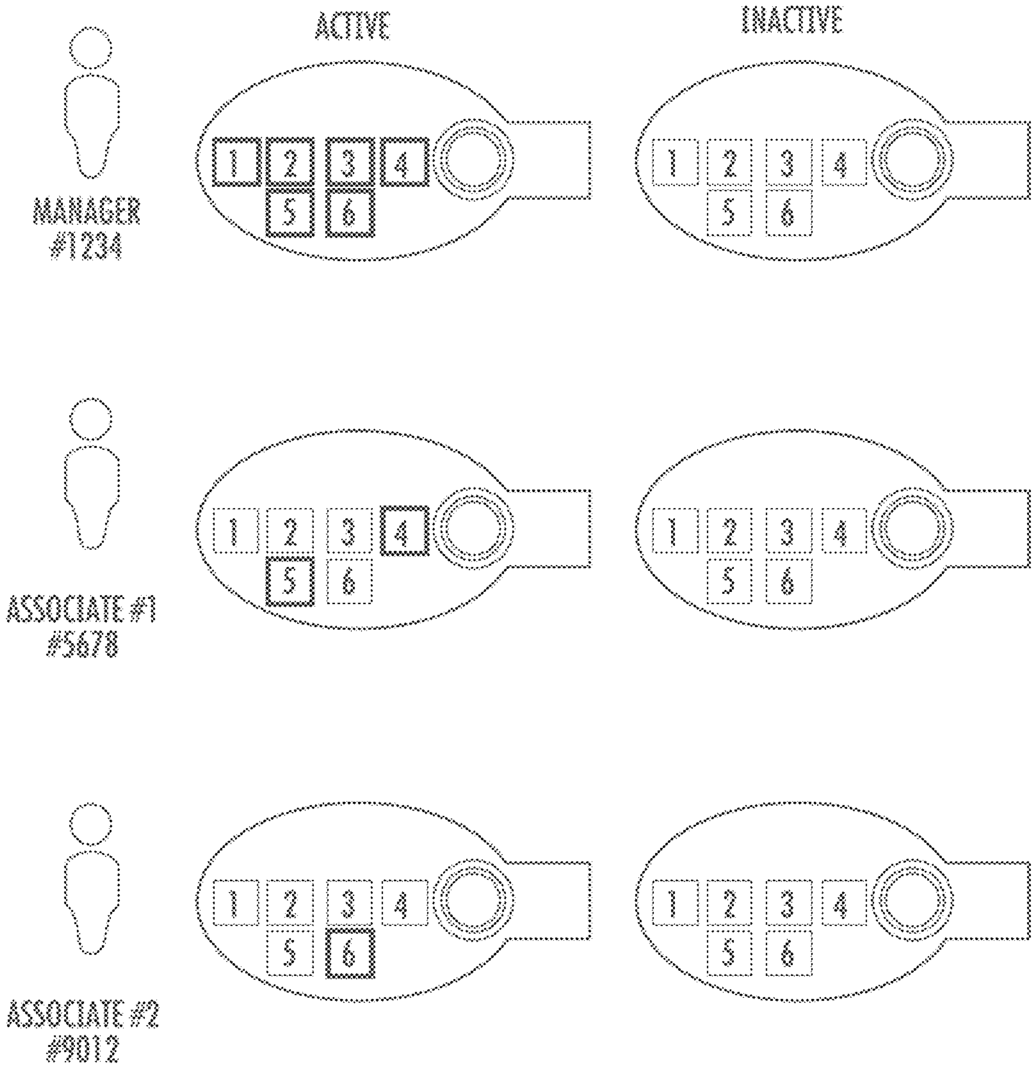
FIG. 4 illustrates a plurality of keys with different authorization levels according to one embodiment.

In some cases, each electronic key 12 may be authorized for specific locations, departments, or merchandise security devices. For instance, FIG. 4 shows that a manager may have authorization for all zones, locations, departments, or merchandise security devices (indicated as numbers 1-6), while a first associate may only have authorization for two zones, locations, departments, or merchandise security devices (indicated as numbers 4 and 5), and a second associate may only have authorization for one zone, location, department, or merchandise security device (indicated as number 6). As such, a retail store or other establishment may limit the scope of authorization for different associates within the same retail store. In order to accommodate different authorizations levels, each key 12 may be configured to store a code that is associated with each zone, location, department, or merchandise security device. For example, each zone may include a plurality of merchandise security devices 14, and a retail store may have multiple zones (e.g., a zone for electronics, a zone for jewelry, etc.).

Various techniques may be used to initially program the electronic key 12. For example, the electronic key 12 may be initially presented to each authorized merchandise security device 14. Upon communication with the security device 14 or the cloud 22, the electronic key 12 will be paired with each security device. A programming station 16 may provide a code to the electronic key 12, and the key or cloud 22 may then communicate the code to each of its authorized security devices 14. Each key 12 may only need to be programmed once. In some embodiments, a programming station 16 may be located within each zone, and a key 12 may receive a code from each programming station that it is authorized. Thereafter, each key 12 may need to be "refreshed" at the programming station 16 or a charging station 18 following a predetermined period of time or in response to being disabled as described in various examples herein. In other embodiments, the electronic key 12 may be programmed directly via the cloud 22.

In another embodiment, each electronic key 12 may include a security code and a serial number for one or more merchandise security devices 14. For example, a key 12 may only be able to arm, disarm, lock, or unlock a merchandise security device 14 where the security codes and the serial numbers match one another. In one example, each serial number is unique to a merchandise security device 14 and could be programmed at the time of manufacture or by the retailer. This technique allows for greater flexibility in programming keys 12 and assigning keys to particular merchandise security devices 14 and/or zones. In one embodiment, a setup electronic key 12" may be used to initially map particular merchandise security devices 14 and serial numbers. In this regard, the setup key 12" may be used to communicate with each key 12 and obtain the serial number of each merchandise security device 14. The setup key 12" may also obtain a location of the security devices 14, or a user of the setup key may provide a description for each merchandise security device (e.g., SN #123=merchandise security device #1). The setup key 12" may communicate with a tablet or other computing device 26 for accumulating all of the information (see, e.g., FIGS. 3 and 19), which may occur via wired or wireless communication. Thus, the tablet or computing device 26 may map each of the serial numbers with the merchandise security devices 14 and in some cases, may also include serial numbers and corresponding electronic keys 12. Individual electronic keys 12 may then be assigned particular serial numbers for authorized merchandise security devices 14 (e.g., user 1 includes serial numbers 1, 2, 3; user 2 includes serial numbers 1, 4, 5). Each of the electronic keys 12 may be programmed with the same security code using a programming station 16. In some embodiments, the setup process may be used in conjunction with a planogram of the merchandise security devices 14. The planogram may represent a layout of the merchandise security devices 14 within a retail store or other establishment. For example, a setup key 12" may be used to map serial numbers to specific merchandise security devices 14 on a planogram as the setup key communicates with each merchandise security device. The setup key 12" may communicate with a tablet or other computing device 26 for populating the planogram with serial numbers, such as via a wired connection (see, e.g., FIG. 19). This planogram may be uploaded to a remote location or device for managing the planogram and ensuring planogram compliance based on information exchanged between the security devices 14 and the remote device 26. As before, particular serial numbers may be assigned to authorized users.

In order to arm, disarm, lock, or unlock a merchandise security device 14, the electronic key 12 may communicate with a particular merchandise security device and determine whether the security codes and the serial numbers match. If the codes match, the electronic key 12 then arms, disarms, locks, or unlocks the merchandise security device 14. Upon refreshing an electronic key 12 and/or when a user requests an electronic key via programming or authorization station 16, any available electronic key may be used since the key may be programmed in real time with the appropriate level of authorization for that user (e.g., specific zones, departments, and/or merchandise security devices).

In one embodiment, the merchandise display security system 10 comprises an electronic key 12 and a merchandise security device 14 that is configured to be operated by the key. The system may further comprise an optional programming station 16 that is operable for programming the key 12 with a security code, which may also be referred to herein as a Security Disarm Code (SDC). In addition to programming station 16, the system may further comprise an optional charging station 18 that is operable for initially charging and/or subsequently recharging a power source disposed within the key 12. For example, the key 12 and merchandise security device 14 may each be programmed with the same SDC into a respective permanent memory. The key 12 may be provisioned with a single-use (i.e., non-rechargeable) power source, such as a conventional or extended-life battery, or alternatively, the key may be provisioned with a multiple-use (i.e. rechargeable) power source, such as a conventional capacitor or rechargeable battery. In either instance, the power source may be permanent, semi-permanent (i.e., replaceable), or rechargeable, as desired. In the latter instance, charging station 18 is provided to initially charge and/or to subsequently recharge the power source provided within the key 12. Furthermore, key 12 and/or merchandise security device 14 may be provided with only a transient memory, such that the SDC must be programmed (or reprogrammed) at predetermined time intervals. In this instance, programming station 16 is provided to initially program and/or to subsequently reprogram the SDC into the key 12. As will be described, key 12 may be operable to initially program and/or to subsequently reprogram the merchandise security device 14 with the SDC. Key 12 is then further operable to operate the merchandise security device 14 by transferring power and/or data to the device, as will be described.

In the exemplary embodiment of the system illustrated in FIGS. 1-2, electronic key 12 is configured to be programmed with a unique SDC by the programming station 16. In some embodiments, the key 12 is presented to the programming station 16 and communication therebetween is initiated, for example, by pressing or otherwise actuating a control button 28 provided on the exterior of the key. Communication between the programming station 16 and the key 12 may be accomplished directly, for example by one or more electrical contacts, or indirectly, for example by wireless communication. Any form of wireless communication capable of transferring data between the programming station 16 and key 12 is also possible, including without limitation optical transmission, acoustic transmission or magnetic induction. In some embodiments shown and described herein, communication between programming station 16 and key 12 is accomplished by wireless optical transmission, and more particularly, by cooperating infrared (IR) transceivers provided in the programming station and the key. In some embodiments, the programming station 16 may function similarly to that disclosed in U.S. Pat. No. 7,737,844 entitled PROGRAMMING STATION FOR A SECURITY SYSTEM FOR PROTECTING MERCHANDISE, the disclosure of which is incorporated herein by reference in its entirety. For the purpose of describing some embodiments of the present invention, it is sufficient that the programming station comprises at least a logic control circuit for generating or being provided with a SDC, a memory for storing the SDC, and a communications system suitable for interacting with the electronic key 12 in the manner described herein to program the key with the SDC.

An available feature of a merchandise security system 10 according to one embodiment is that the electronic key 12 may include a time-out function. More particularly, the ability of the key 12 to transfer data and/or power to the merchandise security device 14 may be deactivated after a predetermined time period. By way of example, the electronic key 12 may be deactivated after about six to about twenty-four hours from the time the key was programmed or last refreshed. In this manner, an authorized sales associate typically must program or refresh the key 12 assigned to him at the beginning of each work shift. Furthermore, the charging station 18 may be configured to deactivate the electronic key 12 when the key is positioned within or otherwise engaged with a charging port 30 (see, e.g., FIG. 1). In this manner, the charging station 18 can be made available to an authorized sales associate. In one embodiment, the electronic key 12 may be authorized upon the sales associate inputting an authorized code to release the key for use. For instance, the sales associate may input a code on a keypad in communication with the charging station 18. Upon inputting the correct code, the charging station 18 may indicate which key 12 is authorized for use by the sales associate (e.g., via an audible and/or a visible indicator). In some cases, the time-out period may be predetermined or customized by a user. For example, a manager of a retail store may input a particular time period for one or more of the electronic keys 12. Those electronic keys 12 that are "active" may be monitored via communication within the cloud-based network. In other embodiments, the electronic key 12 may be timed out or otherwise disabled in response to an event. For instance, the electronic key 12 may be disabled in response to the key being misplaced or stolen, or keys being brought into a retail store that are not authorized for use. Such disabling may alternatively occur via a command from a device 26 sent to the electronic key 12 via the cloud 22. In other cases, the electronic key 12 may be disabled in response to failure to communicate with the network (e.g., at a particular time or time interval), a lost connection to the network, and/or an inability to reconnect to the network. In another example, the electronic key 12 may be disabled in response to its memory being full, e.g., with audit data.

In one embodiment, commands may be provided remotely for taking various actions. For example, where a theft has occurred, a command may be provided from a remote location or device 26 (e.g., a tablet or computer) to lock and/or arm all or a portion of the merchandise security devices 14. Similarly, a command may be provided from a remote location or device 26 to deactivate all or a portion of the electronic keys 12 and/or security devices 14. As such, the system 10 provides techniques for centralized security and control of the electronic keys 12, merchandise security devices 14, and other components within the system. As discussed above, the electronic keys 12 may also be controlled remotely. Furthermore, in some embodiments, such requests or commands may be made by the remote device 26 for individual security devices 14 or a plurality of security devices (e.g., sending a command to lock all security devices in response to a security event). Moreover, one or more of the security devices 14 may be configured to lock or alarm in response to a security event (e.g., automatically locking a sensor attached to an item of merchandise to a base removably supporting the sensor).

Figure 5:
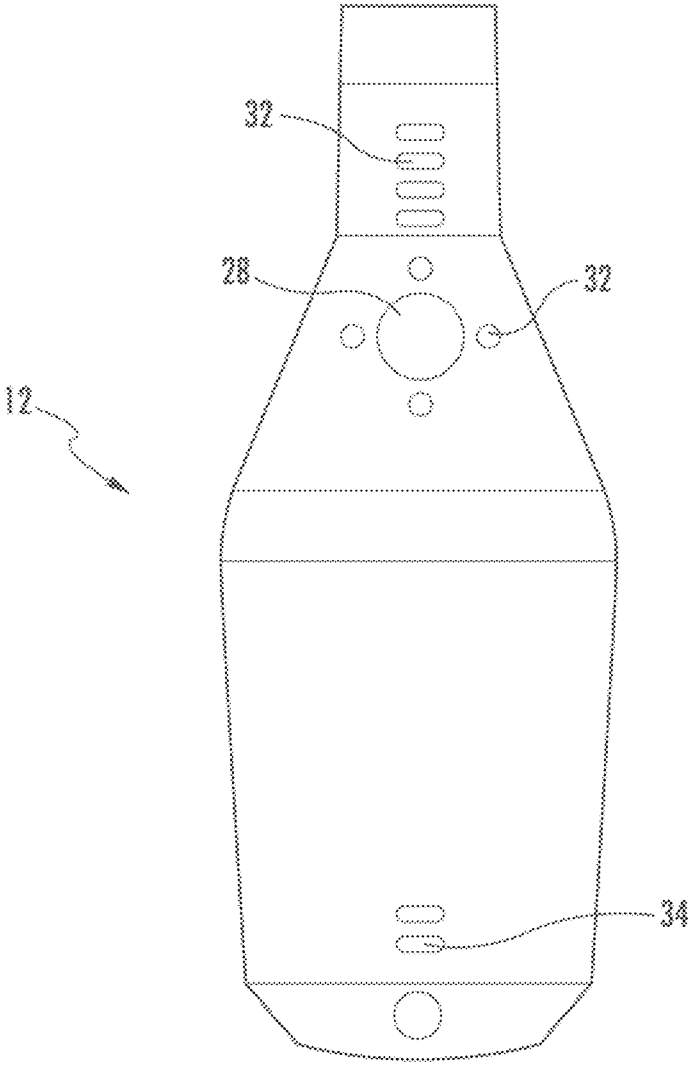
FIG. 5 is a plan view of an electronic key according to one embodiment.
Figure 6:
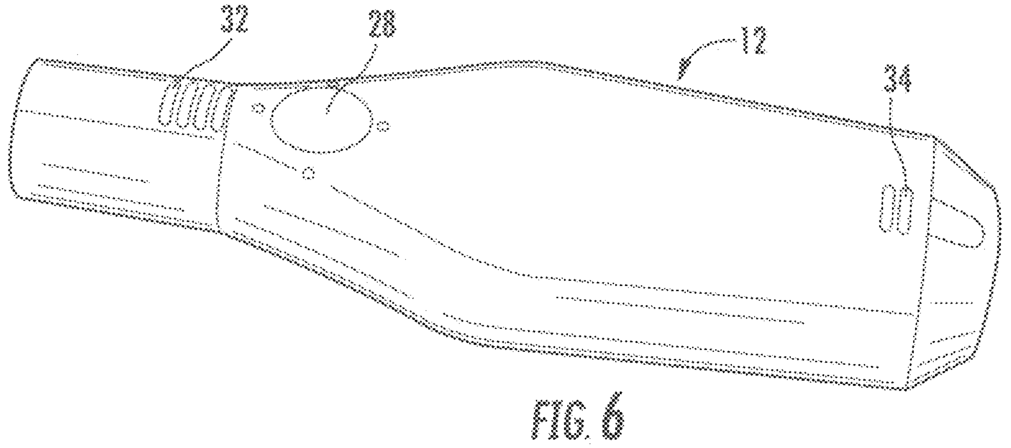
FIG. 6 is a perspective view of the electronic key shown in FIG. 5.

FIGS. 5-6 illustrate one embodiment of an electronic key 12. The electronic key 12 may include a control button 28 for activating the key, such as for initiating communication with a merchandise security device. Moreover, the electronic key 12 may also include one or more visual indicators. In this regard, the key 12 may include one or more status indicators 32 that illustrate a status of the communication of the key with a merchandise security device 14. The status indicators 32 may guide the user to know when communication between the key 12 and the merchandise security device 14 is taking place and has been completed. The status indicators 32 may be different depending on whether the communication was authorized (e.g., unlocked or disarmed), unauthorized (e.g., wrong zone or department), or unsuccessful. The status indicators 32 may also indicate an amount of time of authorized use remaining on the key 12, such as where the key includes a time-out feature as discussed above. The electronic key 12 may also include one or more other indicators 34 that provide a visual indication of the power remaining on the key. These other indicators 34 may also be used for any other desired purpose, such as to indicate a programming state of the key 12. For example, the indicators 34 may be activated while the electronic key 12 is being initially programmed. It is understood that the illustrated status indicators 32, 34 are for illustration only, as various types and configurations of indicators may be employed in alternative embodiments.

Figure 7:
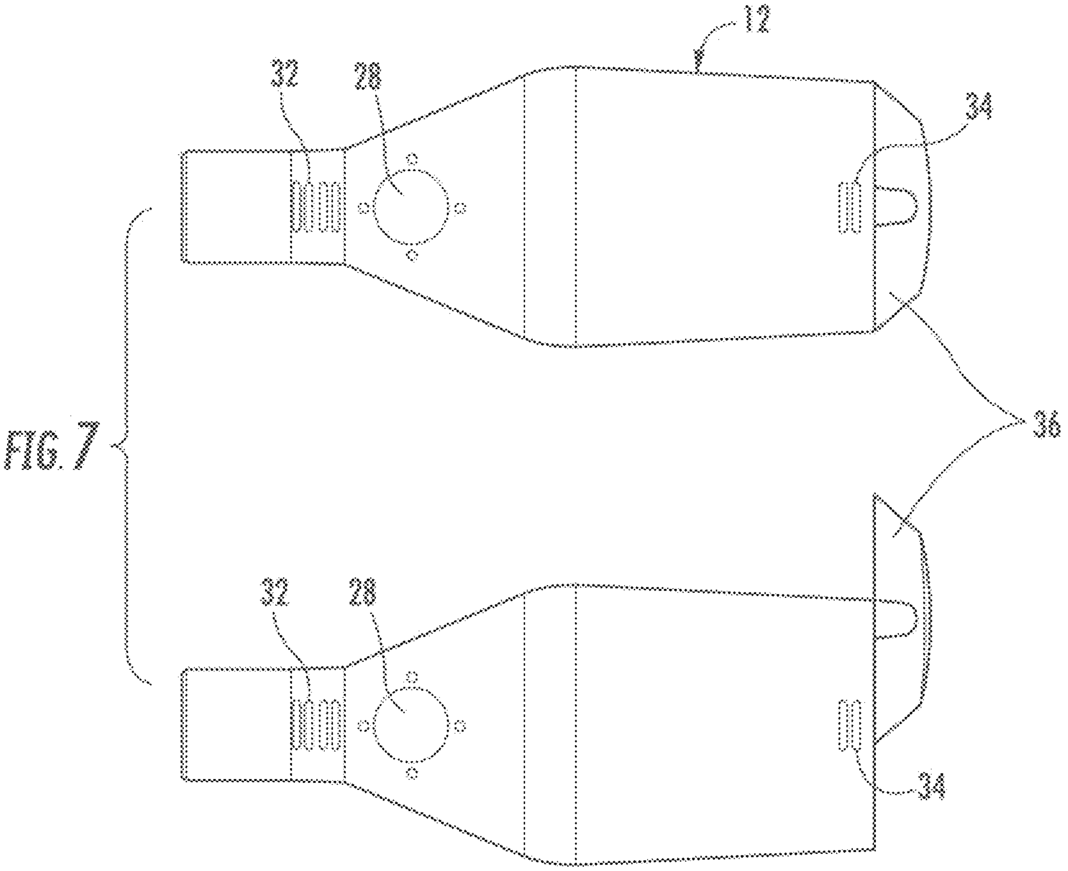
FIG. 7 is a plan view of an electronic key according to another embodiment.
Figure 8:
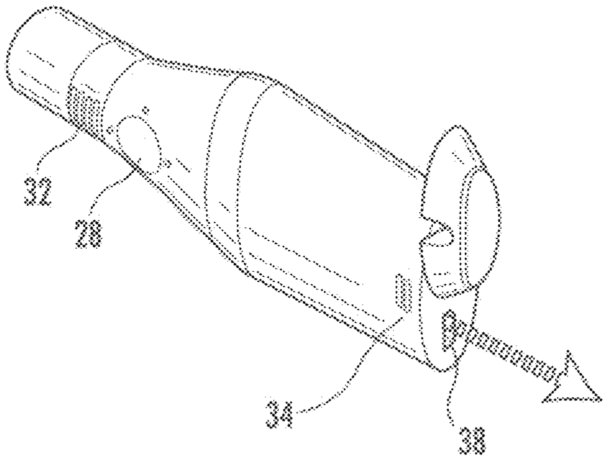
FIG. 8 is a perspective view of the electronic key shown in FIG. 7.
Figure 9:
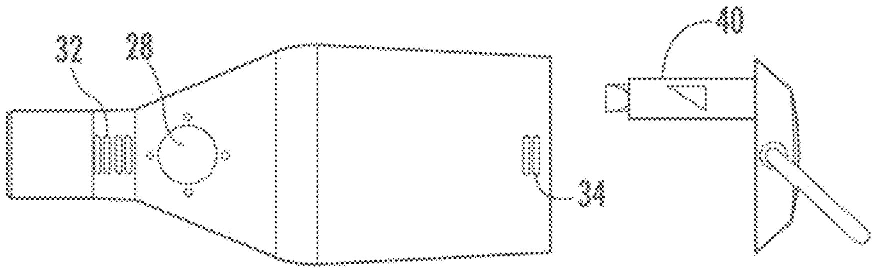
FIG. 9 is a plan view of an electronic key according to another embodiment.
Figure 10:
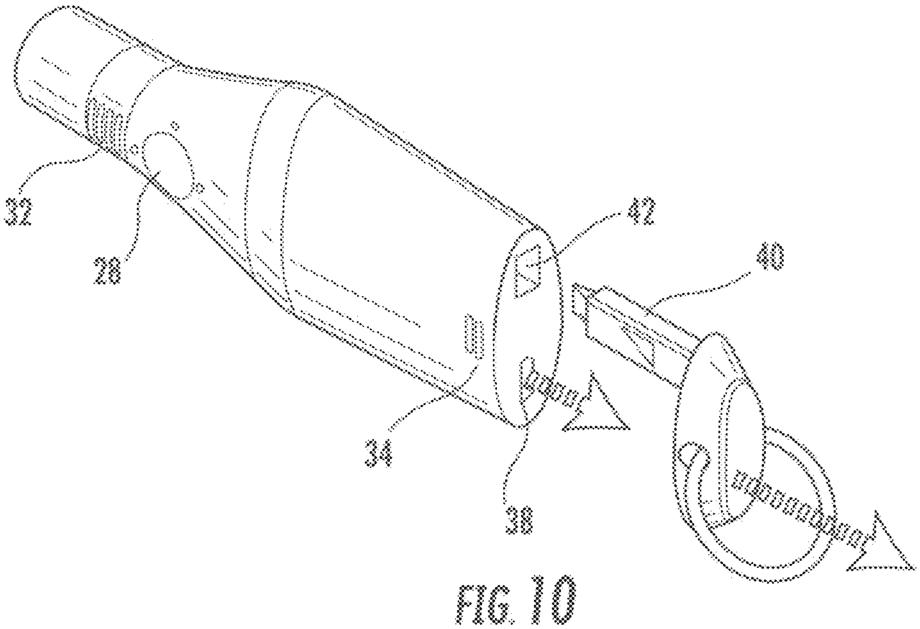
FIG. 10 is a perspective view of the electronic key shown in FIG. 9.

FIGS. 7-10 illustrate additional embodiments of electronic keys 12. In these examples, the electronic key 12 includes a removable portion 36. In FIGS. 7-8, the removable portion 36 allows access to an input power port 38, such as for recharging the electronic key 12. The removable portion 36 may be configured to slide relative to the electronic key 12 to expose the input power port 38. The input port 38 may be configured to receive and electrically connect to a corresponding connector, such as a connector associated with the charging station 18. For instance, the electronic key 12 may be configured to be docked within the charging station 18 for charging thereof (see, e.g., FIG. 1). As shown in FIGS. 9-10, the removable portion 36 may also be configured to be removed entirely from the electronic key 12 and may be multi-purpose in that it may be include a tool portion 40. For example, the tool portion 40 may be used for facilitating the disconnection of various connectors, as a screwdriver, etc. The electronic key 12 may include an opening 42 defined to receive the removable portion 36 therein in a non-use position.

Figure 20:
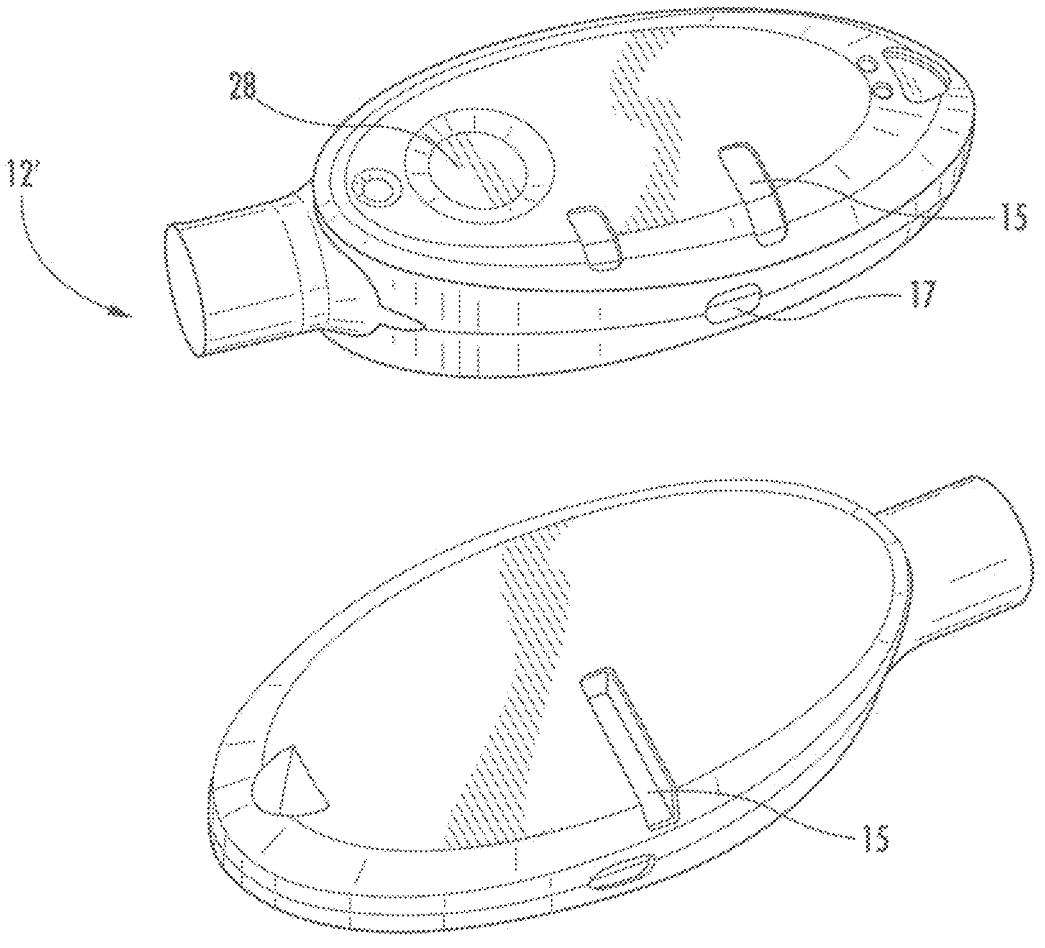
FIG. 20 illustrates top and bottom perspective views of an electronic key according to another embodiment.
Figure 21:
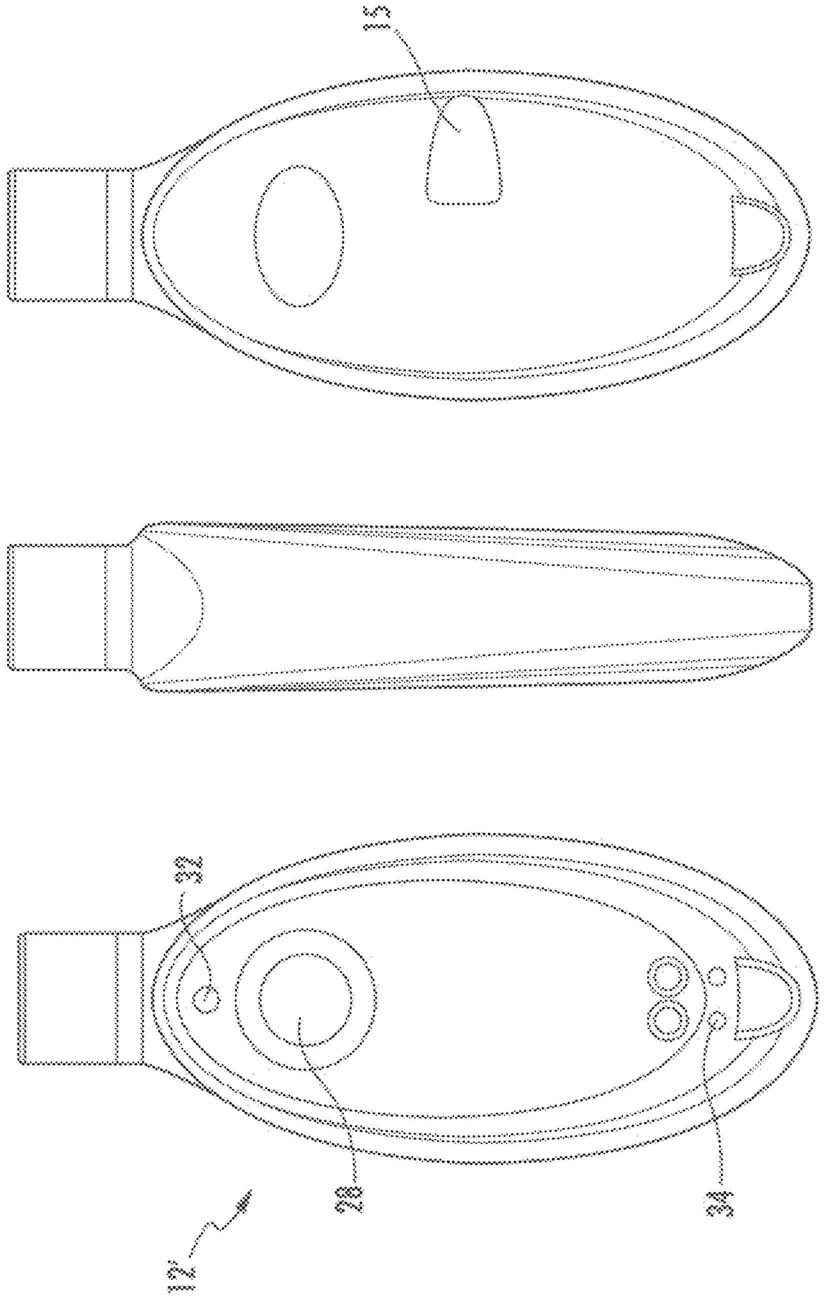
FIG. 21 illustrates plan and side views of the electronic key shown in FIG. 20.

FIGS. 20-21 show additional embodiments of an electronic key 12'. In this embodiment, the electronic key 12' includes one or more alignment features 15 for facilitating alignment with a programming or authorization station 16' and/or a charging station 18' as discussed in further detail below. In addition, the electronic key 12' includes an input port 17 (e.g., a micro-USB port) which may be configured to releasably engage a corresponding port on the programming or authorization station 16' and/or the charging station 18' for data and/or power transfer. Notably in the example shown in FIG. 20, the input port 17 on the electronic key 12' is on a side surface, while a pair of alignment features 15 are provided on opposite surfaces of the electronic key. In the embodiment shown in FIG. 21, a single alignment feature 15 is provided. The input port 17 may be located on a side surface between a transfer port at one end and a key chain ring opening at an opposite end. Positioning of the input port 17 on a side surface of the electronic key 12' may provide for a more secure and stable attachment to the programming or authorization station 16' and/or the charging station 18'. A series of status indicators 32, 34, as discussed above, for example light-emitting diodes (LEDs) may be provided on the exterior of the electronic key 12' for indicating the operating status thereof.

As shown in FIG. 1, the programming station 16 comprises a housing configured to contain the logic control circuit that generates the SDC, the memory that stores the SDC, and a communications system for communicating the SDC to the key (e.g., wirelessly). In use, the logic control circuit generates the SDC, which may be a predetermined (i.e. "factory preset") security code, a manually input security code, or a security code that is randomly generated by the logic control circuit. In the latter instance, the logic control circuit further comprises a random number generator for producing the unique SDC. A series of visual indicators, for example light-emitting diodes (LEDs) may be provided on the exterior of the housing for indicating the operating status of the programming station 16. Programming station 16 may further be provided with an access mechanism for preventing use of the programming station by an unauthorized person. For example, the programming station may include a keypad 44. An authorized user may input a code in the key pad 44 that allows the programming station 16 to generate a SDC for communicating to the key 12.

In a particular embodiment, the logic control circuit of the programming station 16 performs an electronic exchange of data with a logic control circuit of the key, commonly referred to as a "handshake communication protocol." The handshake communication protocol determines whether the key 12 is an authorized key that has not been programmed previously (e.g., a "new" key), or is an authorized key that is being presented to the programming station 16 a subsequent time to refresh the SDC. In the event that the handshake communication protocol fails, the programming station 16 will not provide the SDC to the unauthorized device attempting to obtain the SDC. When the handshake communication protocol succeeds, programming station 16 permits the SDC to be transmitted by the key 12. As will be readily apparent to those skilled in the art, the SDC may be transmitted from the programming station 16 to the key 12 by any suitable means, including without limitation, wireless, electrical contacts or electromechanical, electromagnetic or magnetic conductors, as desired. Moreover, in other cases the programming station 16 may simply provide the SDC to the electronic key 12 without first initiating any handshake communication protocol.

In some embodiments, the merchandise security device 14 is a "passive" device. As used herein, the term passive is intended to mean that the security device 14 does not have an internal power source sufficient to lock and/or unlock a mechanical lock mechanism. Significant cost savings are obtained by a retailer when the merchandise security device 14 is passive since the expense of an internal power source is confined to the key 12, and one such key is able to operate multiple security devices. If desired, the merchandise security device 14 may also be provided with a temporary power source (e.g., capacitor or limited-life battery) having sufficient power to activate an alarm, for example a piezoelectric audible alarm, that is actuated by a sensor, for example a contact, proximity or limit switch, in response to a security breach. The temporary power source may also be sufficient to communicate data, for example a SDC, from the merchandise security device 14 to the key 12 to authenticate the security device and thereby authorize the key to provide power to the security device. In other cases, the security device may be an electronic device, such as a sensor attached to the item of merchandise and a base that removably supports the sensor thereon. The sensor may be attached to the base with a tether or may be wireless (e.g., using ranging techniques as described in more detail below).

In some embodiments, the merchandise security device 14 further comprises a logic control circuit, similar to the logic control circuit disposed within the key 12, adapted to perform a handshake communication protocol with the logic control circuit of the key in essentially the same manner as that between the programming station 16 and the key. In essence, the logic control circuit of the key 12 and the logic control circuit of the merchandise security device 14 communicate with each other to determine whether the merchandise security device is an authorized device that does not have a security code, or is a device having a matching SDC. In the event the handshake communication protocol fails (e.g., the device is not authorized or the device has a non-matching SDC), the key 12 will not program the device with the SDC, and consequently, the merchandise security device will not operate. If the merchandise security device 14 was previously programmed with a different SDC, the device will no longer communicate with the key 12. In the event the handshake communication protocol is successful, the key 12 permits the SDC stored in the key to be transmitted to the merchandise security device 14 to program the device with the SDC. As will be readily apparent to those skilled in the art, the SDC may be transmitted from the key 12 to the merchandise security device 14 by any suitable means, including without limitation, via radiofrequency, one or more electrical contacts, electromechanical, electromagnetic or magnetic conductors, as desired. Furthermore, the SDC may be transmitted by inductive transfer of data from the electronic key 12 to the merchandise security device 14. Moreover, in other cases the electronic key 12 may simply provide the SDC to the merchandise security device 14 without first initiating any handshake communication protocol.

In one embodiment, when the handshake communication protocol is successful and the merchandise security device 14 is an authorized device having the matching SDC, the merchandise security device may be armed or disarmed, such as where the security device includes an alarm circuit. In other embodiments, the merchandise security device 14 may be armed or disarmed when the SDC codes match. In some embodiments, when the handshake communication protocol is successful and the SDC codes match, the logic control circuit of the key 12 causes an internal power source of the key to transfer electrical power to the device 14 to operate a mechanical lock mechanism. In other embodiments, the merchandise security device 14 may be locked or unlocked when the SDC codes match and power is transferred to the merchandise security device. It is understood that various information and codes may be exchanged in order to perform the desired function, such as arming, disarming, locking, or unlocking the merchandise security device 14. For example, the data exchanged may include a serial number of the merchandise security device alone and/or an SDC.

Figure 11:
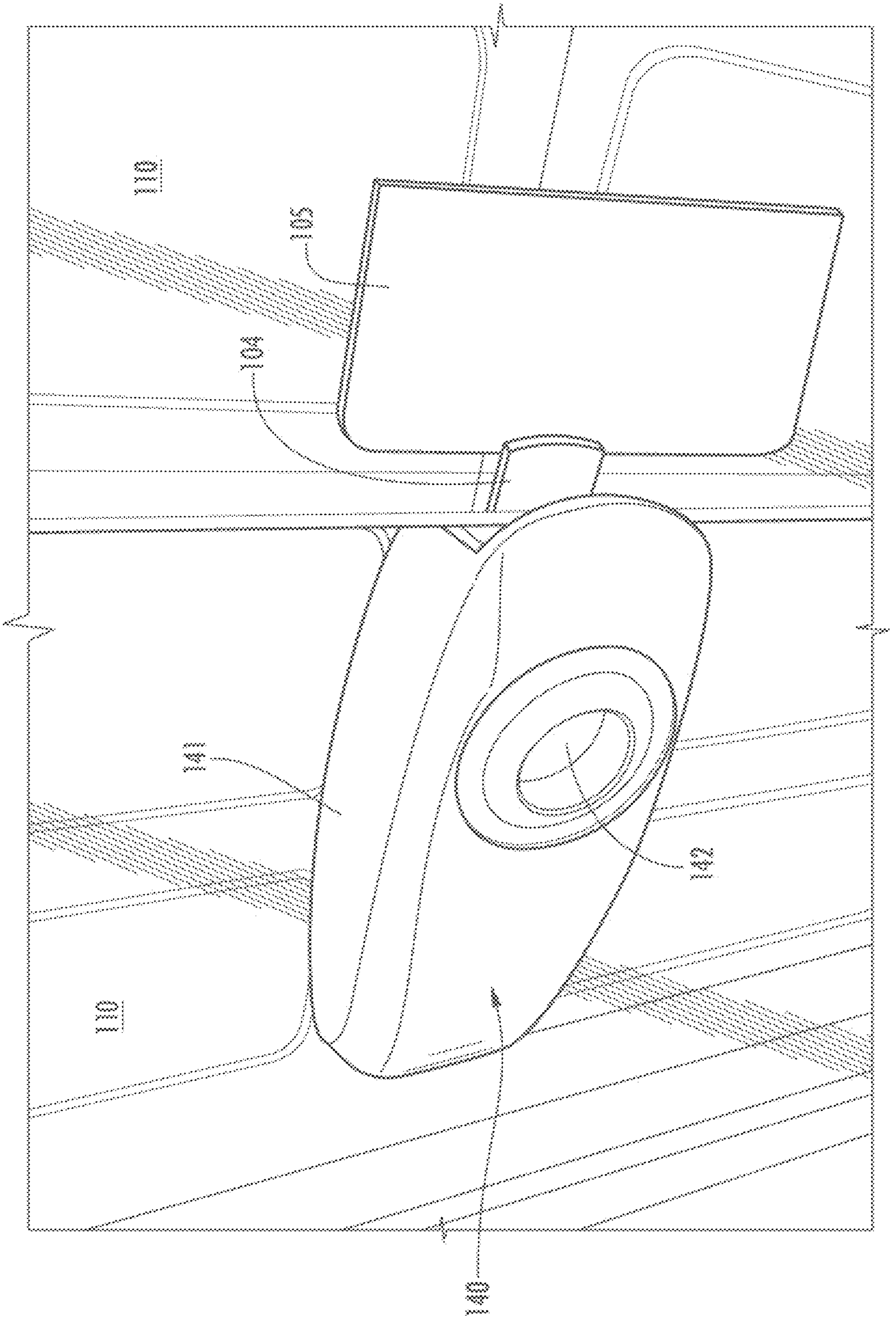
FIG. 11 is a perspective view of a merchandise security device according to one embodiment.

FIG. 11 shows one embodiment of a merchandise security device 140 in greater detail. As previously mentioned, the merchandise security device 14 can be any type of security device that utilizes an alarm circuit and/or a lock mechanism that locks and/or unlocks a lock. In some cases, the merchandise security device 140 may be a passive device in the sense that it does not have an internal power source sufficient to operate a lock mechanism. As a result, the merchandise security device 140 may be configured to receive power, or alternatively, both power and data, from an external source, such as the electronic key 12 shown and described herein. The embodiment of the merchandise security device depicted in FIG. 11 is a cabinet lock configured to be securely affixed to the locking arm 104 of a conventional cabinet lock bracket 105. As previously described, the cabinet lock 140 may include a logic control circuit for performing a handshake communication protocol with the logic control circuit of the key 12 and for receiving the SDC from the key. In other embodiments, the cabinet lock 140 may be configured to transmit the SDC to the key 12 to authenticate the security device and thereby authorize the key to transfer power to the security device.

Figure 12:
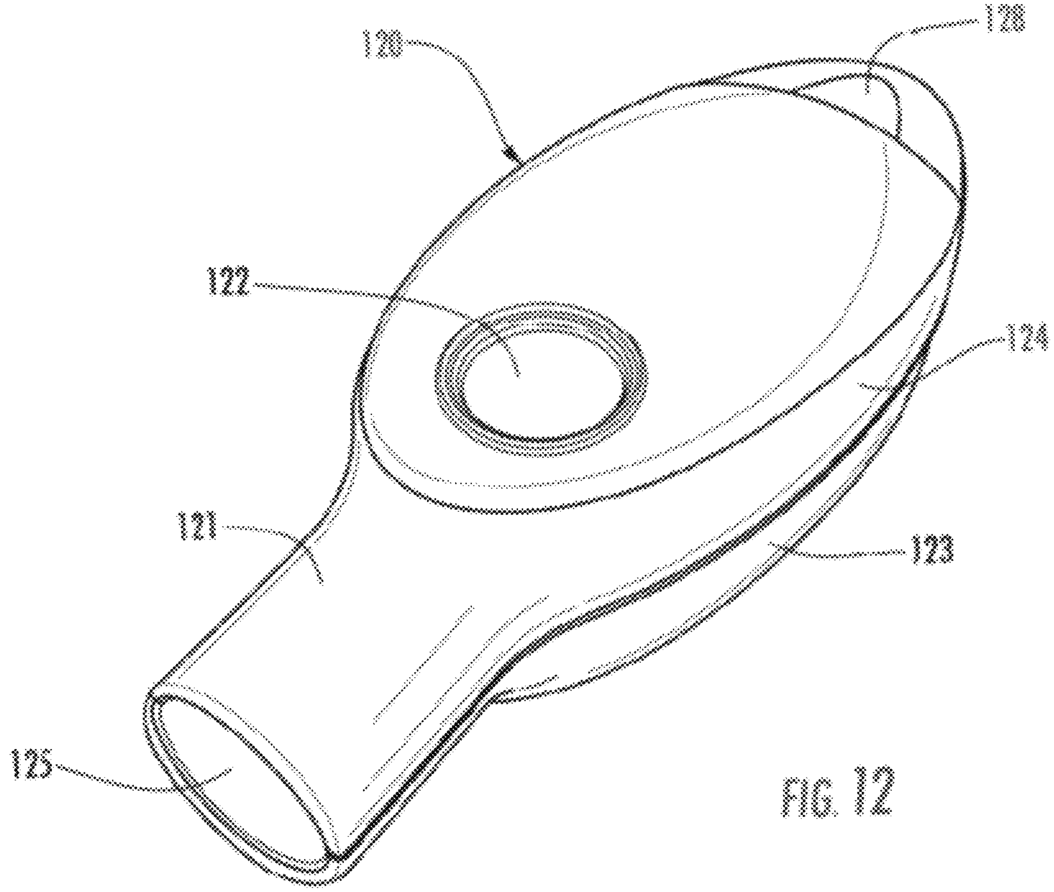
FIG. 12 is a perspective view of an electronic key according to one embodiment.

FIG. 12 shows an embodiment of an electronic key 120 with inductive transfer in greater detail. As previously mentioned, the key 120 may be configured to transfer both data and power to a merchandise security device 140. Accordingly, the programmable electronic key 120 may be an active device in the sense that it has an internal power source sufficient to operate a mechanical lock mechanism of the merchandise security device 140. As a result, the programmable electronic key 120 may be configured to transfer both data and power from an internal source, such as a logic control circuit (e.g., data) and a battery (e.g., power) disposed within the key. The embodiment of the programmable electronic key 120 depicted herein is a key with inductive transfer capability configured to be received within a transfer port 142 of the cabinet lock 140 shown in FIG. 11, as well as a programming port 46 of the programming station and the charging port 30 of the charging station. Thus, the electronic key 120 may be placed proximate to or within the transfer port 142 for communicating therewith. In some embodiments, a tag (e.g., RFID or NFC tag) as discussed above, may be positioned within the transfer port, or otherwise on the security device 140, so that the electronic key 120 is configured to read or otherwise obtain identification data from the tag.

In some embodiments, the electronic key 120 comprises a housing 121 having an internal cavity or compartment that contains the internal components of the key, including without limitation the logic control circuit, memory, communication system and battery, as will be described. As shown, the housing 121 is formed by a lower portion 123 and an upper portion 124 that are joined together after assembly, for example by ultrasonic welding. The electronic key 120 further defines an opening 128 at one end for coupling the key to a key chain ring, lanyard or the like. The electronic key 120 may further comprise a transfer probe 125 located at an end of the housing 121 opposite the opening 128 for transferring data and/or power to the merchandise security device 140. The transfer probe 125 is also operable to transmit and receive a handshake communication protocol and the SDC from the programming station 16, as previously described, and to receive power from a charging station.

Figure 13:
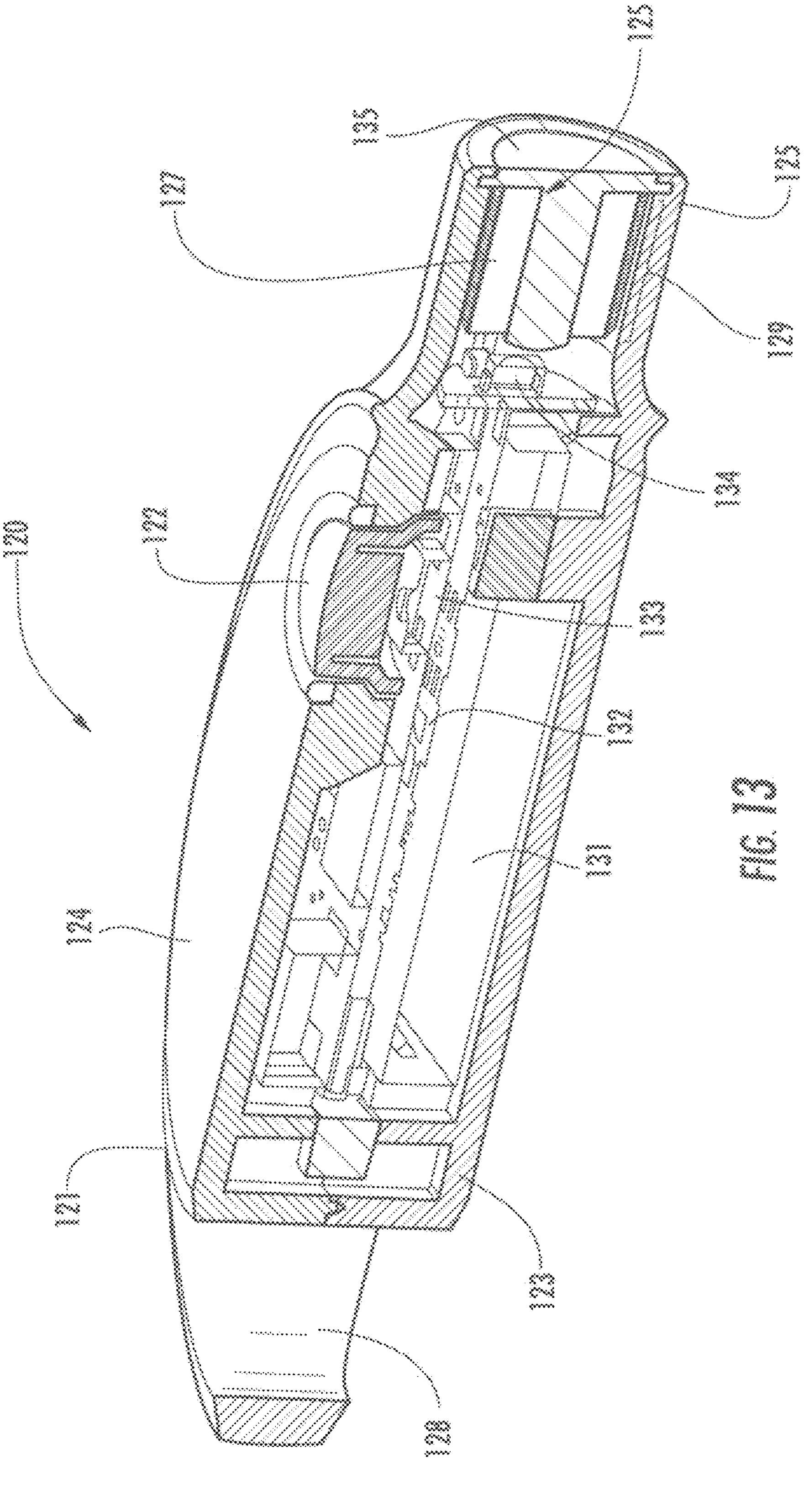
FIG. 13 is a cross-sectional view of the electronic key shown in FIG. 12.

As best shown in FIG. 13, an internal battery 131 and a logic control circuit, or printed circuit board (PCB) 132 are disposed within the housing 121 of the electronic key 120. Battery 131 may be a conventional extended-life replaceable battery or a rechargeable battery suitable for use with the charging station 18. The logic control circuit 132 is operatively coupled and electrically connected to a switch 133 that is actuated by the control button 122 provided on the exterior of the key 120 through the housing 121. Control button 122 in conjunction with switch 133 controls certain operations of the logic control circuit 132, and in particular, transmission of the data and/or power. In that regard, the logic control circuit 132 is further operatively coupled and electrically connected to a communication system 134 for transferring data and/or power. In one embodiment, the communication system 134 is a wireless infrared (IR) transceiver for optical transmission of data between the electronic key 120 and the programming station, and between the key and the merchandise security device 140. As a result, the transfer probe 125 of the key 120 may be provided with an optically transparent or translucent filter window 135 for emitting and collecting optical transmissions between the key 120 and the programming station 16, or between the key and the merchandise security device 140, as required. Transfer probe 125 may further comprise an inductive core 127 and inductive core windings 129 for transferring electrical power to the merchandise security device 140 and/or receiving electrical power from the charging station 18 to charge the internal battery 131, as required. Alternatively, the optical transceiver 134 may be eliminated and data transferred between the programmable electronic key 120 and the merchandise security device 140 via magnetic induction through the inductive coil 126.

In some embodiments, an important aspect of an electronic key 120, especially when used for use in conjunction with a merchandise security device 140 as described herein, is that the key does not require a physical force to be exerted by a user on the key to operate the mechanical lock mechanism of the merchandise security device. By extension, no physical force is exerted by the key 120 on the mechanical lock mechanism. As a result, the key 120 cannot be unintentionally broken off in the lock, as often occurs with conventional mechanical key and lock mechanisms. Furthermore, neither the key 120 nor the mechanical lock mechanism suffer from excessive wear as likewise often occurs with conventional mechanical key and lock mechanisms. In addition, in some cases there is no required orientation of the transfer probe 125 of the electronic key 120 relative to the ports on any one of the programming station, charging station, and/or the merchandise security device 140. Accordingly, any wear of the electrical contacts on the transfer probe 125 and ports may be minimized. As a further advantage in some embodiments, an authorized person is not required to position the transfer probe 125 of the electronic key 120 in a particular orientation relative to the transfer port 142 of the merchandise security device 140 and thereafter exert a compressive and/or torsional force on the key to operate the mechanical lock mechanism of the device.

Figure 22:
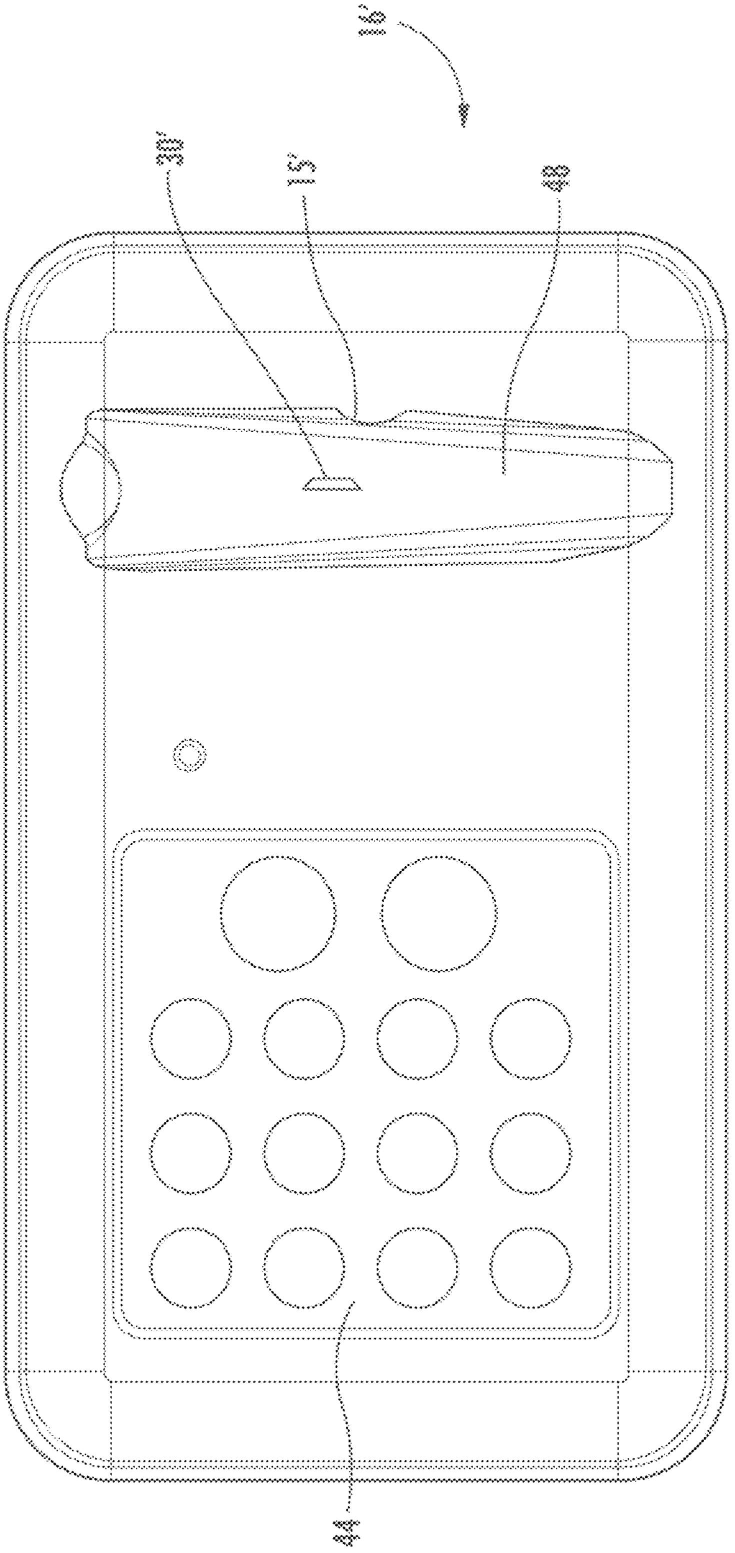
FIG. 22 is a plan view of a programming or authorization station according to one embodiment.
Figure 23:
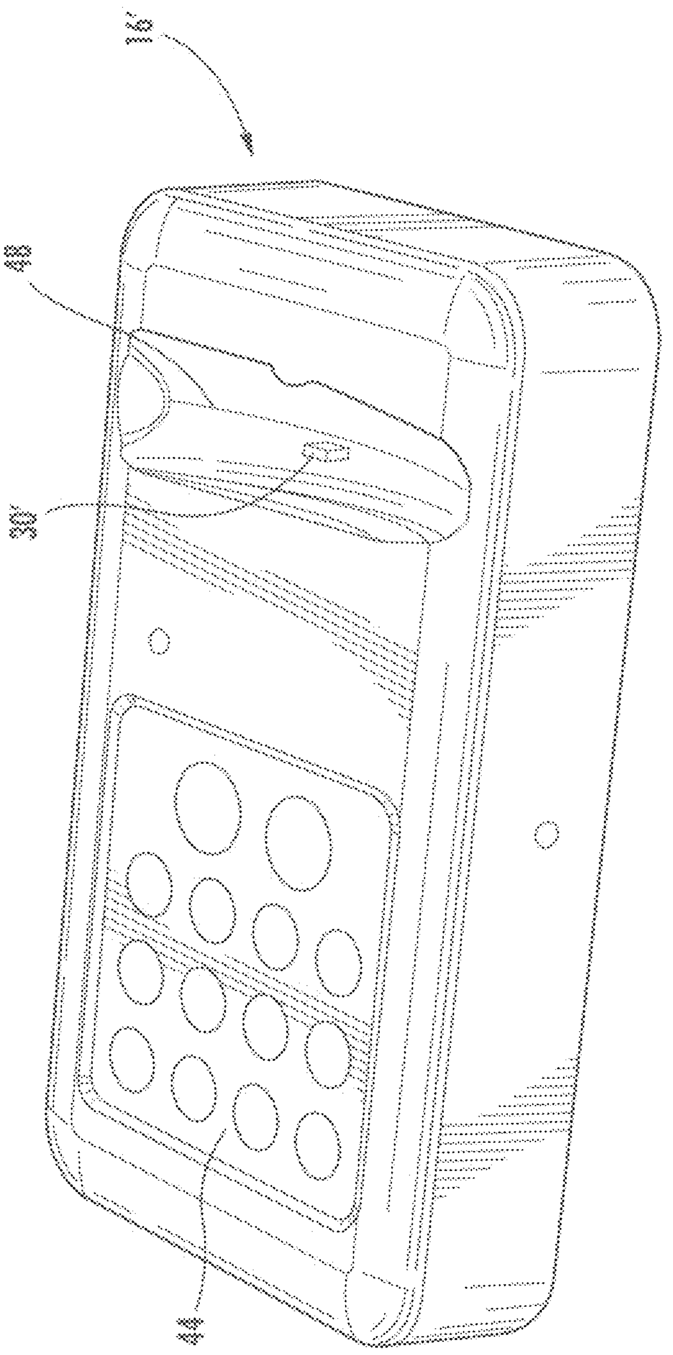
FIG. 23 is a perspective view of the programming or authorization station shown in FIG. 22.
Figure 24:
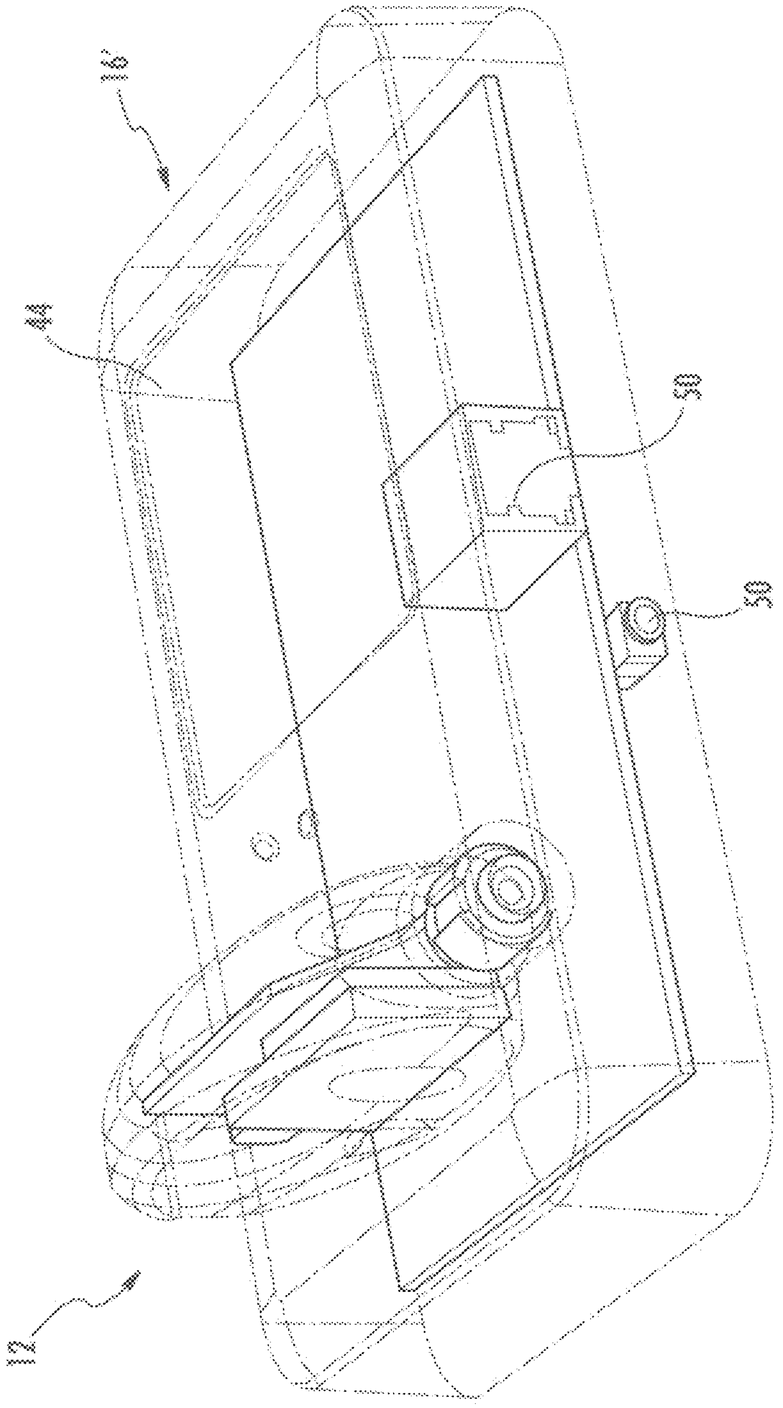
FIG. 24 is another perspective view of the programming or authorization station shown in FIG. 22.

FIGS. 22-24 illustrate an embodiment of a programming or authorization station 16'. As illustrated, the programming or authorization station 16' includes a geometry for receiving the electronic key 12' as discussed above (see, e.g., FIG. 21). In this regard, the programming or authorization station 16' may include one or more alignment features 15' configured to align with and engage alignment feature 15 of the electronic key 12'. Moreover, the programming or authorization station 16' may further define a recess 48 for at least partially receiving a side surface of the electronic key 12'. The recess 48 may be curved or any other shape for corresponding to the shape of the electronic key 12'. Within the recess 48, the programming or authorization station 16' may include a port 30' for releasably engaging the input port 17 of the electronic key 12'. The alignment features 15, 15' are configured to align with one another to ensure that the input port 17 and port 30' align with and engage one another. Such engagement may allow for data communication between the electronic key 12' and the programming or authorization station 16', which may occur in some cases, upon entry of an authorized code using keypad 44. In addition, the programming or authorization station 16' may include one or more input ports 50 for receiving power and data communication (e.g., an Ethernet port).

FIG. 1 shows a charging station 18 in greater detail. As previously mentioned, the charging station 18 recharges the internal battery 131 of the key 12. In certain instances, the charging station 18 also deactivates the data transfer and/or power transfer capability of the key 12 until the key has been reprogrammed with the SDC by the programming station 16 or the user provides an authorized code to the charging station. Regardless, the charging station 18 comprises a housing for containing the internal components of the charging station. The exterior of the housing has at least one, and preferably, a plurality of charging ports 30 formed therein that are sized and shaped to receive the electronic key 12 (see, e.g., FIG. 1). Mechanical or magnetic means may be provided for properly positioning and securely retaining the key 12 within the charging port 18 for ensuring proper power transfer.

Figure 16:
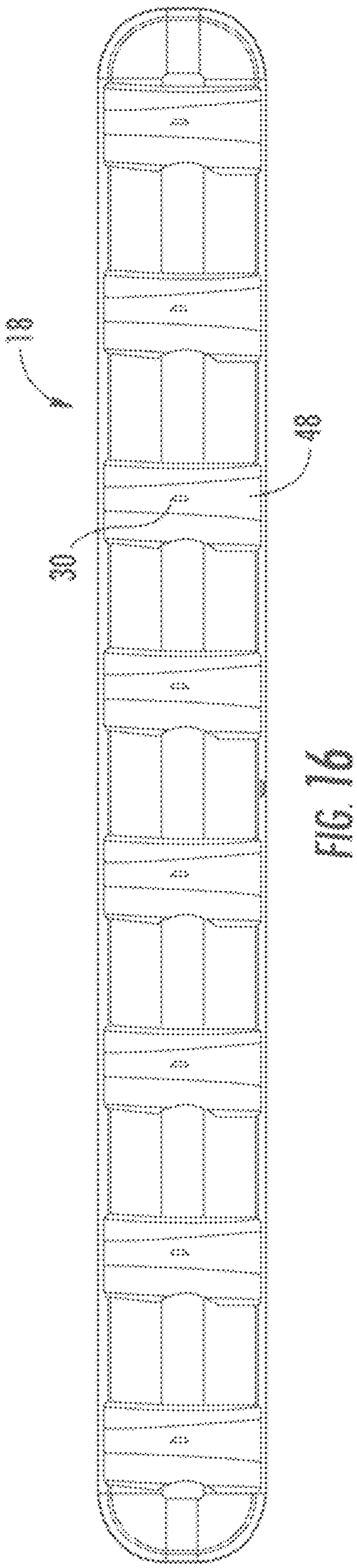
FIG. 16 is a plan view of a charging station according to one embodiment.
Figure 17:
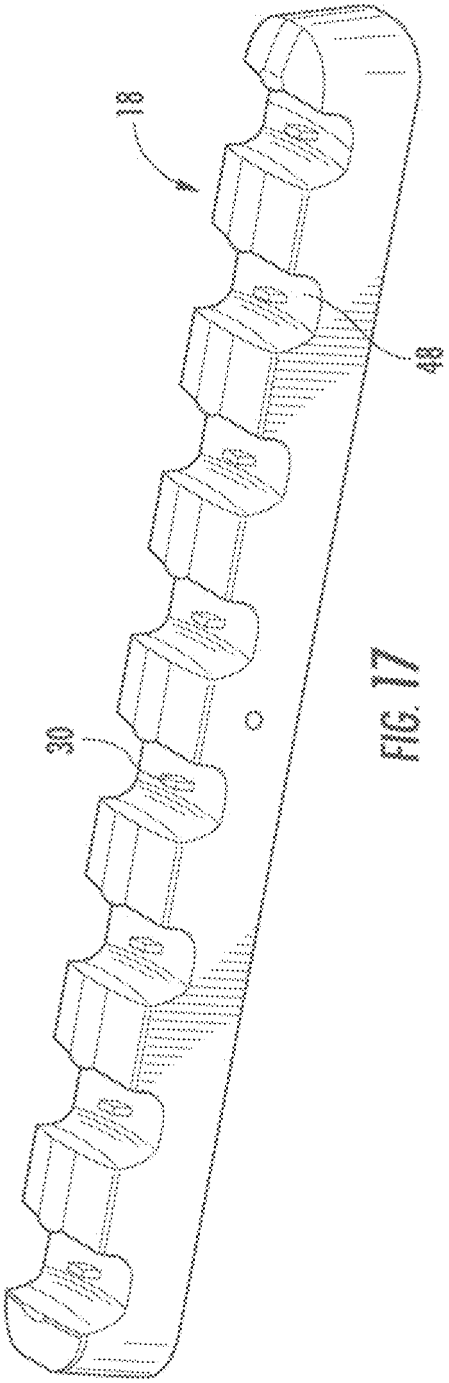
FIG. 17 is a perspective view of the charging station shown in FIG. 16.
Figure 18:
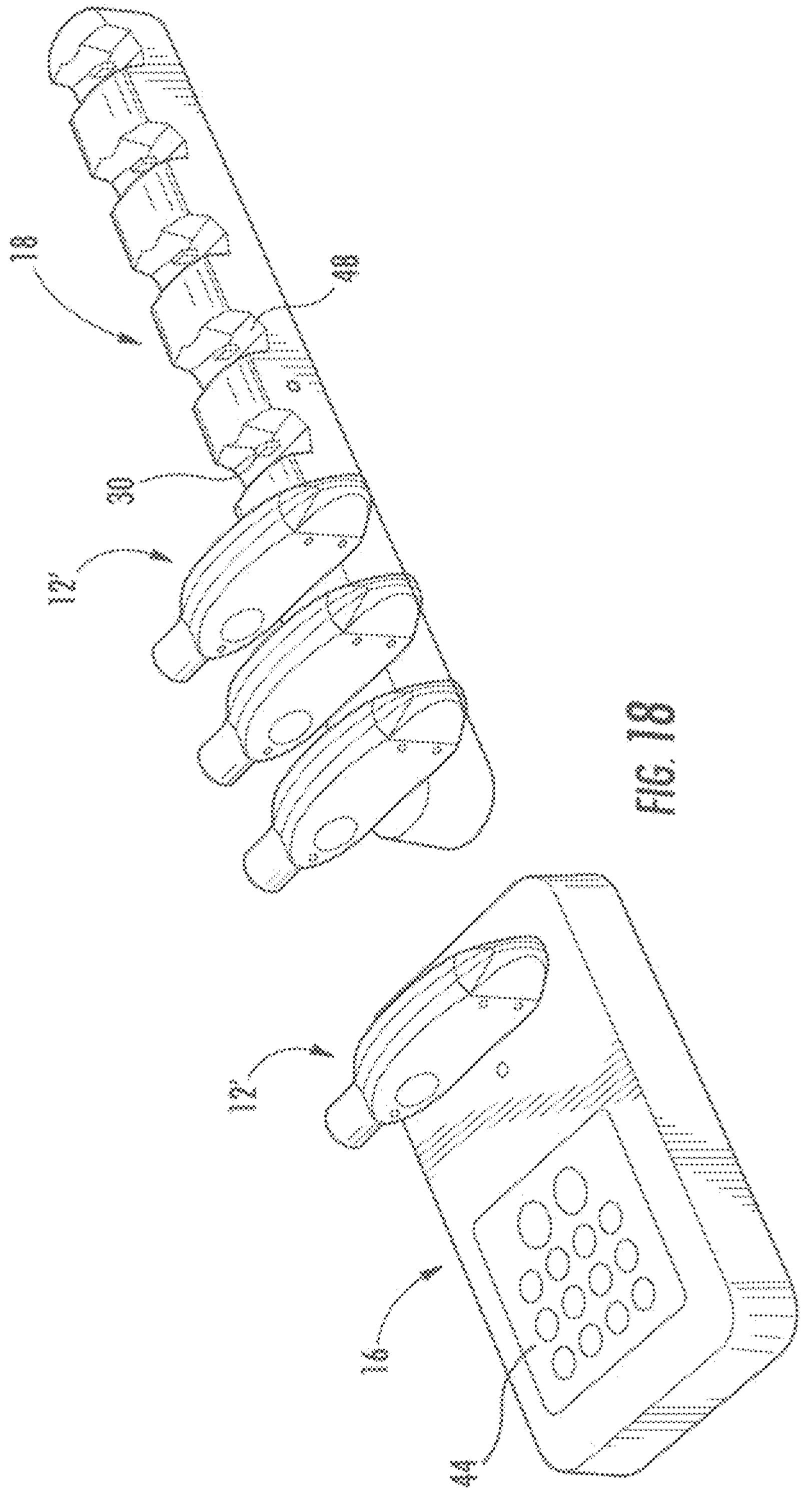
FIG. 18 illustrates a merchandise security system according to one embodiment.
Figure 19:
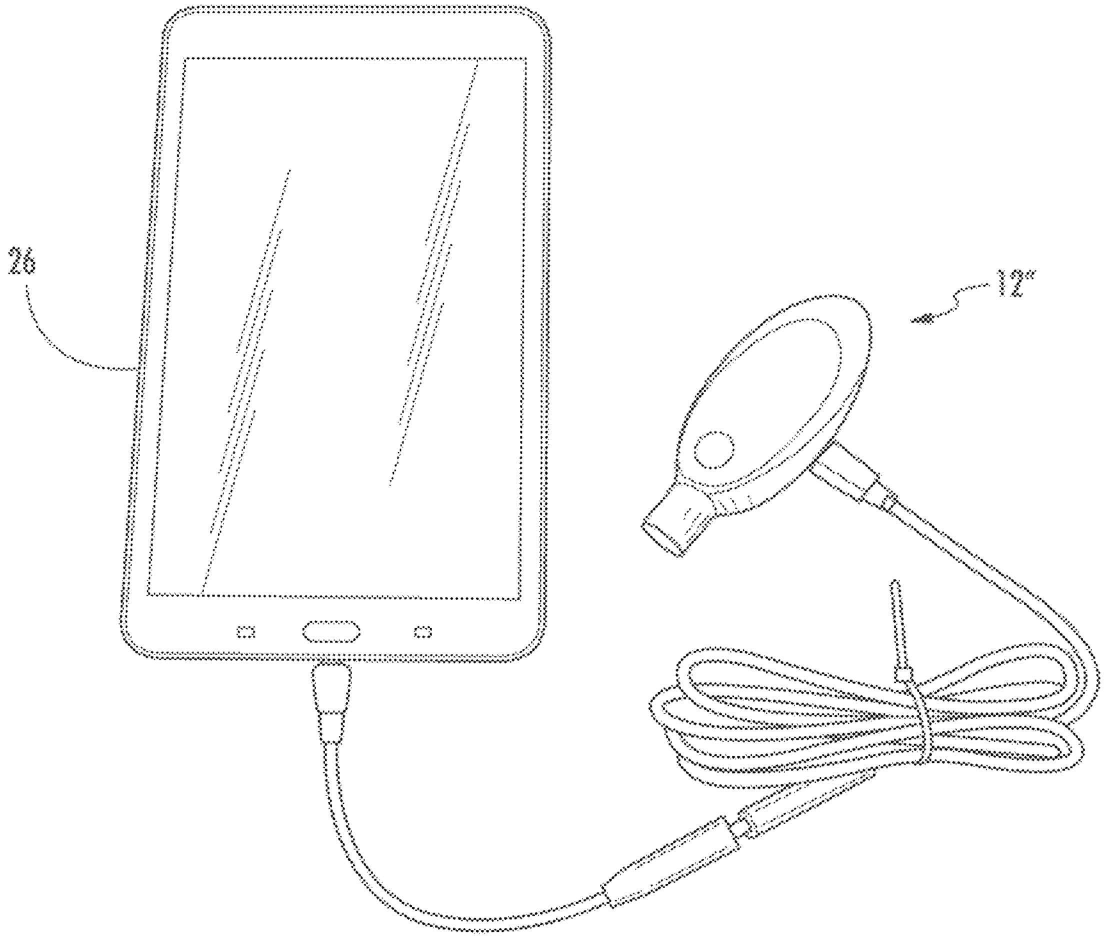
FIG. 19 illustrates an electronic key in communication with a computing device according to one embodiment.

FIGS. 16-18 show an embodiment of a charging station 18 wherein a plurality of ports 30 are provided for engagement with a plurality of corresponding electronic keys 12'. The electronic key 12' shown in FIG. 21 may be compatible with the charging station 18 shown in FIGS. 16-18 whereby the electronic key 12' includes an input port 17 on its side for engagement with the port 30, similar to that described in conjunction with programming or authorization station 16'. Likewise, each port 30 may be located within a respective recess 48 for receiving at least a side surface of the electronic key 12'. This arrangement may allow for a greater number of electronic keys 12' to be engaged with the charging station 18 at any one time.

Figure 14:
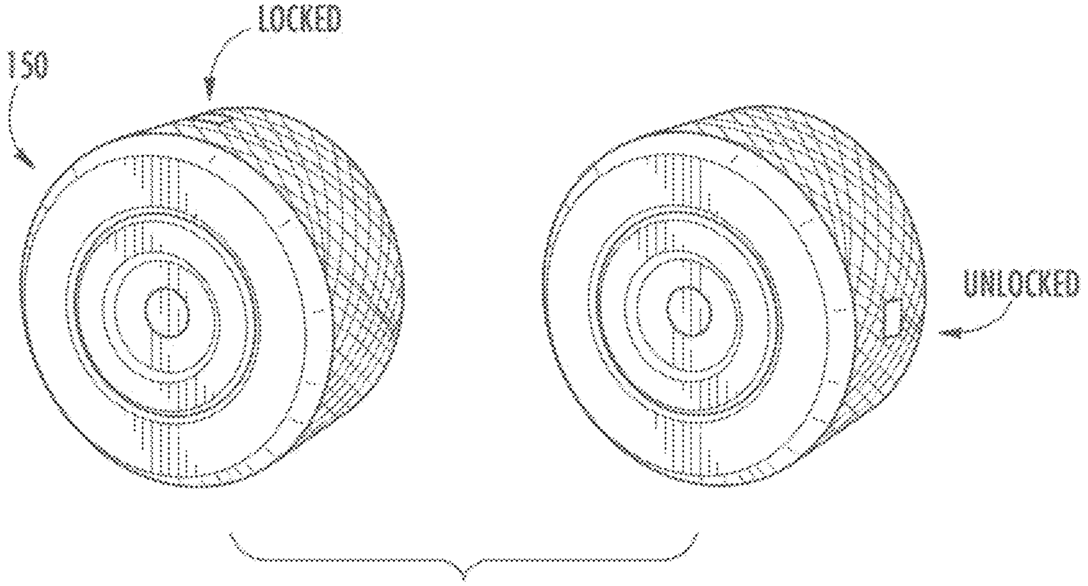
FIG. 14 is a perspective view of a merchandise security device in a locked and unlocked position according to one embodiment.
Figure 15:
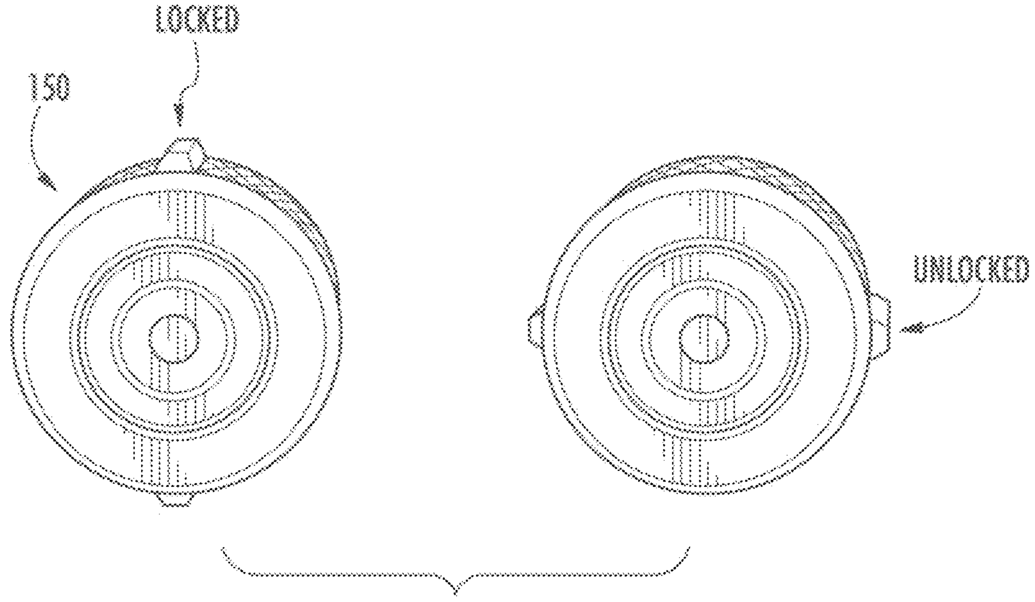
FIG. 15 is a perspective view of a merchandise security device in a locked and unlocked position according to another embodiment.

FIGS. 14-15 show additional embodiments of a merchandise security device 150. In this embodiment, the merchandise security device 150 comprises a lock mechanism that utilizes "energy harvesting". Thus, the merchandise security device 150 may be a passive device as described above. However, in this embodiment, the merchandise security device 150 includes means for generating power to be stored. For example, the merchandise security device 150 may be configured to rotate between locked and unlocked positions and include a generator configured to generate energy to be stored (e.g., via a capacitor). In some cases, the merchandise security device 150 may include a bezel and each turn of the bezel may generate an electrical charge to be stored. In one embodiment, the electronic key 12 may be used initially to disengage a mechanical lock, and then the merchandise security device 150 may be rotated to an unlocked position. The merchandise security device 150 may then be rotated back to the locked position. Since the merchandise security device 150 has no power source, the security device is capable of performing various security functions using the stored power. For instance, the merchandise security device 150 may be configured to use the stored power to push data to one or more nodes 20 or to generate audible and/or visible signals. In one example, the merchandise security device 150 may include an internal radio for transmitting wireless signals using the stored power, such as for generating a distress signal when the security device is tampered with. In another example, the merchandise security device 150 may include a light-emitting device (LED) that is powered by the stored power.

Figure 25:
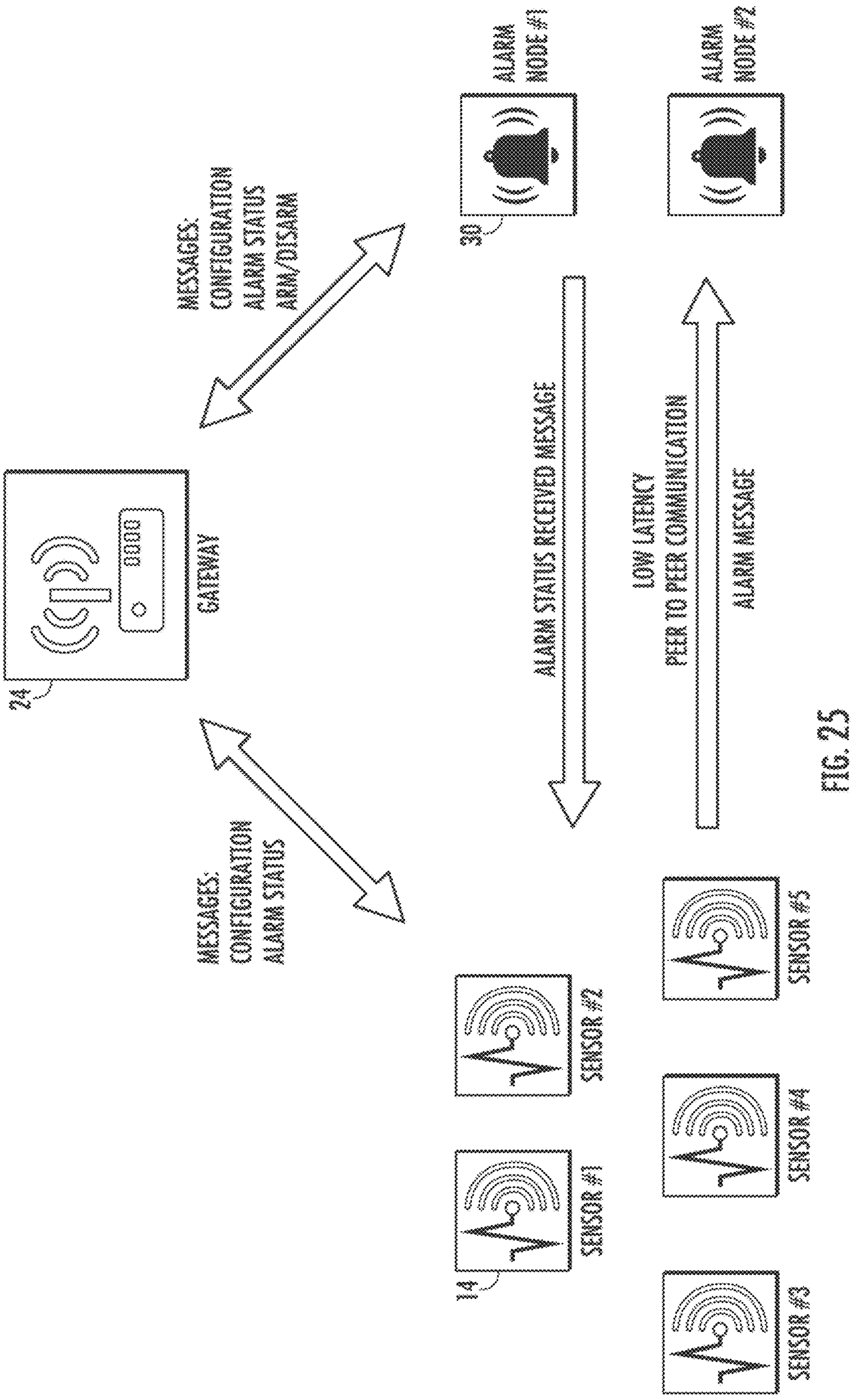
FIG. 25 is a schematic illustration of a plurality of sensors and alarm nodes communicating in a wireless network according to one embodiment.
Figure 26:
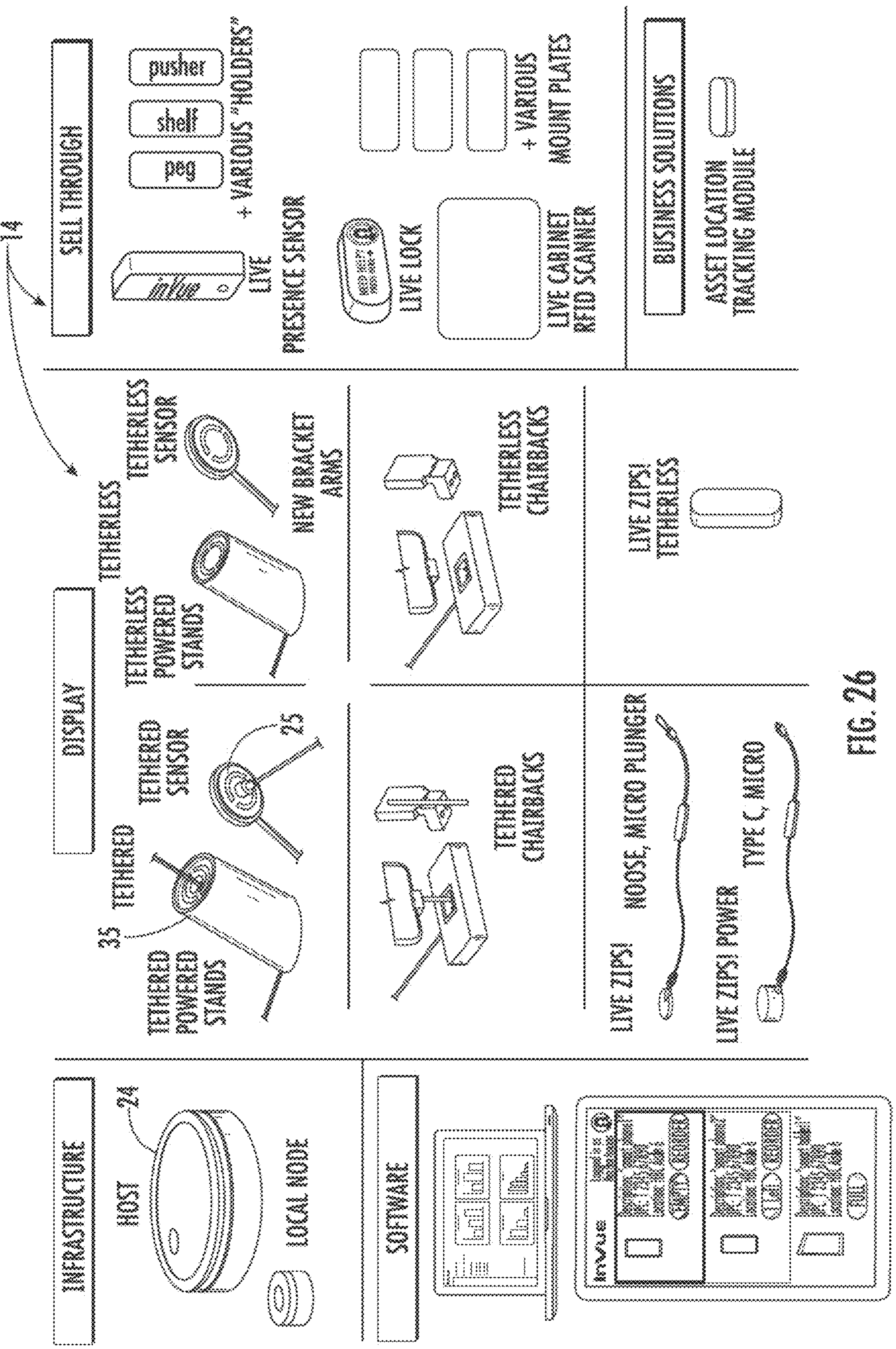
FIG. 26 is a schematic of infrastructure and security devices within a wireless network according to one embodiment of the present invention.

In another embodiment, a plurality of nodes are employed for peer-to-peer communication to facilitate the generation of an alarm signal, such as audible and/or visible signals. For example, FIG. 25 shows a plurality of merchandise security devices 14 (e.g., sensors) and alarm nodes 30 configured to wirelessly communicate various information to a gateway 24 via a network. For example, the sensors 14 and/or nodes 30 may be configured to send information to and receive information from the gateway 24 regarding their configuration, alarm status (e.g., alarming, armed, disarmed), and/or instructions (e.g., arm, alarm, or disarm). The merchandise security devices 14 and nodes 30 may also be configured to communicate directly with one another as described below, as well as to switch between communication with the gateway 24 and one another. Any number of nodes 30 could be located at various positions within a retail store, for example, such as on a display table or store entrance or exit. The nodes 30 may communicate wirelessly with merchandise security devices 14 and a gateway 24 within a network, such as described above using various wireless communication protocols. One disadvantage of using wireless communication to initiate the alarm at a location that is remote from the merchandise security device 14 is that the alarm signals often have to travel to a wireless hub where a server then deciphers the data and decides to send out an alarm signal to the appropriate alarm node. This kind of system may create latency in generating the alarm signal, particularly if the server is not local, and if any component of the wireless chain of communication is interrupted (e.g., the hub loses power), the alarm signal may never reach the alarm node and thus no alarm occurs. In one embodiment, multiple modes of communication may be used to reduce or eliminate these issues. For example, in addition to a first wireless communication protocol between the merchandise security devices 14 and gateway 24 and/or alarm nodes 30 and the gateway (e.g., WiFi, LoRa, etc.), a second wireless communication protocol may be used that is a direct node-to-node communication scheme between the merchandise security devices and the alarm nodes that does not have to also communicate with any hub or gateway. The communication protocols could be the same or different in some embodiments. In one example, the second wireless communication protocol could be performed using the same radio antennas that the other operational signals are communicated with the hub or gateway 24 (e.g., Wi-Fi, LoRa, etc.), which thereby adds no additional cost or size to either the merchandise security devices 14 and the alarm nodes 30 in order to accomplish the communication. However, a second radio is also an option. Additionally, the alarm signal could be broadcast on a different frequency than the other signals in order to address regional regulatory requirements and/or if it is detected or known that certain frequency bands are getting congested. This communication could be two-way, but one-way communication would be sufficient in most circumstances. The merchandise security device 14 may send out a "help me" signal in response to a security event. The alarm node 30 would then only have to "listen" for that signal and if it receives the signal, the alarm node may generate an alarm by whatever means it is programmed for (e.g., light, sound, vibration, etc.).

In some instances, a plurality of alarm nodes 30 may be used, and particular merchandise security device(s) 14 may be configured to activate specific alarm node(s). For example, in the instance where a retail store includes a plurality of display tables for a plurality of merchandise security devices 14, there may be an alarm node 30 associated with each table which would only be triggered by a "help me" signal from any one of the merchandise security devices associated with the same table. In this situation, an identifier (e.g., an ID code) could be added to the "help me" signal that corresponds to a code stored in the alarm node 30. Thus, the alarm node 30 may have to receive or identify its code in order to generate an alarm signal. This could be as simple as the code itself being the "help me" signal or some other instruction code could be added to or included with the identifier, for example, if more than one action (e.g., "alarm" or "stop alarming") needed to be communicated to the alarm node. The merchandise security device 14 may be configured to generate this "help me" signal immediately upon a breach, and only after sending the signal to the alarm node 30 would the merchandise security device then communicate via the wireless communication to a hub and gateway that a breach has occurred. Thus, the latency delay should be minimized in such a breach scenario.

The foregoing has described one or more exemplary embodiments of a merchandise display security system. Embodiments of a merchandise display security system have been shown and described herein for purposes of illustrating and enabling one of ordinary skill in the art to make, use and practice the invention. Those of ordinary skill in the art, however, will readily understand and appreciate that numerous variations and modifications of the invention may be made without departing from the spirit and scope thereof. Accordingly, all such variations and modifications are intended to be encompassed by the appended claims.

Referring to the following FIGS. 43-51 wherein identical reference numerals denote the same elements throughout the various views, the illustrated embodiments of methods and systems according to the present invention are capable of monitoring inventory of merchandise in a retail environment. The item of merchandise 12 may be any item, including any number of consumer products. The items of merchandise 12 may be packaged (or boxed) or non-packaged items. One or more items of merchandise may be placed on a retail fixture such as, for example, a shelf, pusher, display hook, or the like. In some embodiments, the retail fixture is similar to that described in U.S. Pat. No. 10,219,636, entitled Merchandise Display Hook Including an Anti-Sweep Mechanism, and U.S. Pat. No. 7,131,542, entitled Lockable Merchandise Display Hook, the disclosures of which are incorporated herein in their entireties. The system, indicated generally at 10, is operable for securing items of merchandise 12 from theft and/or monitoring inventory of items of merchandise. Although described in relation for use in a retail environment or store, the system 10 shown and described herein is suitable for monitoring and/or securing an item of merchandise 12 in other settings, such as for example, a residential or commercial environment, and is not intended to be limited to use only as a system for protecting against theft and/or monitoring inventory in a retail environment.

Figure 43:
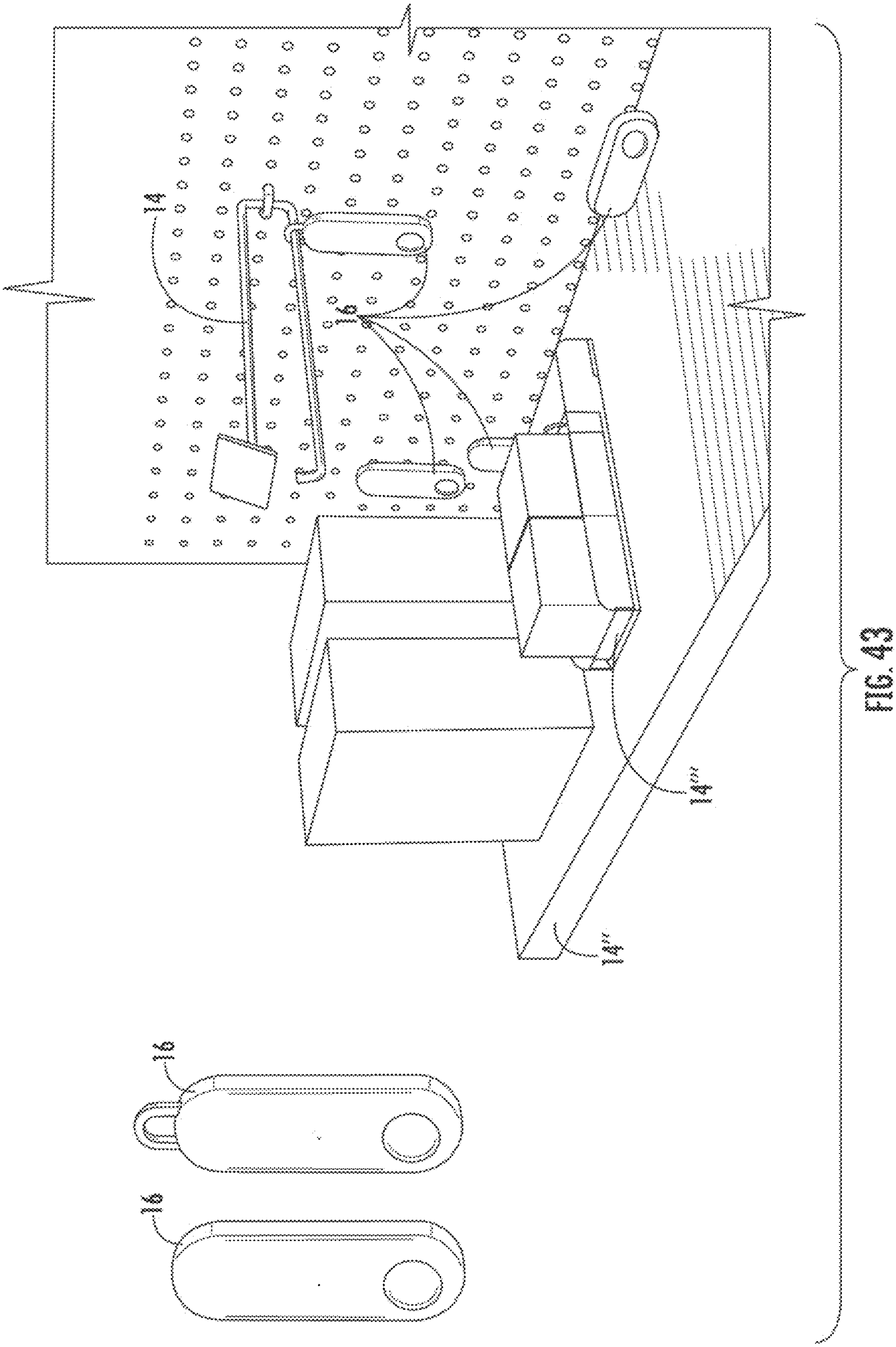
FIG. 43 is a perspective view of inventory detector system according to one embodiment of the present invention.
Figure 50:
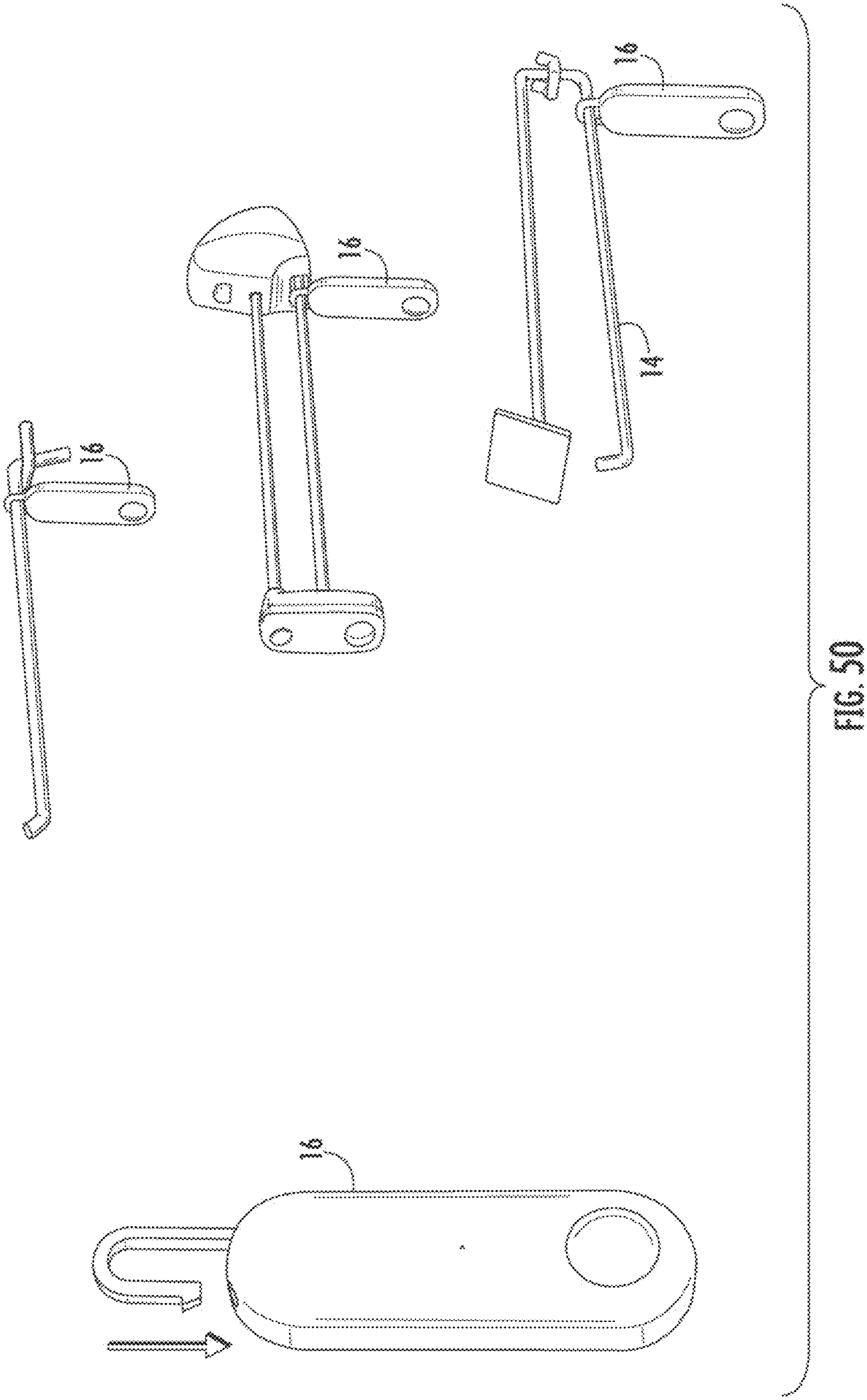
FIG. 50 shows a sensor of the inventory detector system of FIG. 43 that is configured for use on a variety of retail fixtures.
Figure 51:
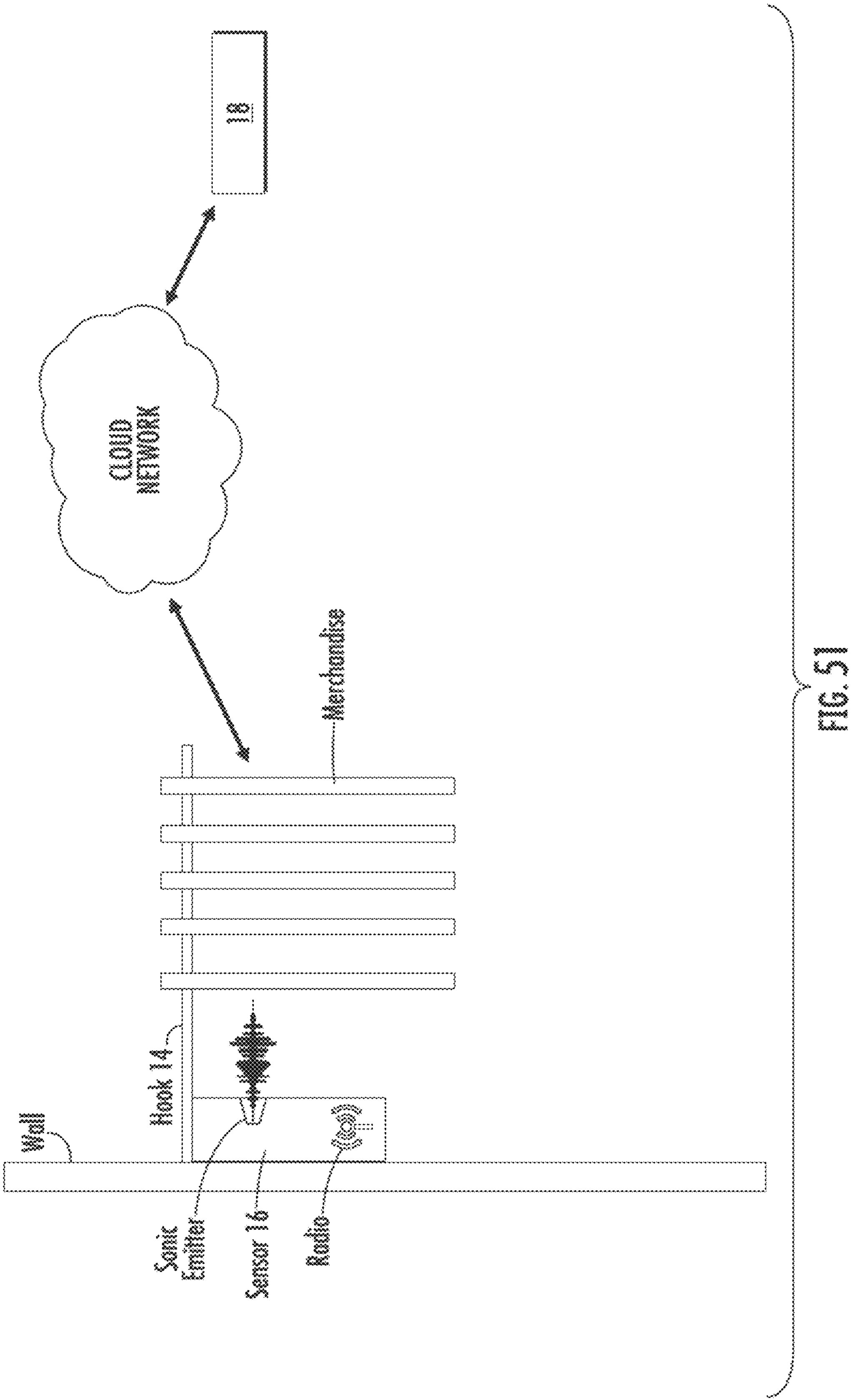
FIG. 51 is an example sensor of an inventory detector system according to one embodiment.

According to one embodiment, the system 10 generally comprises a retail fixture 14, a sensor 16, and a monitoring device 18. In some embodiments, the retail fixture 14 may be an existing or off-the-shelf device, and the sensor 18 is modular may be configured to be adapted to the retail fixture. For example, FIG. 43 shows a plurality of sensors 16 coupled to a variety of types of retail fixtures, including a display hook 14, shelf 14'', and pusher 14'''. The sensor 16 may be coupled to the retail fixture 14 in any desired manner, such as via adhesive or other fastener, or via hanging on a display hook. FIG. 50 further illustrates that the sensor 16 may be coupled to different types of display hooks by using a latch that is configured to clasp around a rod of the display hook. Advantageously, the sensor 16 is configured to be removably attached to the retail fixture 14 in a manner that does not hinder the experience of the retail fixture.

The monitoring device 18 may be any device (e.g., a hub, a computer, a server, and/or or cloud device) configured to communicate with one or more sensors 16. For instance, the monitoring device 18 may be a hub configured to communicate with a plurality of sensors 16. In other cases, the monitoring device 18 may be a computer (e.g., tablet, laptop, or desktop computer) that is configured to communicate with one or more sensors 16 and/or one or more hubs to facilitate data transfer (see, e.g., FIGS. 44-48 and 51). It is understood that any number of monitoring devices 18 may be employed in the system 10.

The sensor 16 and monitoring device 18 may include wireless communications circuitry for communicating with one another using any desired communications protocol (e.g., Bluetooth, LoRa, Wi-Fi, radiofrequency, etc.). The sensor 16 and monitoring device 18 may be located remotely from one another (e.g., the sensors may be located in a retail store, while the monitoring device may be at a location that is not in the retail store). In some cases, the monitoring device 18 may be located at some fixed location in proximity to one or more sensors 16. In other instances, the sensors 16 and the monitoring device 18 may communicate over a cloud network (see, e.g., FIG. 51).

There may be any number of sensors 16 used in the system 10 (e.g., hundreds, if not thousands in a large retail store) that are configured to communicate with one or more monitoring devices. In order to facilitate long range communications that could potentially have interference from various fixtures, products, and even people in a store, a communications scheme in the sub-gig range may be desirable in some embodiments (e.g., the LoRa protocol). Long range communication protocols of this nature may minimize repeaters and a more difficult initial setup, as well as help maintain connectivity when the sensors 16 are moved around in the store at some point after installation. In one embodiment, the sensor 16 may require authorization to facilitate communication with the monitoring device 18. For example, the sensor 16 may receive an authorization signal via a long-range communication signal from the monitoring device 18 to activate the sensor. Another signal could also be sent from the monitoring device 18 to the sensor instructing the sensor to deactivate. Despite the foregoing, it is understood that the sensor 16 and monitoring device 18 may communicate via wired means if desired. In some embodiments, the sensor 16 may be configured to communicate with a key configured to activate, unlock, and/or reset the sensor. For example, the key could be similar to that disclosed in U.S. Publ. No. 2011/0254661, entitled Programmable Security System and Method for Protecting Merchandise, the disclosure of which is incorporated herein by reference in its entirety.

The sensor 16 may utilize various sensing techniques to determine if items of merchandise are located on the retail fixture 14. For example, the sensor 16 may employ sonic time of flight, light, and/or ultrasonic signals. In one particular example, ultrasonic frequencies may be used to measure the time of flight of the sound pulse. In other cases, the sensor 16 is configured to emit a light signal (e.g., infrared) that is used to obtain a distance measurement.

The sensor 16 may include an emitter configured to emit a signal (e.g., sound or light) that is configured to bounce off an item of merchandise present on the retail fixture 14 and then return to the emitter. Using the speed of the signal and the time between the ping, the return distance can be measured. With a known retail fixture 14 size (e.g., a length of a locking hook), the presence of an item of merchandise on the retail fixture can be calculated. In some cases, distance could also be measured based on the return signal, which could be used to determine how many items of merchandise are located on a particular retail fixture 14. In another example, the sensor 16 may use sonic power (amplitude) for determining the presence of items of merchandise on the retail fixture 14. In this embodiment, the sensor 16 may be configured to measure the decay of amplitude of the returning signal. The further the wave travels, the lower the power level becomes. By setting an expected threshold for decay, one could determine if the retail fixture 14 is empty.

The sensor 16 may have a power source (e.g., battery) for providing power for operating the wireless communications circuitry, as well as any other components requiring power (e.g., an emitter). In one embodiment, the sensor 16 may be configured to "wake up" from a sleep state only periodically to take a measurement of what is on the retail fixture 14. This could be a predefined time period, such as every 15 minutes, or it could have a more sophisticated control. For example, the sensor 16 could be programmed to wake up more often during peak times of the day and wake up less often (or not at all) during certain hours (e.g., after hours). For instance, the sensor 16 may have a clock time link via the monitoring device 18 to know what time of day it is. This schedule could also be set automatically by the system 10 (as opposed to a user-inputted schedule) by the system watching and learning over time about what times a particular position is out of stock ("OOS") and adjusting the scanning schedule appropriately. These systems will help the retailers maintain appropriate stock levels while not requiring the sensor 16 to have external power, a large battery, or a short life. In some cases, the sensor 16, upon waking up and knowing the retail fixture 14 is empty, could enter into a higher-scan mode (e.g., scanning more frequently than the standard predefined time period) for some specified period of time. It may be critical to retailers to know how long it takes to restock an empty retail fixture position so that they can put policies in place to decrease that time. The high-scan mode can be used to measure when the position is restocked and report that to the system 10. In another embodiment, the sensor 16 may be configured to detect removal or movement of the sensor itself, which may be indicative of tampering or for auditing purposes.

In some embodiments, a plurality of sensors 16 may communicate with one monitoring device 18. Thus, the monitoring device 18 may be configured to monitor a plurality of signals provided by the sensors 16 and to determine inventory levels. In some instances, each sensor 16 may be wirelessly paired to a monitoring device 18, such as, for example, via Bluetooth communication. Pairing may include the exchange of a particular code or identifier that associates a sensor 16 with a monitoring device 18. An authorized user may initiate communication between a sensor 16 and a monitoring device 18 for pairing or unpairing with one another, such as by pressing an actuator on the sensor and/or the monitoring device. Therefore, any number of sensors 16 may be added to or removed from the system 10, and likewise a plurality of monitoring devices 18 may be employed.

Figure 44:
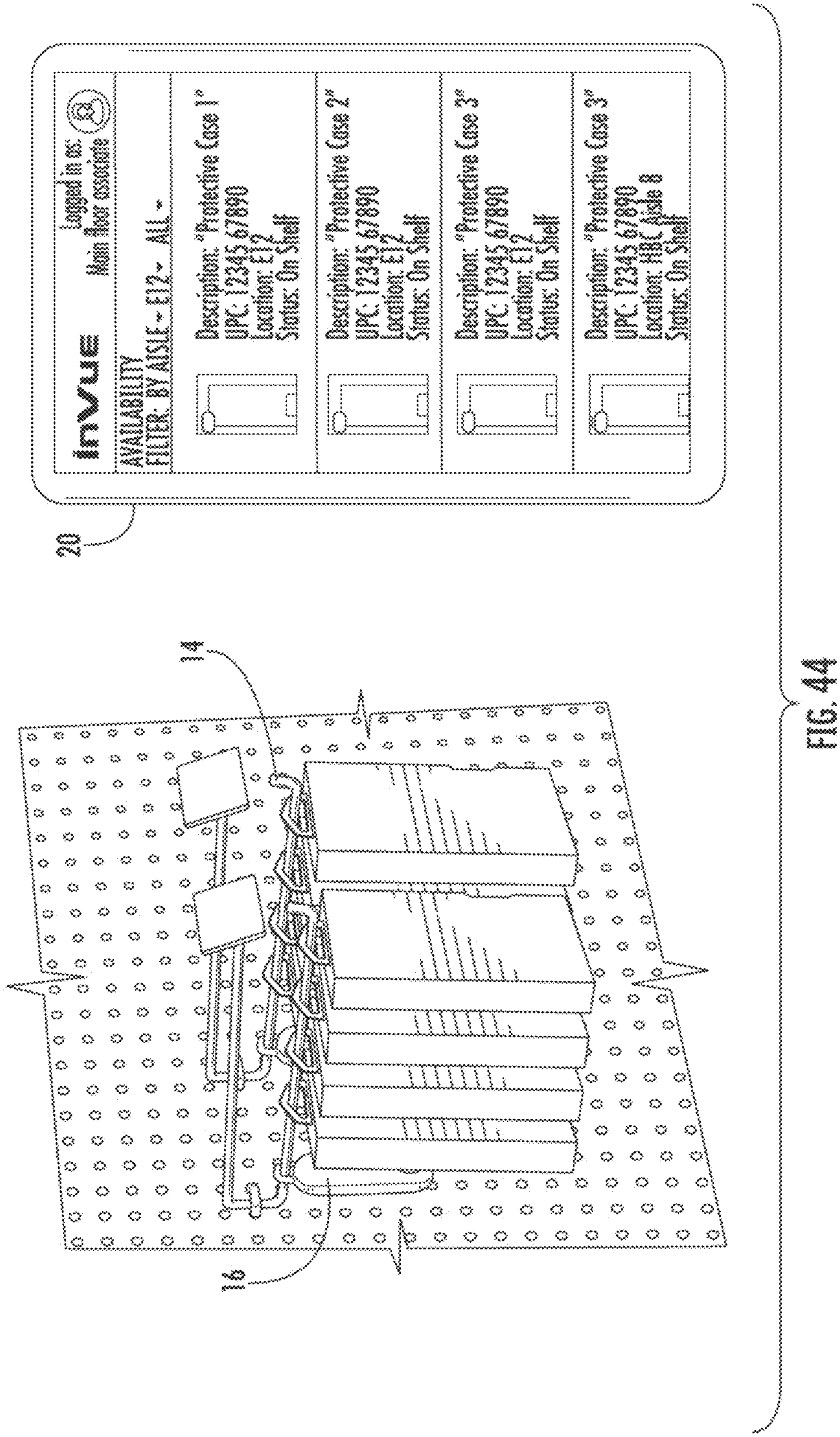
FIGS. 44-46 illustrate various views of a sensor communicating with a remote device according to embodiments of the present invention of an inventory detector system.
Figure 45:
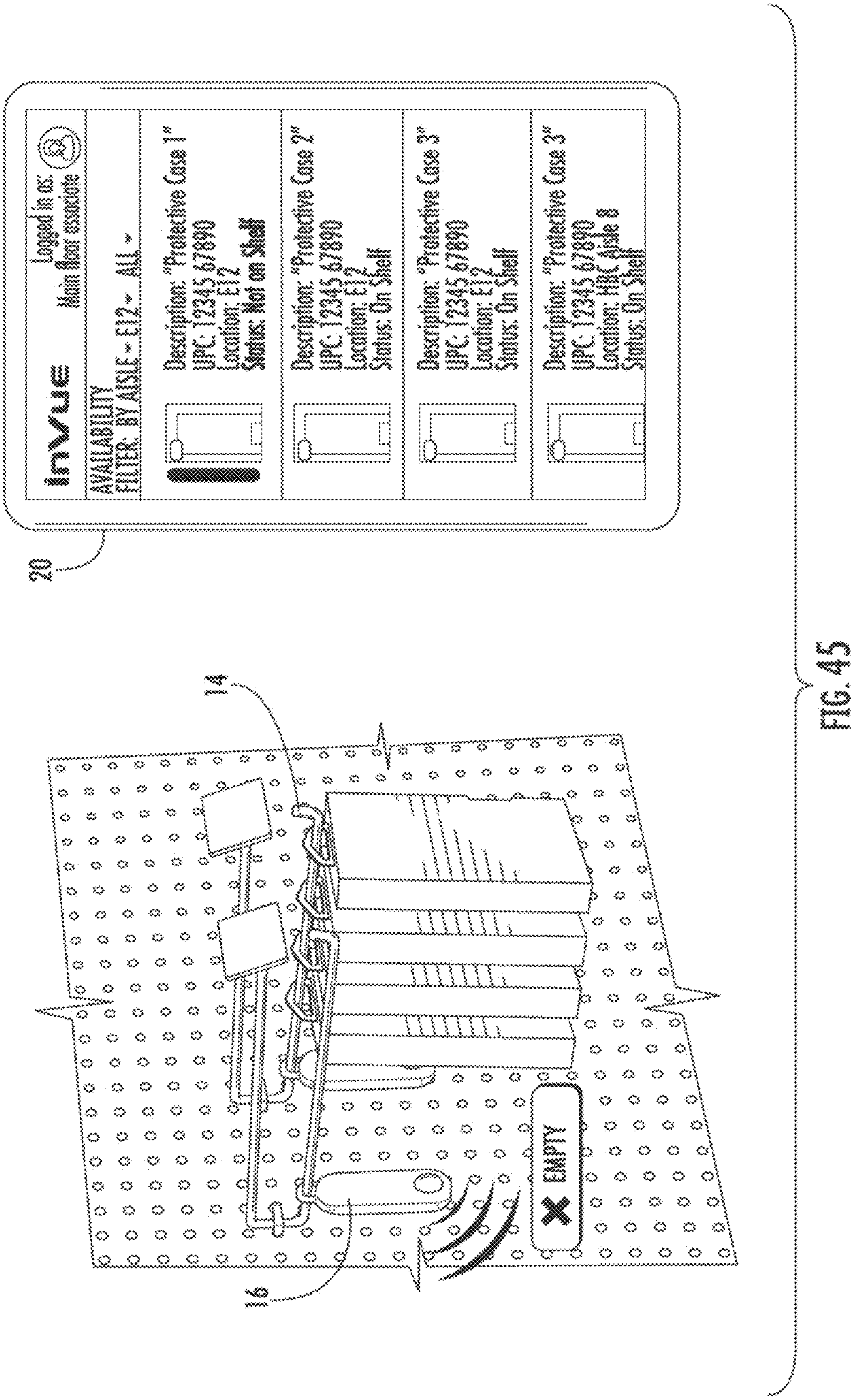
Figure 46:
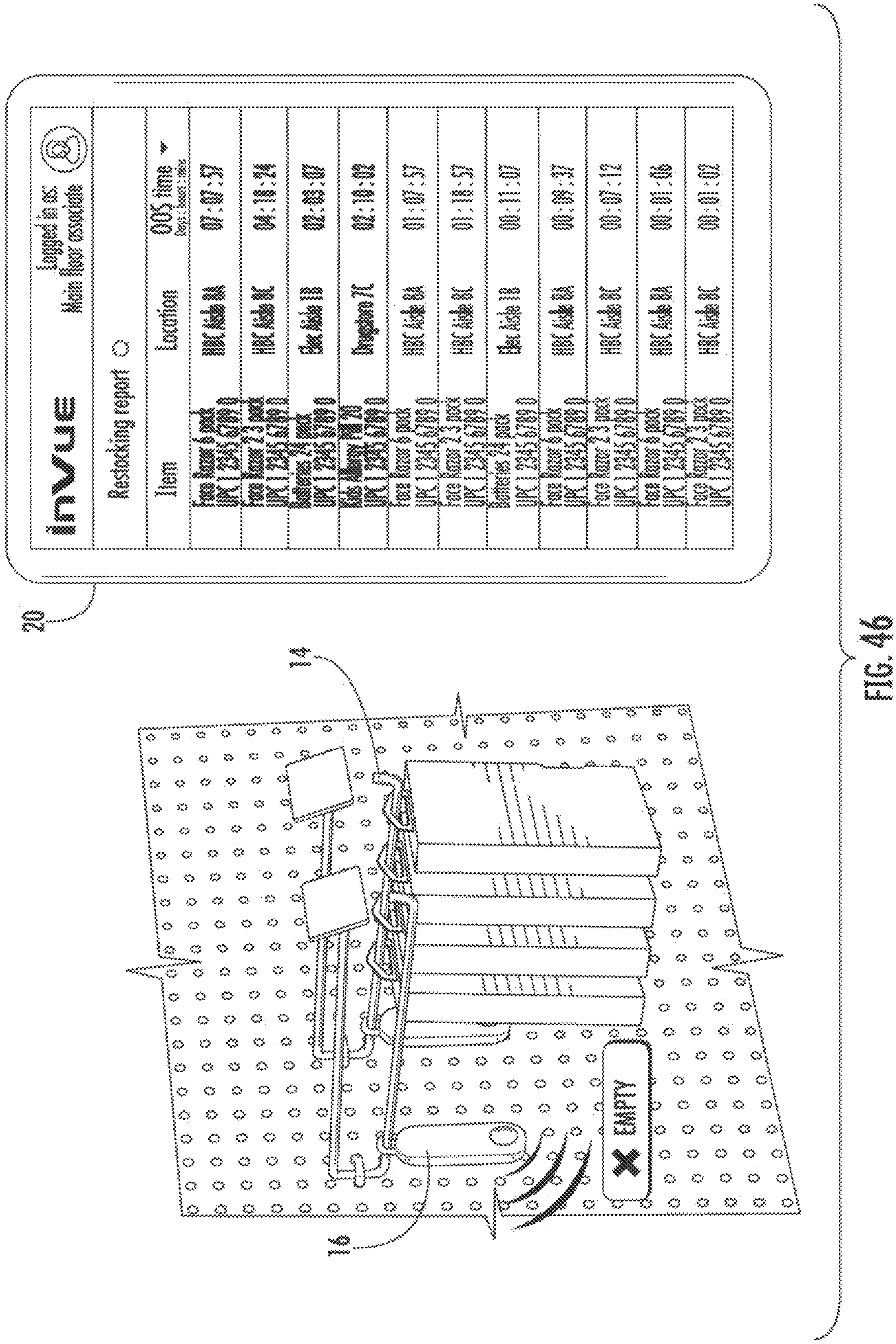
Figure 47:
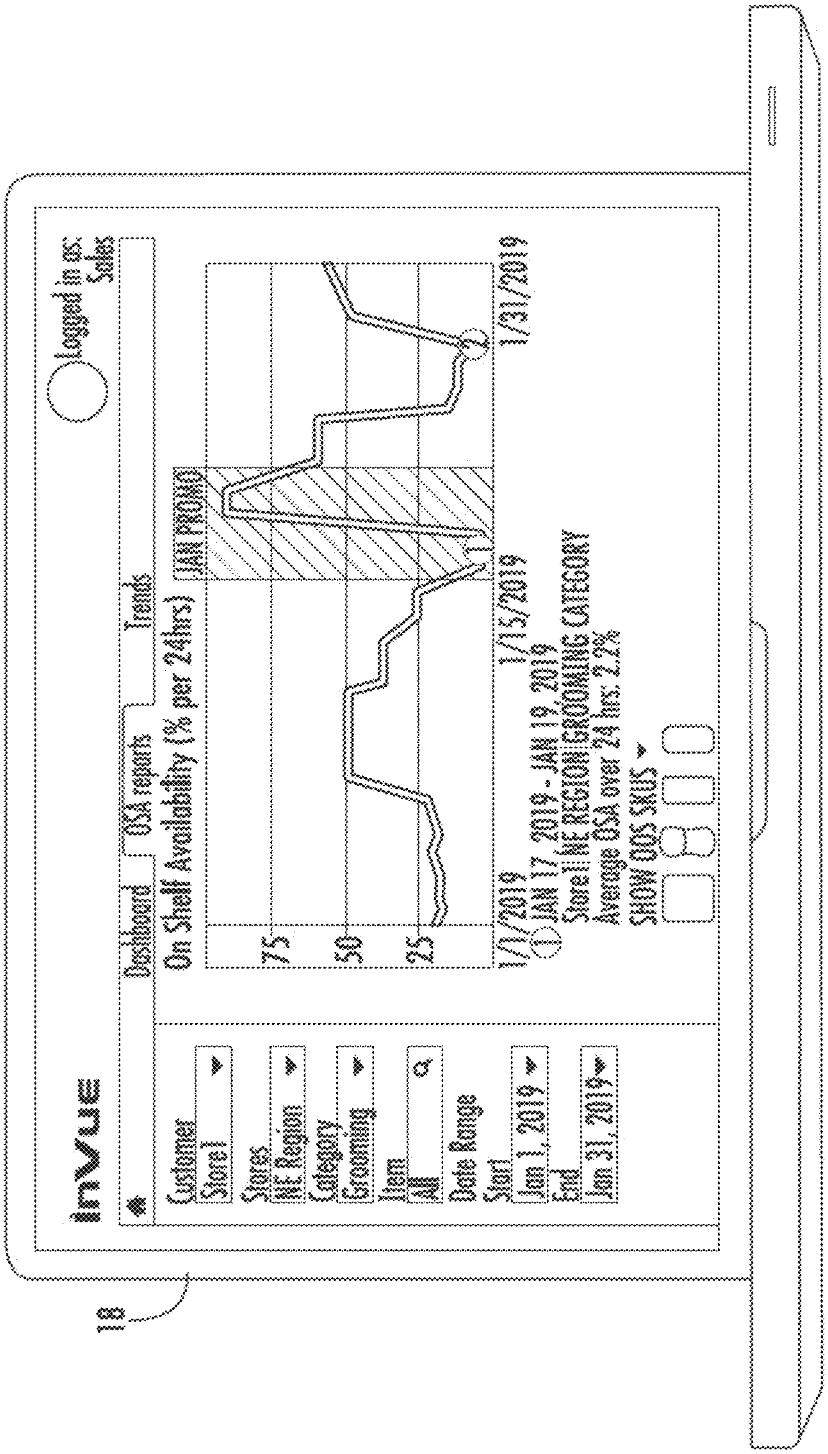
FIGS. 47-48 are example illustrations of a remote device displaying various data regarding the inventory detector system of FIG. 43.
Figure 48:
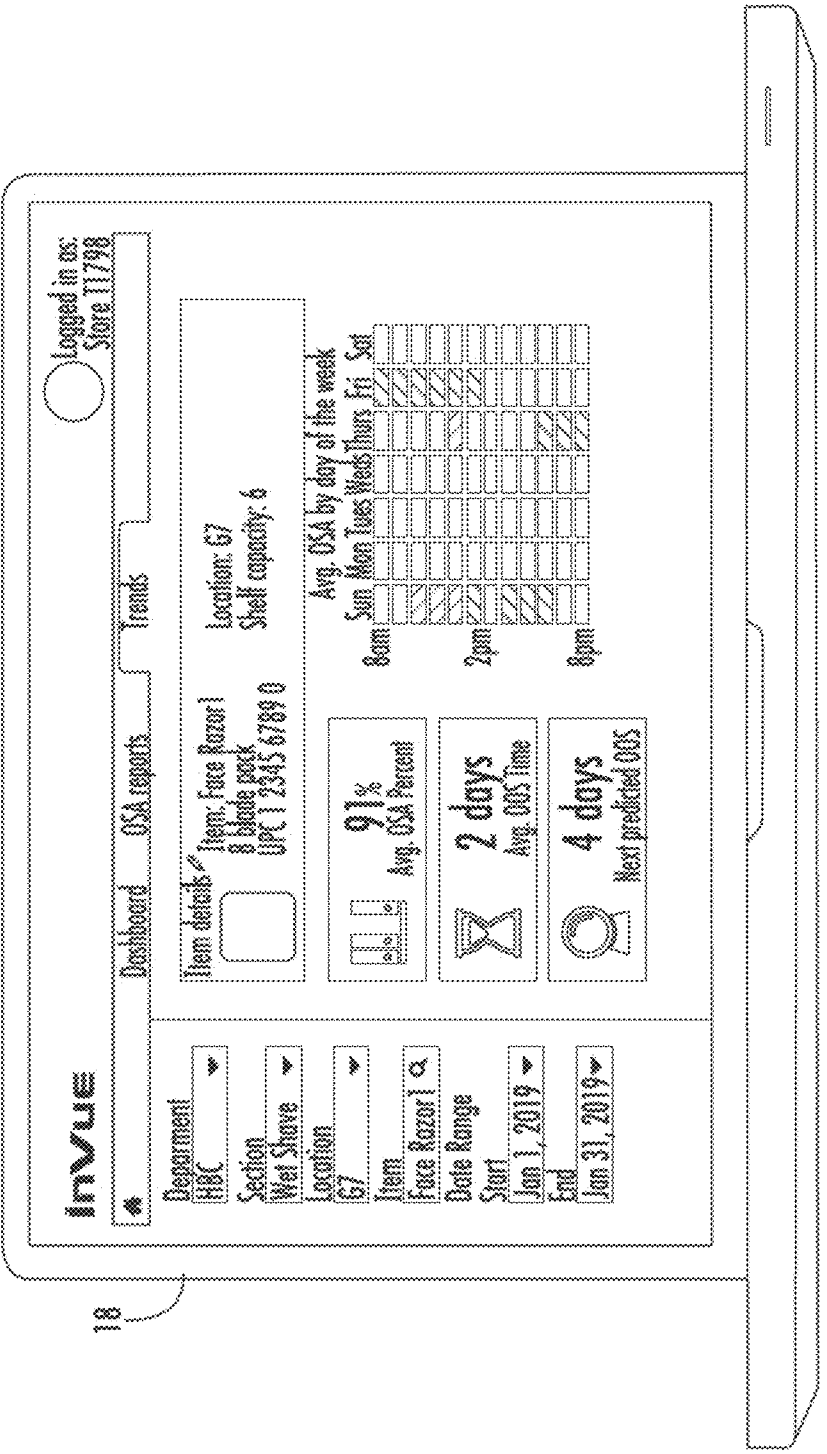

Thus, embodiments of the present invention may be configured to determine if any merchandise is present on a particular retail fixture 14. For instance, the monitoring device 18 may be configured to monitor a number of items of merchandise on a retail fixture 14 based on input from the sensor 16 and alert authorized personnel should the inventory fall below a predetermined number or if no inventory is present. Thus, in some cases, the system 10 only determines whether inventory is present or not rather than any particular number of items of merchandise on a retail fixture 14. In some cases, the sensor 16 is configured to send an update to the monitoring device 18 only if there has been a change in the number of items of merchandise on the retail fixture 14. The monitoring device 18 may further be configured to facilitate communication with one or more remote devices 20 (e.g., smartphone or tablet) for providing notification regarding inventory levels (see, e.g., FIGS. 43-45). FIG. 43 shows that inventory status (e.g., inventory present) may be communicated to associate devices 20, while FIG. 44 shows that an alert may be sent to the associate device when inventory is not present on a particular retail fixture 14. Such communication could occur, for instance, over a cloud network. In other embodiments, the sensor 16 and/or the monitoring device 18 may be configured to generate an alarm signal should the inventory fall below a predetermined level. In some embodiments, inventory reports may be generated at the associate device 20 and/or monitoring device 18 as shown in FIGS. 45-47. Such reports may provide information regarding inventory status and inventory trends (e.g., OOS time and predictions).

The monitoring device 18 can be configured to trigger a variety of actions based on input from one or more sensors 16. For instance, an OOS alert could be sent to store associate devices 20 to alert them that a retail fixture 14 is OOS. Any associate then has the ability to "claim" the issue, meaning that the associate will address the problem. The associate then can activate a "complete" button or command using their device 20 once the OOS issue has been addressed. The OOS situation could also be handled by a button or other mechanism on the sensor 16 (e.g., a reset button), which can then be correlated to the sensor's data to see that indeed the associate restocked the position.

Figure 49:
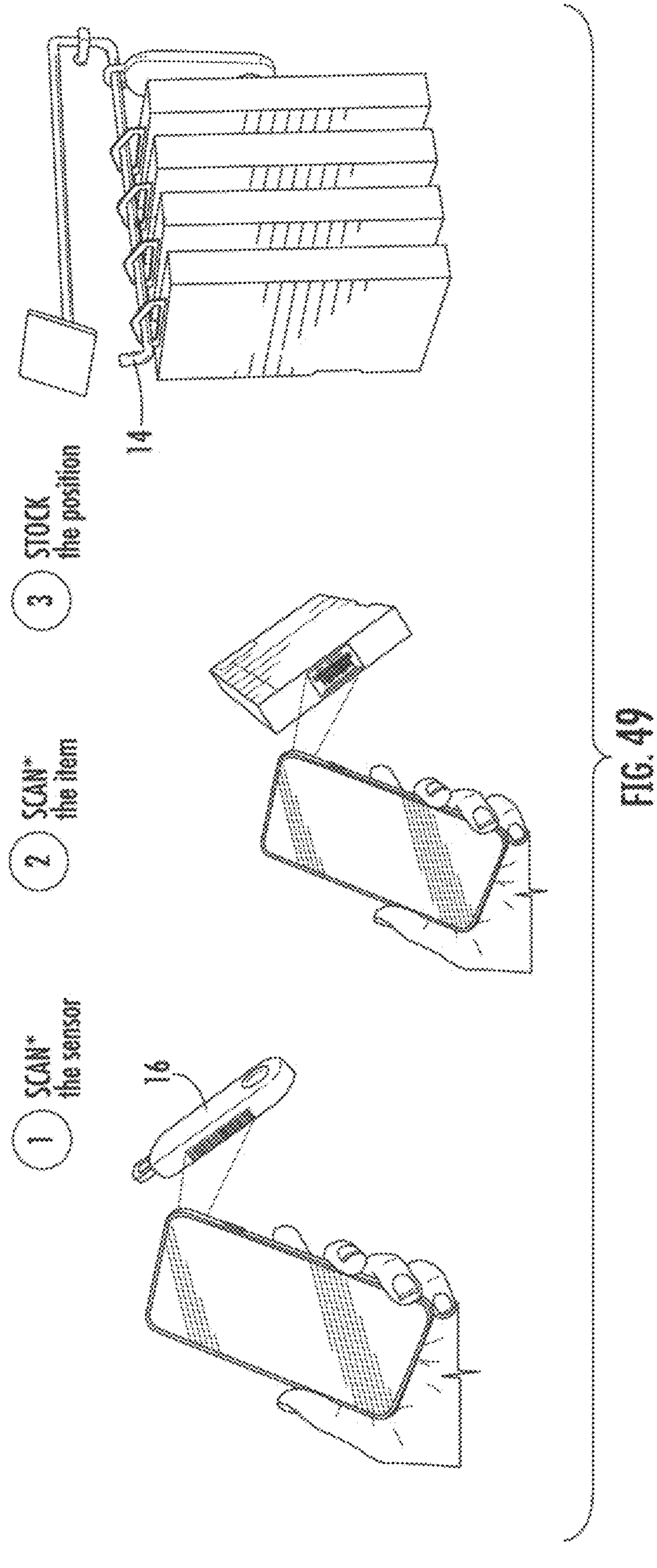
FIG. 49 is a schematic illustrating a registration process for the sensor of the inventory detector system of FIG. 43 according to one embodiment.

In some embodiments, a device 20 may have a set-up mode used to associate the sensor 16 with a specific retail fixture 14 or item of merchandise. The set-up mode could be initiated with a button push or other mechanism that is activated by the installer on the sensor 16. Embodiments of the sensor 16 discussed above can also be used for communicating sonically with the microphone and/or speaker on a device 20 (e.g., a phone or tablet) which may have a software application to assist in the set up and assigning the sensor to a retail fixture 14 position in the retail store. Alternately, FIG. 49 illustrates that device 20 may be configured to scan a UPC or QR code on both the sensor 16 and the item of merchandise to associate the two. This process may only be needed to be performed on one item of merchandise to simply associate the type of product that is being display on the particular retail fixture 14.

In one embodiment, the sensor 16 may be configured to operate in a higher scan mode when the retail fixture 14 is empty and be configured to inform the monitoring device 18 when the OOS issue is resolved. The monitoring device 18 can monitor the OOS issue and raise the status of the problem as more time goes on without it being addressed. This could be in the form of more apparent alerts on the associate device 20, a message sent to a manager, and/or an automated announcement on the retail store's speaker system.

In another embodiment, a button or other mechanism visible to the shopper when a product is out of stock could be used as a call button so a store associate could attend to shoppers who want a product before the store has had the opportunity to respond to the automatic OOS notification. Such button or mechanism may be located at the retail fixture 14 where the OOS situation is located (see, e.g., FIGS. 37-42 discussed above).

In some embodiments, the sensor 16 is configured to determine "customer dwell" time proximate to a retail fixture 14. In one example, "customer dwell" is when a retail fixture 14 located in front of a sensor 14 is empty but there is something detected beyond the end of the retail fixture, possibly indicating that a customer is standing there, which may be indicative of a lost sale. For instance, if customer dwell is detected and the retail fixture is out of stock, the sensor 16 may be configured to communicate a signal to the monitoring device 18 indicative of customer dwell to enable the retailer to take appropriate action, such as restocking or notifying a retail associate. Customer dwell may be determined by knowing the maximum possible display depth of the retail fixture 14 and by having a sensor 16 that is configured to determine distances beyond that depth. For instance, if the sensor 16 determines a distance that is not infinity, and that distance is longer than the maximum display depth of the retail fixture 14, then there is a potential customer dwell. Doors or other obstructions in front of the retail fixture 14 would need to be taken into account so as to not misinterpret the obstruction as a customer dwell. The following examples are for illustration only and should not be construed as limiting the invention in any way. In one example, a sensor 16 is placed behind a 12 inch retail fixture 14 leaving 11 inch to the end of the retail fixture. In this scenario, 0-11 inches means product is present on the retail fixture 14, infinity means product is out of stock, and greater than 11 inches but not infinity means out of stock and possible customer dwell. In another example, a sensor 16 is placed behind a 12 inch retail fixture 14 leaving 11 inches to the end of the retail fixture, and 2 inches in front of the retail fixture is a door. In this scenario, 0-11 inches means product is stocked on the retail fixture 14, infinity means product is out of stock and the door is open, 11-13 inches means out of stock and the door is closed, while greater than 13 inches but not infinity means out of stock, door is open, and possible customer dwell.

The foregoing has described one or more embodiments of systems and methods for monitoring inventory of item of merchandise. Although embodiments of the present invention have been shown and described, it will be apparent to those skilled in the art that various modifications thereto can be made without departing from the spirit and scope of the invention. Accordingly, the foregoing description is provided for the purpose of illustration only, and not for the purpose of limitation.

Figure 52:
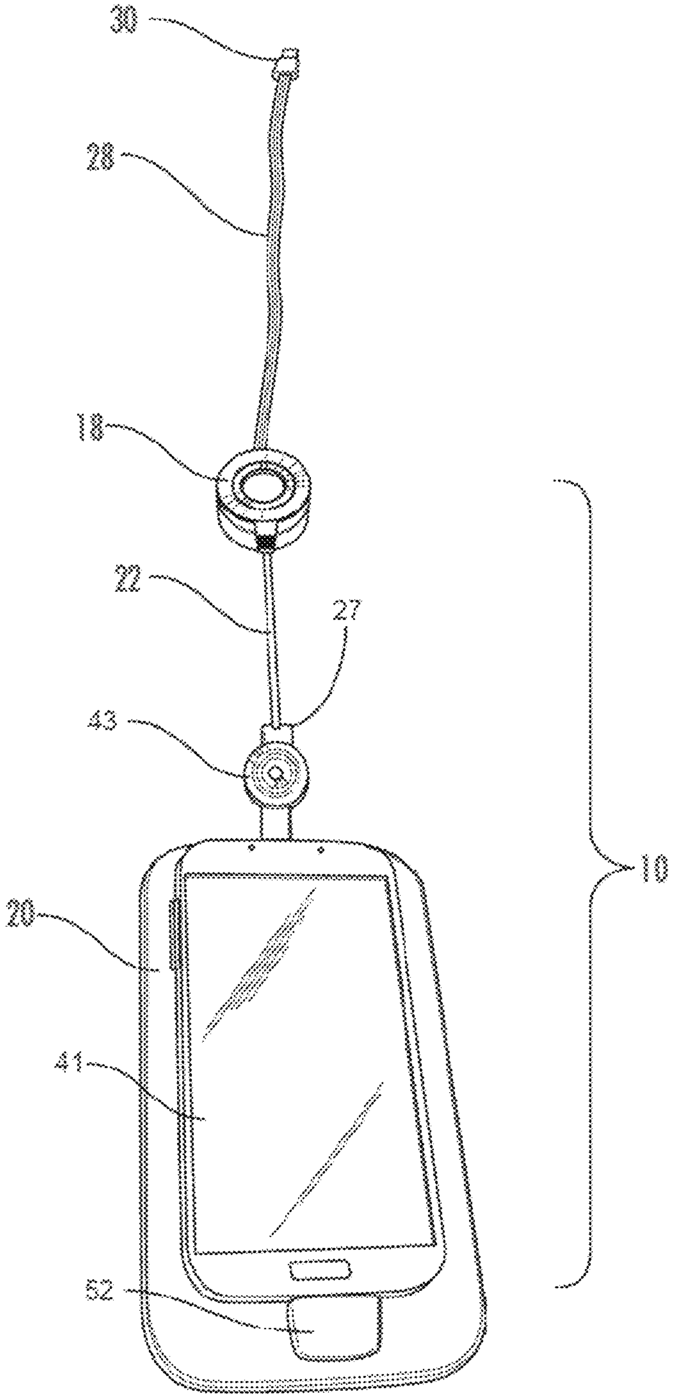
FIG. 52 is perspective view of a security system configured for securing an item of merchandise from theft in a retail display according to one embodiment of the invention.

Referring to the following FIGS. 52-69 wherein identical reference numerals denote the same elements throughout the various views, the illustrated embodiments of methods and systems according to the present invention are capable of wirelessly monitoring merchandise in a retail environment, such as via the use of inclusion and/or exclusion zones. FIG. 52 illustrates one embodiment of a security system 10 configured to secure an item of merchandise from theft in a retail display. The security system may generally include a sensor 52 configured to be coupled to an item of merchandise 41, and a monitoring device 43 configured to wirelessly communicate with the sensor and/or the item of merchandise. The security system 10 may further include an alarm module 18 in electrical communication with the monitoring device 43. The monitoring device 43 and the sensor 52 may be configured to communicate with one another to determine the proximity of the item of merchandise 41 relative to the monitoring device. Moreover, the monitoring device 43 may be configured to determine a proximity range between the sensor 52 and the monitoring device, wherein the proximity range may be indicative of the strength of communication between the sensor and the monitoring device. The alarm module 18 may be configured to generate a security signal when the proximity between the monitoring device 43 and the sensor 52 is not within the proximity range. In some embodiments, the security system 10 may also include a charging station or device 20 for charging the monitoring device 43, the item of merchandise 41, and/or the sensor 52.

The item of merchandise 41 may be any portable electronic device, such as a mobile or cellular phone, a Smartphone, a tablet, notebook, laptop computer, or the like. One advantage of an embodiment of the security system 10 is that the item of merchandise 41 is not required to be mechanically tethered to a display stand, support or the like. Thus, a consumer is free to examine the item of merchandise 41 without any physical restraints. As will be explained in further detail below, the monitoring device 43 may be configured to communicate with the sensor 52 and/or the item of merchandise 41 to establish a "wireless tether," such that although physical security is not provided, wireless security is provided. Furthermore, although the security system 10 is described herein in relation to a merchandise display in a retail store, it is understood that a security system 10 according to the invention is applicable to any number of environments, such as in hospitals, restaurants, etc.

The sensor 52 of the security system 10 is configured to be engaged with and disengaged from the item of merchandise 41. As such, the sensor 52 may be removably engaged with the item of merchandise 41, for example, by being inserted within an input port of the item of merchandise. As such, the sensor 52 may include a connector (see, e.g., FIG. 54) configured for engaging an input port provided on the item of merchandise 41. By way of example and not limitation, the input port could be a standard input port provided on the item of merchandise 41, such as a USB port, micro-USB port, or the like. The input port may be the same port used for power and/or data transfer with the item of merchandise. In some embodiments, the sensor 52 and the item of merchandise 41 are in electrical communication with one another when the sensor is engaged with the input port of the item of merchandise. In other embodiments, the sensor 52 may include a proximity mechanism (e.g., a pressure or plunger switch) that is configured to detect when the sensor is not engaged with the input port of the item of merchandise 41, for example, when the sensor has been removed from the item of merchandise, and/or to detect removal of the sensor from the back of the item of merchandise. Although shown as being separate components, it is understood that the sensor 52 could be integrated into the item of merchandise 41 so that the sensor is not required to be engaged with the input port. As such, the sensor 52 may be integrated with or coupled to the item of merchandise 41. In one embodiment, the sensor 52 is configured to receive power from the item of merchandise 41. For example, the item of merchandise 41 may include a battery that is configured to transfer power to the sensor 52 when the sensor is operably engaged with the merchandise. As such, the sensor 52 does not require its own power source for operation.

In some embodiments, the sensor 52 comprises a power source, such as a battery. In this case, the sensor 52 may be operable for detecting when it is removed from the item of merchandise 41. For example, the sensor 52 may establish a sense loop between the sensor and the item of merchandise 41, such that when the sensor is removed, the sense loop is interrupted. The sensor 52 may then be configured to communicate with the monitoring device 43 and/or the item of merchandise 41 to initiate or otherwise generate a security signal. In the instance where power is lost to the item of merchandise 41, the power source of the sensor 52 will reduce false alarms. In some embodiments, the sensor 52 may be configured to determine whether the loss of power to the item of merchandise 41 was authorized or unauthorized. A natural loss of power could be, for example, the item of merchandise 41 being powered down in an authorized manner, while an unnatural loss of power could be indicative of a battery being removed from the item of merchandise or the sensor 52 being removed from the item of merchandise. When engaged with the item of merchandise 41, the sensor 52 may be configured to monitor the data lines of the item of merchandise to determine whether the loss of power is natural (authorized) or unnatural (unauthorized). In one example, when an item of merchandise 41 is powered down naturally, the sensor 52 may monitor the data lines to confirm that a natural power loss has occurred. However, when power is abruptly lost, the sensor 52 may be configured to transmit a signal to the monitoring device 43 to initiate or otherwise generate a security signal. Because the sensor 52 includes a power source in this embodiment, the sensor may utilize its own power source to transmit a signal to the monitoring device 43.

The sensor 52 may include communications circuitry for communicating with the monitoring device 43. For example, the communications circuitry of the sensor 52 may be configured to wirelessly communicate with the monitoring device 43 using any desired communications protocol such as, for example, Bluetooth wireless communication, Bluetooth Low Energy ("BLE") wireless communication, WiFi wireless communication, cellular wireless communication, received signal strength indicator ("RSSI"), ultra-wideband time of flight, and/or ambient backscatter. Similarly, the monitoring device 43 may include complementary communications circuitry for communicating with the sensor 52. In one embodiment, the wireless communications circuitry carried by the sensor 52 and/or the monitoring device 43 may include, for example, one or more wireless transceivers for transmitting and receiving wireless communications.

Figure 53:
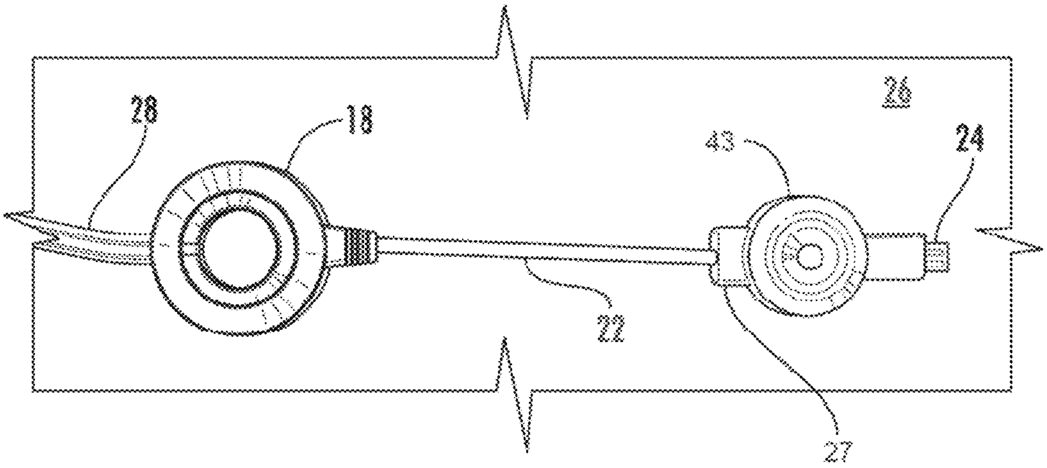
FIG. 53 is a plan view of the monitoring device and the alarm module of the security system shown in FIG. 52.
Figure 54:
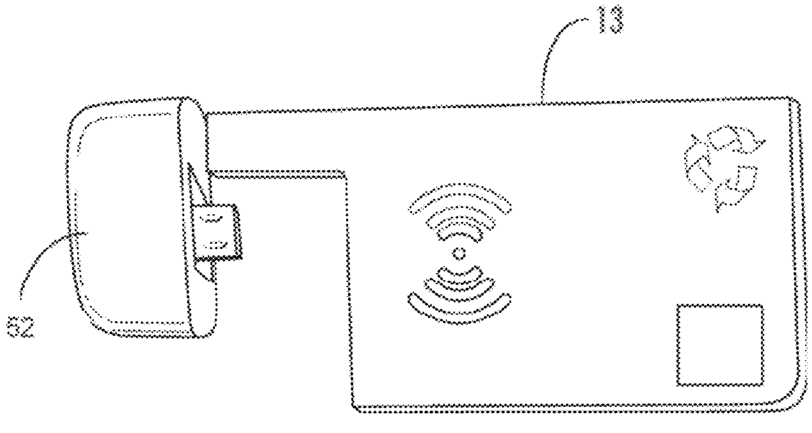
FIG. 54 is a plan view of a sensor and a power adapter configured for use with the security system shown in FIG. 52 according to one embodiment of the invention.

The monitoring device 43, sometimes referred to as a "watch tower", may be configured to communicate wirelessly with the sensor 52 and/or the item of merchandise 41. In addition, the monitoring device 43 may include a connector 24 that is configured to engage an input port provided on the charging device 20, as shown in FIG. 53. Thus, when engaged, the monitoring device 43 and the charging device 20 may be in electrical communication with one another. The connector 24 may be a releasable connector, such as, for example, a micro-USB connector, USB connector, or any other suitable connector configured for engaging with the input port in a friction fit. The monitoring device 43 may include a battery, which may be used for back-up power should power provided from an external power source be lost. Furthermore, the monitoring device 43 may be secured to a merchandise display surface 26, such as a display counter, shelf, fixture, or the like using any suitable technique such as adhesives and/or fasteners. It is understood that the sensor 52 could function as a watch tower and communicate with the monitoring device 43 in a similar manner Thus, the functionality of the sensor 52 and the monitoring device 43 could be reversed if desired. Furthermore, both the sensor 52 and the monitoring device 43 could be configured to function as a watch tower. For example, both the sensor 52 and the monitoring device 43 may be configured to collect data (e.g., RSSI data) and communicate with one another to determine a position of the item of merchandise 41 relative to the sensor and/or the monitoring device.

In some embodiments, the monitoring device 43 includes a controller and wireless communications circuitry coupled to the controller. The monitoring device 43 may be paired, for example, by wireless communication (e.g. Bluetooth, BLE, RF, IR, etc.), with the sensor 52 and/or the item of merchandise 41. As such, the sensor 52 and/or the item of merchandise 41 is configured to communicate, via its respective wireless communications circuitry, with the monitoring device 43 via its wireless communications circuitry. In other words, the sensor 52 and/or the item of merchandise 41 may be paired with a monitoring device 43 by way of wireless communications.

Although the sensor 52 and monitoring component 16 may communicate via wireless means as discussed herein according to various embodiments, it is understood that the sensor and monitoring component may be connected by a tether or cable. The tether could be a mechanical cable or could include one or more conductors for conducting various types of signals between the sensor and the monitoring component (e.g., security, data, and/or power signals). In some cases, the tether may be coupled to a spring-loaded recoiler which could be housed in the monitoring component or other location that facilitates extension and retraction of the tether as the sensor is moved relative to the monitoring component. Moreover, in some cases, the tether may be detachable from the sensor 52 such as via a releasable connector.

As previously mentioned, in some embodiments the monitoring device 43 may be conceptually thought of as a "watch tower." As explained in further detail below, if the strength of communication between the monitoring device 43 and the sensor 52 decreases, or communication has been lost, the monitoring device may communicate with the alarm module 18, wherein the alarm module may generate a security signal that is indicative of an unsecured state or condition, for example, an audio, visual, and/or haptic alarm. The monitoring device 43 may also communicate, via the wireless communications circuitry, to the sensor 52 to activate a respective output device of the sensor and/or the item of merchandise 41 (i.e., a dual alarm condition) so that security personnel are able to identify the sensor of a particular item of merchandise communicating a security signal.

In one embodiment, the alarm module 18 is electrically connected to the monitoring device 43 and to an external power source. For example with reference to FIG. 53, the alarm module may include a cable 28 having one or more conductors for transmitting power to the alarm module, the monitoring device 43, the charging device 20, the sensor 52, and/or the item of merchandise 41. The monitoring device 43 may be electrically connected to the alarm module 18 with a cable 22 having one or more electrical conductors for transmitting power, data, state (e.g., short or resistor value), and/or security signals between the monitoring device and the alarm module. In one embodiment, the alarm module 18 includes a first connector 30 (see, FIG. 52) at an end of cable 22 that is configured to directly or indirectly couple to an external power source, such as a computing device (e.g., a PC or portable computer), a power outlet, or a wall power adapter at one end, and a second connector 27 at the opposite end of the cable 22 for operably engaging the monitoring device 43. Thus, the alarm module 18 may have a connector 27 that is compatible with an input port provided on the monitoring device 43. As a result, the alarm module 18 both mechanically and electrically connects the monitoring device 43 to a power source. The alarm module 18 may be operably engaged with the cable 22 and/or the cable 28 in a variety of manners. For example, the alarm module 18 may be hardwired to an end of the cables 22, 28 and have internal conductors configured to cooperate with conductors within the cables. Alternatively, each cable 22, 28 may plug into the alarm module 18. In another embodiment, a single continuous cable may extend through the alarm module 18 and be configured to communicate with the alarm module. The monitoring device 43 is illustrated as being electrically coupled to the alarm module 18 with a cable 22. However, it is understood that the monitoring device 43 and the alarm module 18 instead may be integrated together as a single combined unit, if desired.

The alarm module 18 may include an alarm that will generate a security signal, such as an audible and/or visual alarm. The alarm module 18 may include an alarm for generating a security signal in response to various security events (e.g., unplugging/cutting a cable, disconnecting the monitoring device 43, disconnecting the sensor 52, etc.). For example, the alarm module 18 may include a piezoelectric alarm to generate an audible alarm signal, as well as circuitry for detecting a security event. The alarm module 18 could also be configured to generate a visible alarm signal, or provide other visible indicators (e.g., armed or alarming), such as with a light-emitting diode ("LED"). The alarm module 18 may be further configured to detect a connection of either connector to the monitoring device 43 and/or the external power source. The alarm module 18 may further include an internal power source configured to provide power to the alarm module in the event that power from an external power source is interrupted or lost. In one embodiment, the internal power source is a rechargeable battery that is recharged by power supplied by the remote power source.

In some embodiments, the security system 10 includes a charging device 20 as illustrated in FIG. 52. The charging device 20 may be configured to charge the sensor 52 and/or the item of merchandise 41. Various techniques for transferring power may be employed, such as capacitive contact charging, inductive charging, or wired charging. In one example, the charging device and the item of merchandise have wireless "Qi" compliant battery charging capability that incorporate magnetic inductive coils to transfer electrical power from the charging device 20 to the item of merchandise 41 in a known manner. The charging device 20 may stand alone, or alternatively, may be permanently attached to, removably attached to, or otherwise operably coupled with a docking station, a display stand, an alarm module, a base or the like. In one embodiment, the monitoring device 43 may incorporate charging functionality such that the monitoring device and the charging device 20 may be a single integrated device. In addition, it is understood that the charging device 20 may be optional in some embodiments where the item of merchandise 41 is not charged when in the display or "home" position.

The item of merchandise 41 may be "Qi" compliant and include appropriate hardware for communicating with the charging device 20. Alternatively, the sensor 52 may be "qi" compliant such that the item of merchandise 41 is not required to be "Qi" compliant, and further, no additional hardware is required for charging the item of merchandise in the retail display environment (e.g., a power adapter cable). For example, in the embodiment shown in FIG. 54, the sensor 52 includes a power adapter 13 that is in electrical communication with the sensor. The power adapter 13 may include an inductive coil for inductively receiving power transferred from the charging device 20, which in turn provides power to the sensor 52. The sensor 52 may be configured to transfer power directly from the power adapter 13 to the item of merchandise 41. As such, the power adapter 13 may be utilized to power and/or charge items of merchandise 41 that do not include inductive or other wireless charging capability.

In some embodiments, the alarm module 18 and/or sensor 52 can be armed, disarmed, and/or silenced with a security key, which may utilize mechanical, wireless, and/or electrical communication between the component(s) of the security system 10 and the security key. For example, the security key may be configured to wirelessly communicate a security code to the alarm module 18 and/or sensor 52, such as by infrared ("IR"), optical, acoustic, or inductive communication. For example, the alarm module 18 may include a port 32, window, or the like (e.g., FIG. 55) that is configured to transmit and/or receive wireless signals from the security key. In one particular embodiment, the security key is similar to that disclosed in U.S. Pat. No. 7,737,845, entitled Programmable Key for a Security System for Protecting Merchandise, the entire disclosure of which is incorporated herein by reference. In additional embodiments, the alarm module 18 and/or sensor 52 may include near field communication ("NFC") functionality and may be configured to communicate with a security key or other device having NFC functionality for arming and disarming the alarm of the alarm module. Alternatively, the alarm module 18 and/or sensor 52 may include "screen swipe" functionality and/or be configured to sense particular movement or motion to arm and/or disarm the alarm module. Likewise, the alarm module 18 and/or sensor 52 may include biometric functionality for recognizing a particular user to arm and/or disarm the alarm of the alarm module.

Figure 55:
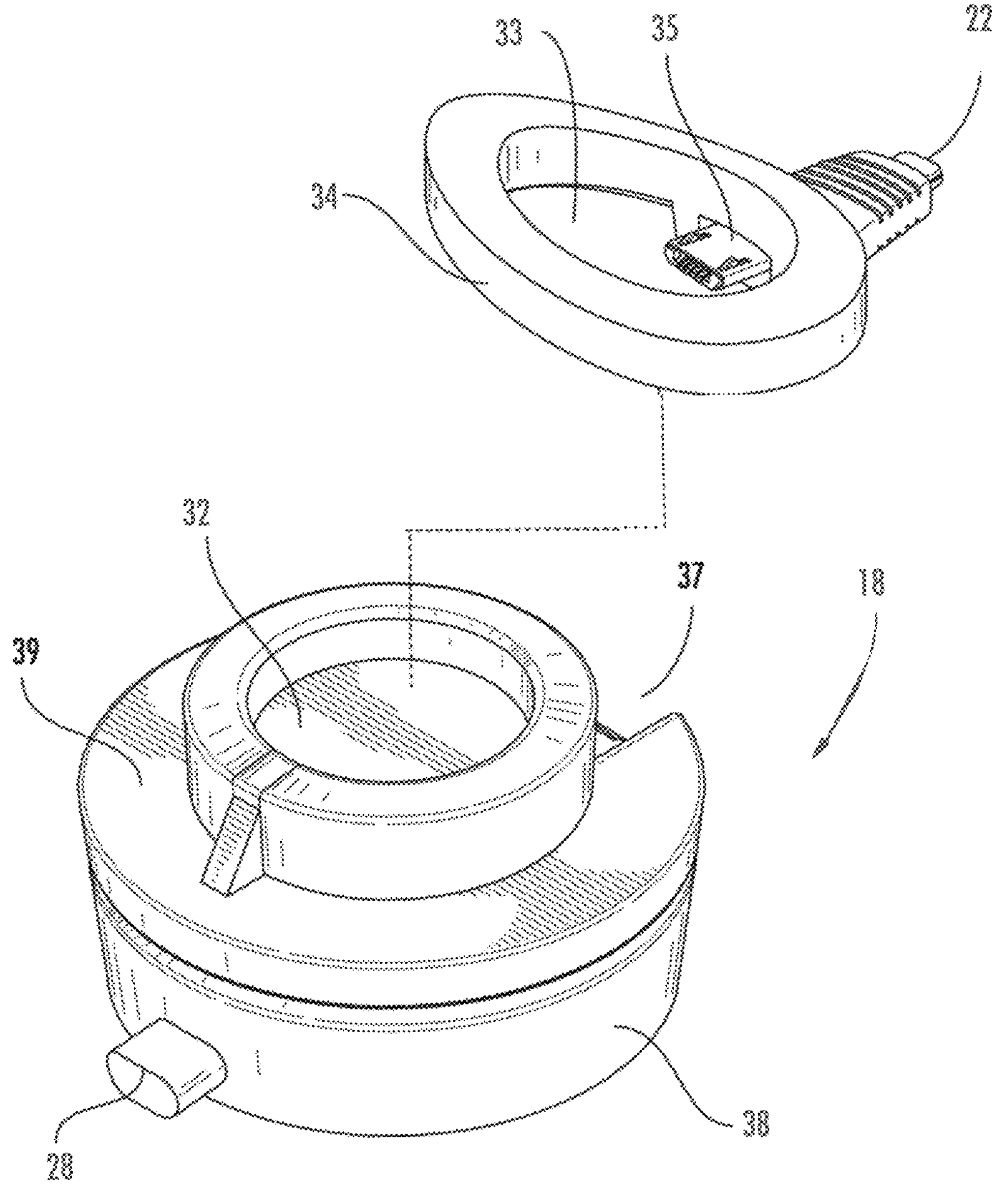
FIG. 55 is an exploded view of an alarm module and a connector configured for use with the security system shown in FIG. 52 according to one embodiment of the invention.
Figure 56:
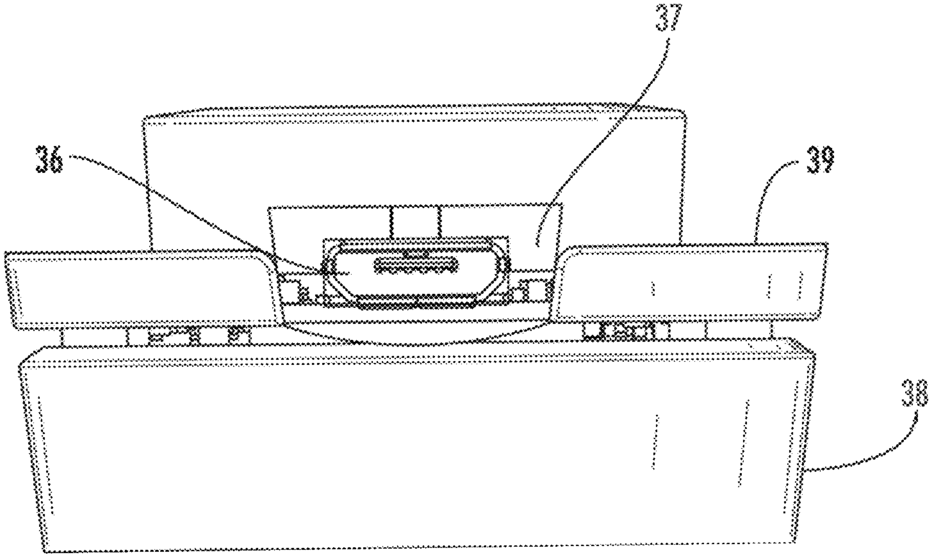
FIG. 56 is a side view of the alarm module shown in FIG. 55.
Figure 57:
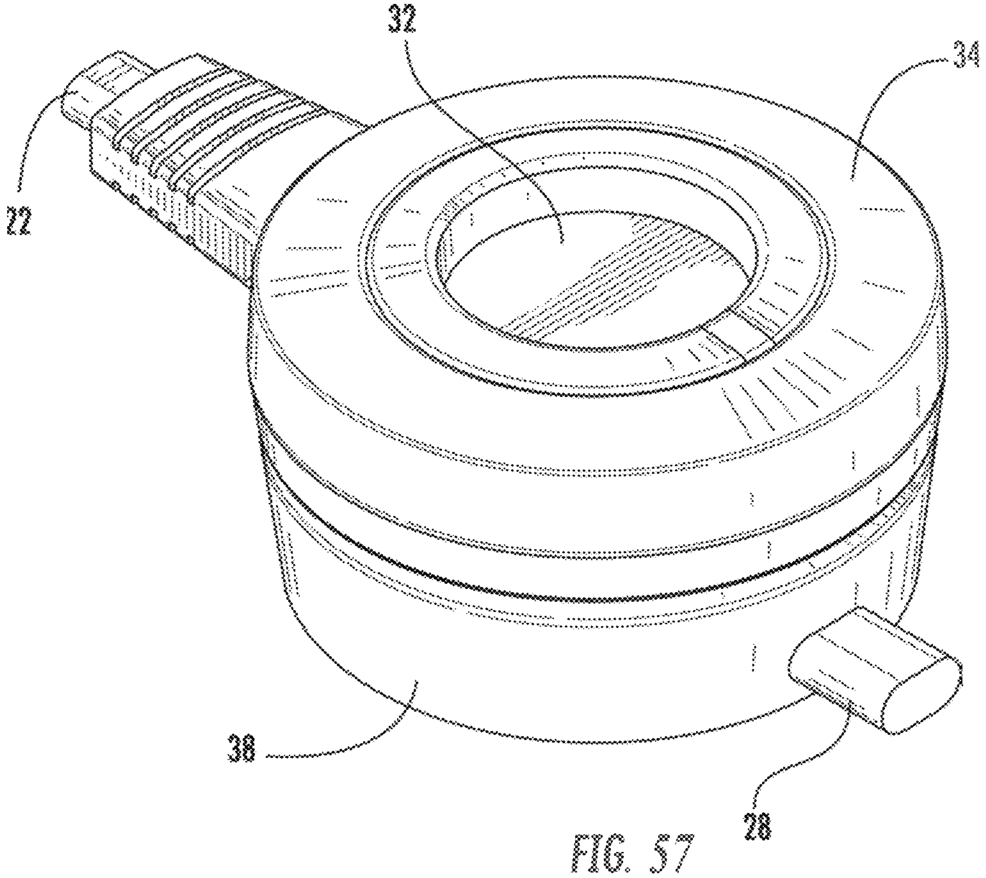
FIG. 57 is a perspective view of the connector and the alarm module shown in FIG. 55 in an assembled configuration.

FIGS. 55-57 illustrate one embodiment of an alarm module 18 according to the invention. In this regard, FIG. 55 shows an alarm module 18 including a connector 34 coupled to the cable 22 and FIG. 56 shows a connection member 36 coupled to a base 38 of the alarm module. For example, the connector 34 may include a connection member 35, such as a male micro-USB connector or any suitable type of connector. The connection member 36 on the base 38 may be located on a radial surface of the base. In one example, the upper surface of the base may define a slot 37, and the connection member 35 of connector 34 may be aligned with the slot 37 for engaging with the mating connection member 36. The connection member 35 of the connector 34 may be located within the opening 33 of a ring-shaped connector. For example, the connection member may extend radially inward within the opening. Thus, the connection member 35 of the connector 34 may be configured to be inserted within the slot 37 and into the connection member 36 of the base 38. In one embodiment, the connector 34 is made of a resilient, elastic, and/or flexible material (e.g., rubber) to facilitate engagement of the connection member 35 with the connection member 36. In this regard, FIG. 55 illustrates an example wherein the connector 34 is resilient so that the connector may be manipulated in such a way as to allow the connection member 35 and the connection member 36 to engage with one another. FIG. 57 shows the connector 34 and the base 38 mated with one another. Thus, when engaged with one another, the connection members 35, 36 are not visible to a user. In addition, the outer diameters of the connector 34 and the upper surface 39 of the base 38 may be substantially the same so that the connector 34 and the alarm module 18 are a cohesive unit when assembled. As such, the connection members 35, 36 may not be readily apparent to a potential thief when the connector 34 is engaged with the alarm module 18.

As noted above, the sensor 52 may be configured to utilize power from the item of merchandise 41 for performing one or more functions according to some embodiments. Thus, the sensor 52 may not require an internal power source for performing various security functions. In one example, the sensor 52 may be configured to toggle between transmitting and receiving power. For instance, the sensor 52 may utilize a battery as discussed above for performing one or more security functions. Additionally or alternatively, the sensor 52 may be configured to transmit power from an external power source to the item of merchandise 41, such as power provided from a charging device 20, display stand, base, or the like. For instance, the sensor 52 may simply pass power from the charging device 20 through to the item of merchandise 41 for charging the battery of the item of merchandise. In addition, the sensor 52 may be configured to receive power from the battery of the item of merchandise 41. The sensor 52 may utilize the power provided from the battery to perform one or more security functions (e.g., communicating with monitoring device 43 or other monitoring unit). Thus, unlike a conventional sensor that utilizes its own power source, the sensor 52 may be configured to toggle between transmitting and receiving power to an item of merchandise 41. In another example, the item of merchandise 41 may utilize USB "on-the-go" or like functionality for facilitating power transfer from the item of merchandise to and from the sensor. In some embodiments, the sensor 52 may include a capacitor to aid in the transition between a position where the item of merchandise 41 and/or the sensor are being charged to a position where the item of merchandise 41 and/or the sensor 52 are no longer being charged. Thus, a false alarm may be avoided in the event that power is lost momentarily when power to the sensor 52 is transitioned between power sources.

Figure 58:
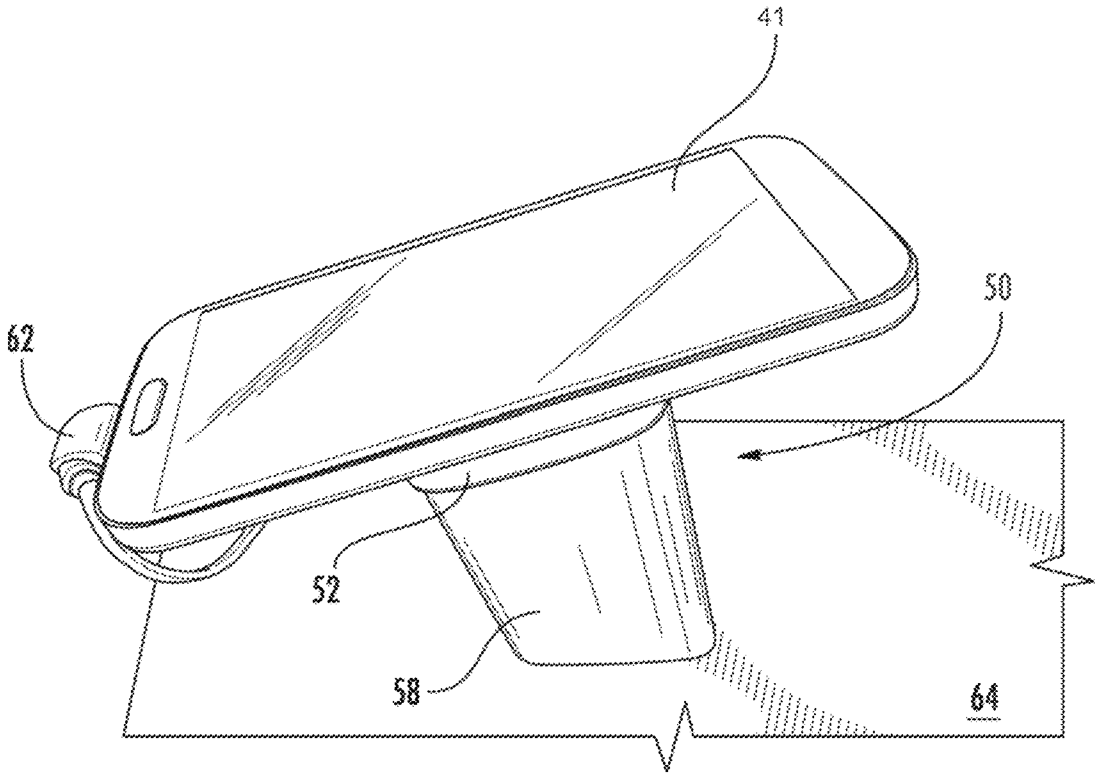
FIG. 58 is a perspective view of a security system configured for securing an item of merchandise from theft in a retail display according to another embodiment of the invention.
Figure 59:
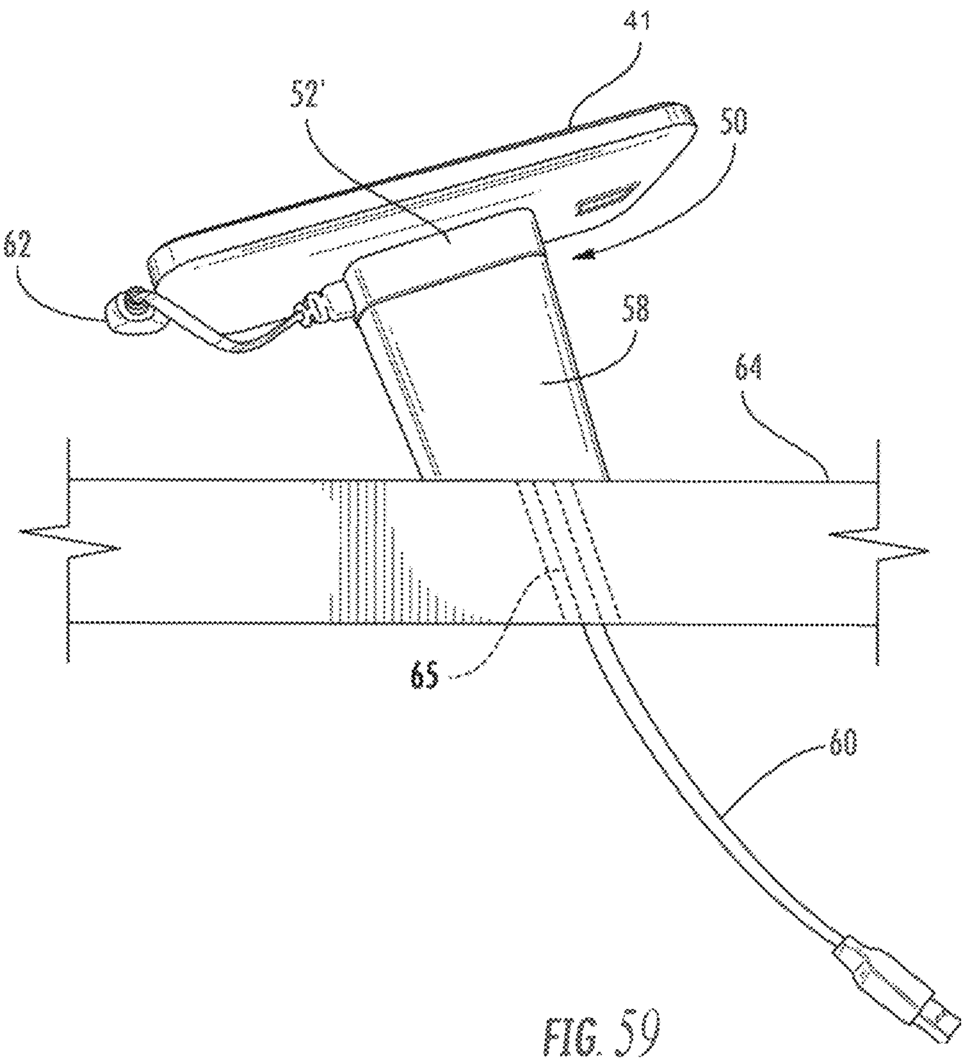
FIG. 59 is a side view of the security system shown in FIG. 58.
Figure 60:
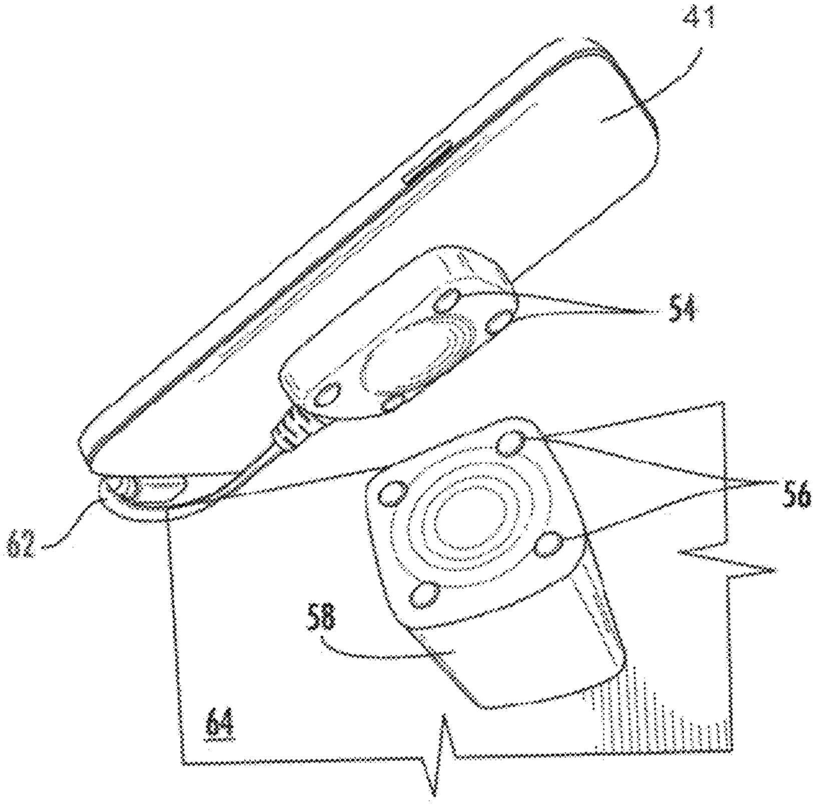
FIG. 60 is a perspective view illustrating the sensor and the item of merchandise being removed from the display stand of the security system shown in FIG. 58.
Figure 61:
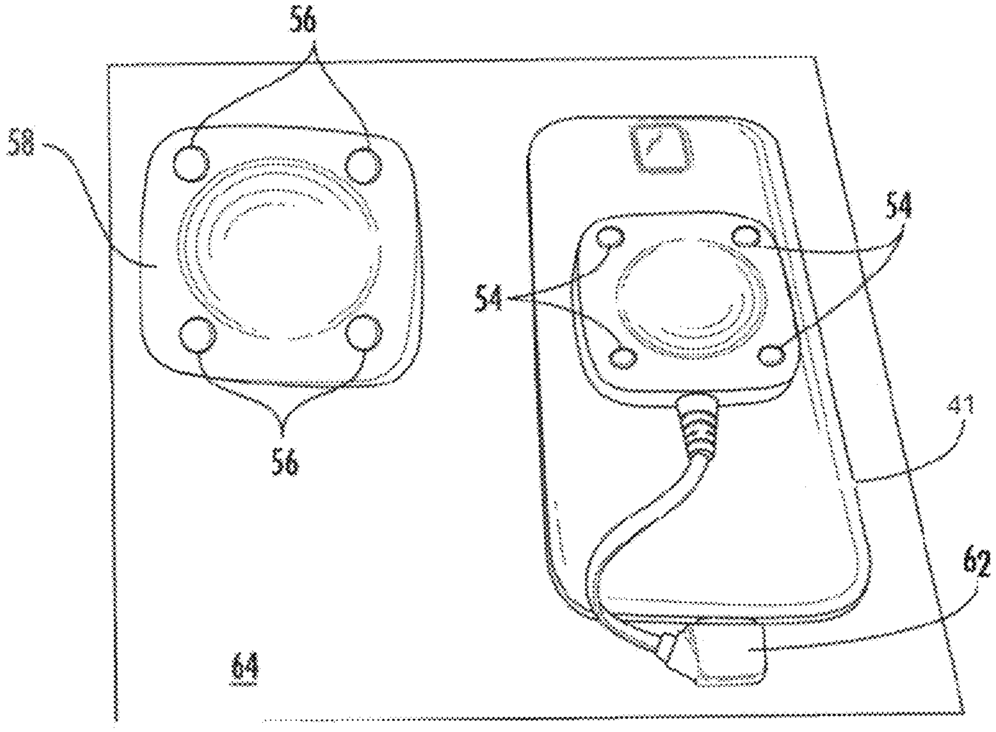
FIG. 61 is a plan view showing the sensor and the item of merchandise removed from the display stand of the security system shown in FIG. 58.

As discussed above, various means may be used to provide power to the sensor 52 and/or the item of merchandise 41, such as by contact charging. FIGS. 58-61 show an embodiment of a security system 50 in which the sensor 52' comprises one or more contacts 54 that are configured to align with one more contacts 56 on a display stand 58. When the contacts 54, 56 are in physical contact with one another, electrical power is able to be transmitted to the sensor 52' and the item of merchandise 41. When the sensor 52 is lifted off of the display stand 58, electrical power is no longer transmitted to the sensor 52' of the item of merchandise 41. A power cable 60 configured to be electrically connected to a power source may be electrically connected to the display stand 58. Thus, the item of merchandise 41 may be charged when the contacts 54, 56 are electrically connected with one another. As also discussed above, the sensor 52' in this embodiment may be configured to toggle between transmitting power to the item of merchandise 41 when the sensor 52' is supported on the display stand 58 and receiving power from the item of merchandise 41 when the sensor 52' is removed from the display stand 58. In this embodiment, a power adaptor cable and connector 62 may be configured to be electrically connected to an input port of the item of merchandise 41 at one end and to the sensor 52' at the other end. The connector 62 may be removably inserted within the input port of the item of merchandise 41, and should the connector 62 be removed in an unauthorized manner, the display stand 58 and/or sensor 52' may be configured to detect the removal and initiate or otherwise generate a security signal. In this embodiment, the sensor 52' may be attached to the rear of the item of merchandise 41, for example, by a pressure-sensitive adhesive. Furthermore, different power adapter cables having different connectors may be used for various items of merchandise that use different input ports. As noted above, the monitoring device 43 and the alarm module 18 may be integrated together as a single unit, if desired. FIGS. 58-61 show such an example where the display stand 58 includes charging, monitoring, and alarming functionality integrated together into a single unit. As such, the security system 50 may utilize a standalone display stand 58 that is configured to wirelessly communicate with the sensor 52' and/or the item of merchandise 41. In some cases, the item of merchandise 41 and the sensor 52' may be removably supported on the display stand 58 as shown in FIG. 60. Moreover, the display stand 58 may be configured to be mounted to a support, fixture, or the like, such as a display surface 64, whereby the power cable 60 may extend through an opening 65, as shown in FIG. 58.

Figure 62:
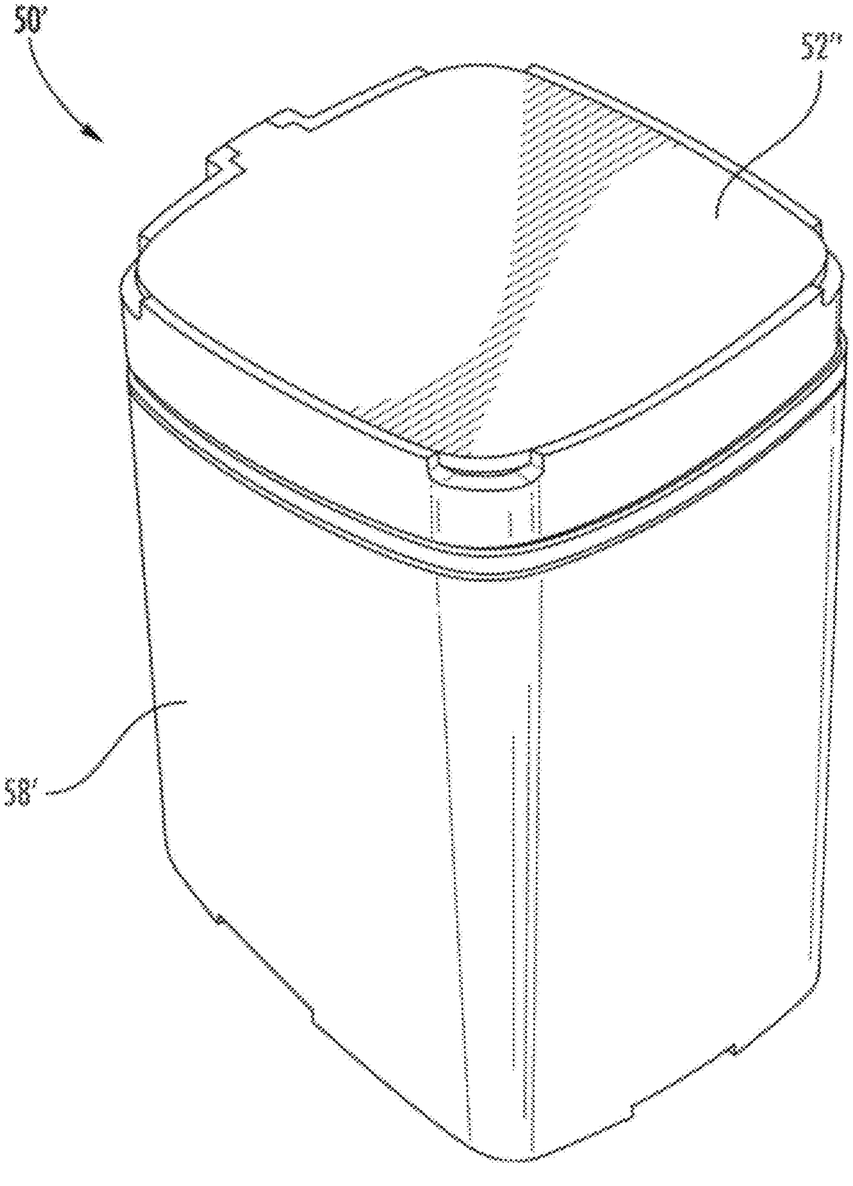
FIG. 62 is a perspective view of a security system configured for securing an item of merchandise from theft in a retail display according to another embodiment of the invention with the item of merchandise removed for purposes of clarity.
Figure 63:
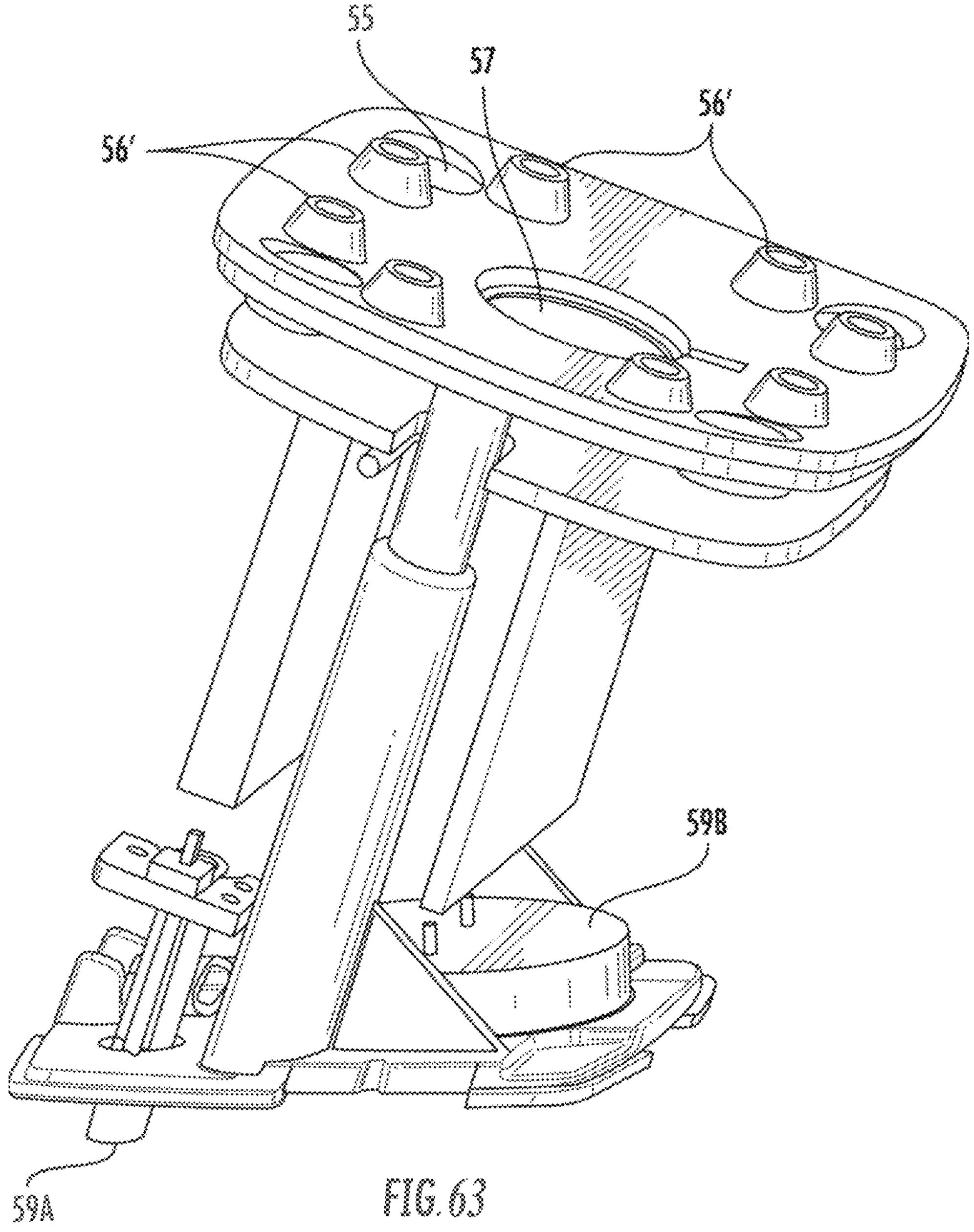
FIG. 63 is a perspective view of the display stand of the security system shown in FIG. 62 with an outer cover of the display stand removed for purposes of clarity.
Figure 64:
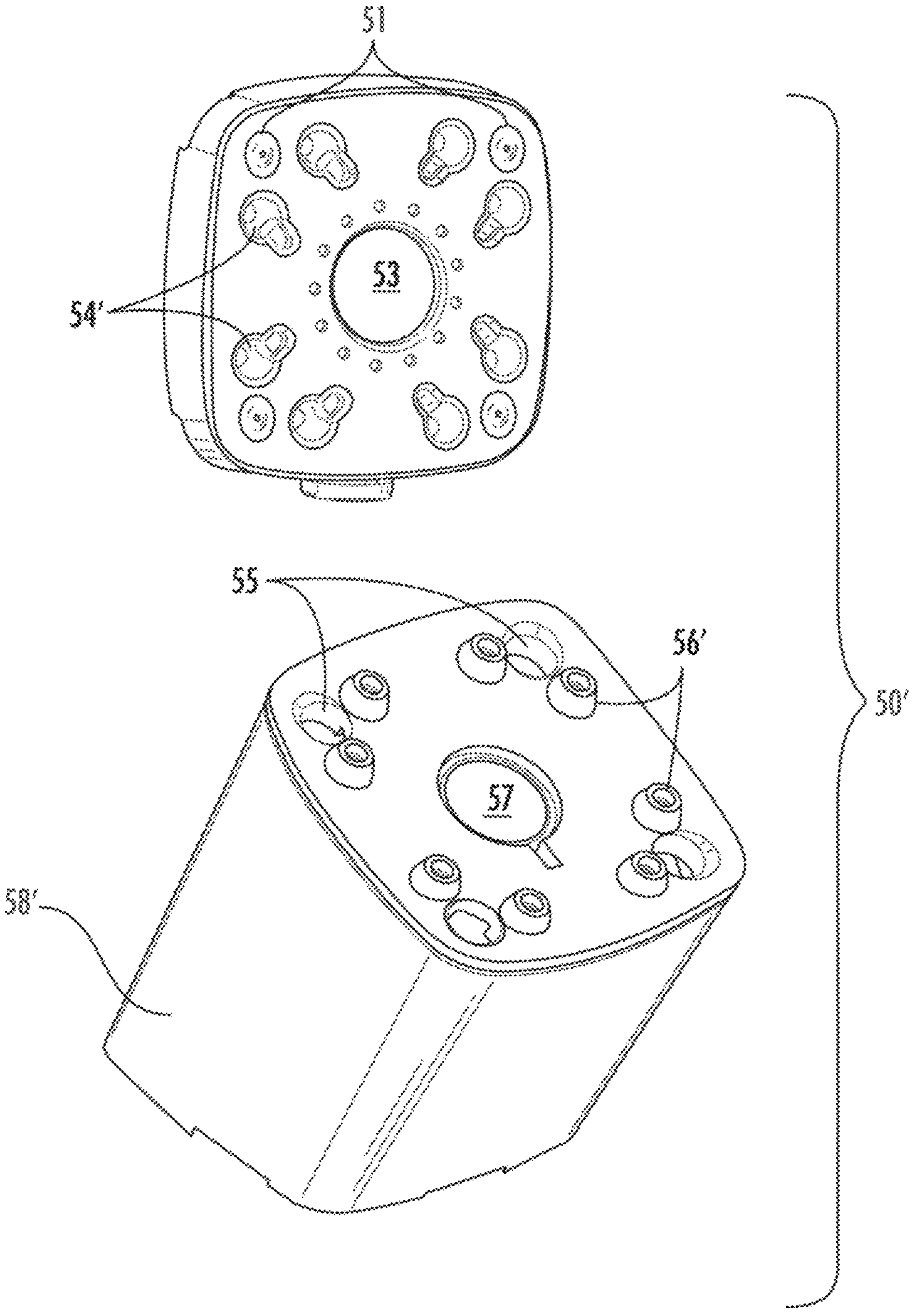
FIG. 64 is an exploded perspective view of the display stand and the sensor of the security system shown in FIG. 63 with the item of merchandise removed for purposes of clarity.

FIGS. 62-64 show a security system 50' configured for securing an item of merchandise from theft in a retail display according to another embodiment of the invention. The security system 50' is similar in operation to the security system 50 previously described. As such, only the relevant differences between the embodiment of the security system 50' and the embodiment of the security system 50 will be described herein. FIG. 62 shows the security system 50' may include a display stand (also referred to herein as base) 58' and a sensor 52" configured to be removably supported on the display stand. As previously described, the display stand 58' includes charging, monitoring and alarming functionality integrated into a single unit and may be configured to be mounted on a support, fixture, display surface, or the like. As such, the sensor 52" includes contacts 54' and the base 58' includes contact 56' so that electrical power may be transferred to the sensor and/or the item of merchandise when the contacts 54', 56' are in physical contact with one another. Sensor 52" may further include one or more projections 51 (see, FIG. 64) and base 58' may further include one or more recesses 55 (see, FIG. 63 and FIG. 64) to facilitate alignment of the contacts 54' provided on the sensor with the contacts 56' provided on the base. In one embodiment, sensor 52" and base 58' communicate via Infrared (IR) wireless communications. As such, the sensor 52" may be provided with an IR port 53 and the base 58' may be provided with a corresponding IR port 57 to facilitate IR wireless communications between the sensor and the base. However, other wireless communications, such as Bluetooth, BLE, NFC, RF, wireless charging, etc. may be utilized in place of, or in addition to, IR wireless communications.

Regardless, the base 58' functions as a standalone display stand that communicates wirelessly with the sensor 52" and/or an attached item of merchandise. Wireless communication occurs when the sensor 52" is proximate to (e.g., "near field") or placed on the base 58'. As previously described, the wireless communications may be utilized to initially identify the sensor for pairing the sensor to the particular base. The pairing may include, for instance, associating a specific identifier of the base 58' and/or the sensor 52" with one another. In some embodiments, once a sensor 52" is paired with a specific base 58', the sensor cannot be paired with another base without first disarming the sensor and/or the base. Should a sensor 52" be placed on a wrong base 58', the sensor and/or base may be configured to generate an audible and/or visible signal to indicate that the sensor has been placed on the wrong base. The wireless communications may also be utilized to indicate when the base 58' should begin contact charging with the sensor 52" and/or the attached item of merchandise. A slight electrical current may be supplied, via contact or wireless communications, prior to pairing the sensor 52" with the base 58' in order to activate, or "wake up," the sensor and initiate IR wireless communications with the base 58'. In one embodiment, the IR port 53 of the sensor 52" and the IR port 57 of the base 58' are configured for transmitting and receiving the IR wireless communications. The same IR ports 53, 57 utilized for wireless communications between the sensor 52" and the base 58' may also be utilized for communications with a security key, as discussed above. The security key may communicate wirelessly via the IR ports 53, 57 to arm and/or disarm an alarm provided on either the sensor 52" or the base 58', or both. The security key may arm and/or disarm arm the sensor 52" and/or base 58' independently or in cooperation with one another. For example, disarming the sensor 52" with a security key may also disarm the base 58'. However, the security key may be required to silence or disarm each of the sensor 52" and the base 58' in some instances. The wireless communications between the sensor 52" and the base 58' allow for a lower maintenance security system 50' and increased flexibility, as well as anonymity given that any sensor may be placed on any desired display stand or base without the need for intervention, for example by an authorized sales person. If desired, the base 58' may also include a proximity mechanism (e.g., a pressure or plunger switch) 59A that is operable for detecting if the base has been removed from a fixture, support, display surface, or the like, and a piezoelectric alarm 59B for generating a security signal when the display stand has been tampered with or removed.

In some embodiments, the item of merchandise may be configured to determine its location relative to the security system using positioning functionality, which may be referred to as "inertial navigation" or "trusted positioning." Thus, the item of merchandise may utilize various components carried thereby to determine a location of the item of merchandise. The location information determined by the item of merchandise may be used independently to determine the distance between the item of merchandise and a "home" position, for example, a display fixture, display stand, alarm module, etc. Alternatively, the item of merchandise may be used in conjunction with communications between the item of merchandise and a monitoring device, or between a sensor and a monitoring device. According to one embodiment, trusted positioning may be implemented using similar techniques as that described in U.S. Pat. No. 8,878,673, entitled Systems and Methods for Protecting Retail Display Merchandise From Theft, the content of which is incorporated by reference herein in its entirety.

In some embodiments, the security system includes an inertial navigation system (INS) as a self-contained "add-on" security module that is affixed to, or otherwise integrated with, an item of merchandise, for example, a retail display item of merchandise being displayed for sale in a display area of a retail store. In another embodiment, an item of merchandise may include a software application for "smart" electronic merchandise including inertial navigation system (INS) functionality that is capable of executing a third-party software application. In this manner, the security system leverages the sensors, controller, audio components and capabilities of the item of merchandise, in particular, the host "smart" consumer electronics device. As will be appreciated by those skilled in the art, the term "smart" consumer electronics device as used herein refers to any device that is capable of executing a software application, for example, a cellular telephone, e-Reader, I-Pad, I-Pod, Tablet computer, tablet device, laptop computer, notebook computer, digital camera, SLR, media (audio/video) player, or other electronics device including processing capability and an executable memory.

As used herein, the term "inertial navigation system (INS)" means a navigation aid that uses a computer, motion sensors (e.g. accelerometers) and rotation sensors (e.g. gyroscopes) for processing motion without external references. The inertial navigation system (INS) advantageously determines, for example via dead reckoning, the position, orientation, and velocity (direction and speed of movement) of a moving object without reliance on external references. Indeed, one particular embodiment of the present invention is a security system including an inertial navigation system (INS) in the form of a software application and associated hardware, or a security system configured for operation with such an item of merchandise, that does not rely on an external reference for determining the position of the item of merchandise relative to a predetermined "home" position.

Figure 65:
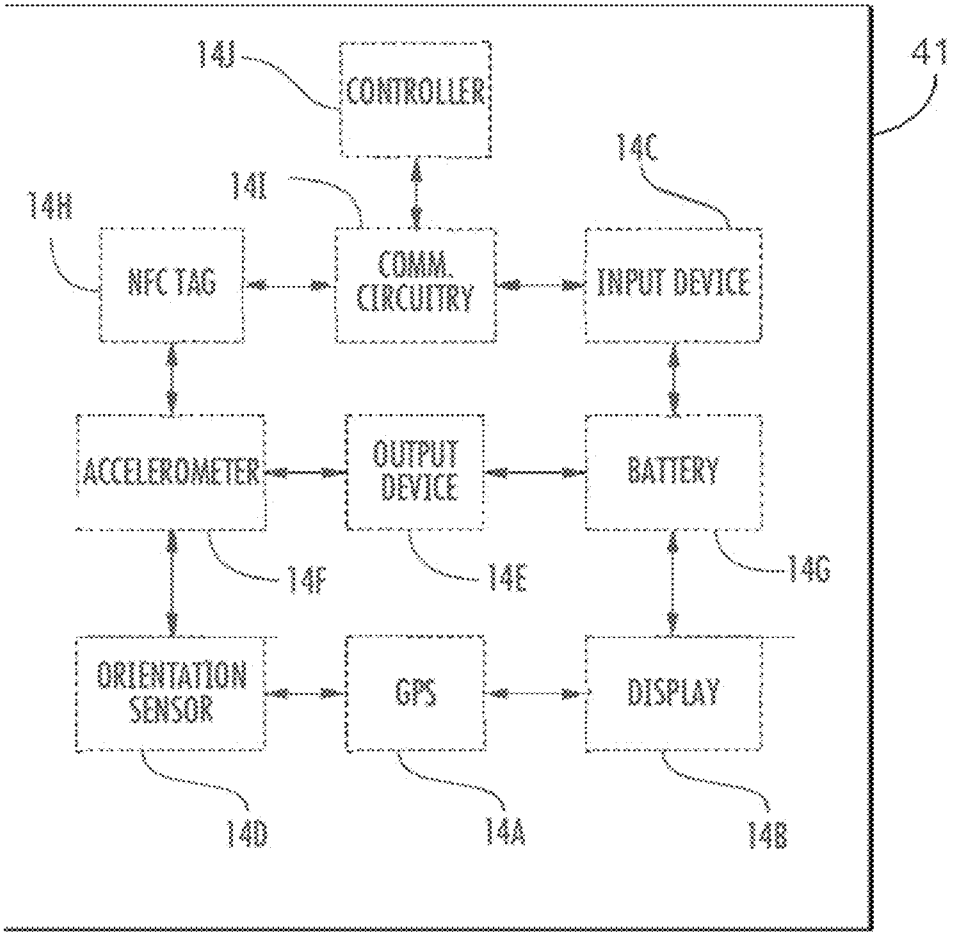
FIG. 65 is a schematic plan view of an item of merchandise according to one embodiment of the invention.

In one embodiment of an item of merchandise 41 according to the invention illustrated in FIG. 65, the merchandise includes a satellite positioning signal receiver, for example, a Global Positioning System (GPS) satellite receiver 14A, as is known in the art. The item of merchandise 41 may further include a display 14B, and one or more input devices 14C (e.g., a keypad) for accepting user inputs, as will also be appreciated by those skilled in the art. Input device(s) 14C may also include keys, buttons or the like, or may be embodied by a touch screen, as is known in the art. The item of merchandise 41 may further include an orientation sensor 14D. The orientation sensor 14D may be a gyroscope, for example, and more particularly, may be a 3-axis gyroscope. The orientation sensor 14D may also be embodied by a digital compass, for example, as will be appreciated by those skilled in the art. In one embodiment, the item of merchandise 41 also includes an output device 14E. In some embodiments, the output device 14E is an audio output transducer, or speaker. The output device 14E may be another type of audio output device and other output devices may also be used, for example, a haptic output device or a visual output device, alone or in combination with an audio output device. In further embodiments, the item of merchandise 41 (e.g., portable electronic device) also includes an accelerometer 14F. The accelerometer 14F may be a multi-axis accelerometer, or alternatively, the item of merchandise 41 may include multiple directional accelerometers. The item of merchandise 41 may also include a battery 14G, which may comprise, for example, nickel-metal hydride or lithium ion battery cells. In some embodiments, the item of merchandise 41 may further include a proximity mechanism (e.g., a pressure or plunger switch) that is operable for detecting if the item of merchandise has been tampered with, such as when a battery cover has been removed. In some instances, the proximity mechanism may utilize near field communication (NFC) to sense removal of a component of the item of merchandise, and thus, the item of merchandise 41 may also include an NFC tag 14H configured for facilitating wireless communications between the item of merchandise and a removable component of the item of merchandise and/or a display fixture, display stand, alarm module, or the like. As such, a security signal may be generated upon removal of the component, or the consumer may be allowed a predetermined period of time to replace the removed component prior to generating a security signal.

Figure 66:
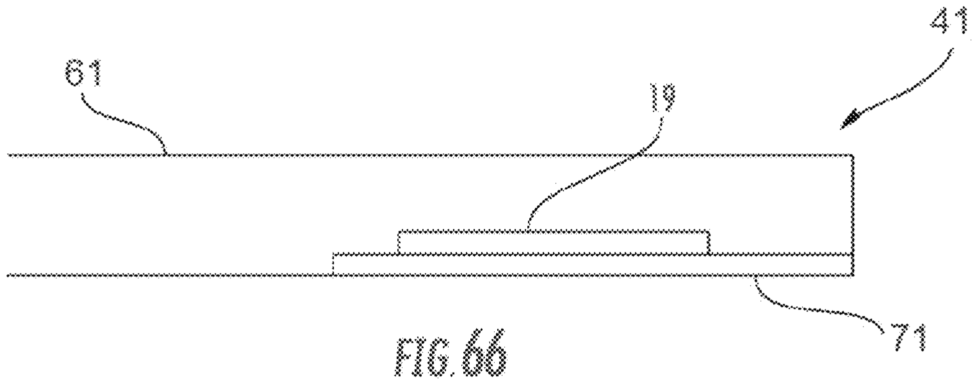
FIG. 66 is a schematic side view of an electronic item of merchandise according to one embodiment of the invention illustrating a removable battery cover and battery.

In one embodiment illustrated schematically in FIG. 66, the removal of the battery cover 71 may also remove another component 19 of the item of merchandise. For example, removal of the battery cover 71 may also remove a component 19, such as a battery, a SIM card, an SD card, or the like, of the of the item of merchandise 41. The battery cover 71 could be operably engaged with the other component 19, such as with a double-sided adhesive, such that upon removal of the battery cover 71, the component 19 is also removed. Where the component 19 is a battery (e.g., battery 14G), the monitoring device 43 may be configured to detect the loss in power of the item of merchandise 41 and to initiate a security signal. The item of merchandise 41 may also include a housing 61 for containing any desired component of the item of merchandise (see, e.g., FIG. 65), and the battery cover 71 may be removably secured to the housing. Therefore, unlike some conventional methods for making the battery and/or other removable components more difficult to remove, embodiments of the present invention facilitate easier removable of a removable component to detect a security event.

In one embodiment, the item of merchandise includes communications circuitry 141, and in particular, wireless communication circuitry. The item of merchandise 41 may also include a controller 14J operably coupled to the wireless communications circuitry 141, the accelerometer 14F, the orientation sensor 14D, and/or the output device 14B. The controller 14J may be configured to cooperate with the wireless communications circuitry 141 to coordinate and control operations of the item of merchandise 41, namely wireless communications functions and capabilities thereof. Operations may include mobile voice and data operations, including email and Internet data, for example. In additional embodiments, the item of merchandise 41 may include near field communication (NFC) functionality and be configured to communicate via the NFC tag 14H with a security key or other security device having NFC functionality to arm and/or disarm a security signal, or to lock and/or unlock the item of merchandise.

In some embodiments, the controller 14J is configured to cooperate with the orientation sensor 14D to determine a reference direction of the item of merchandise 41. For example, when the item of merchandise 41 is held by a potential purchaser in an operational position with the display 14B and input device(s) 14C facing the customer, the orientation sensor may cooperate with the controller 14J to determine the direction that the customer and the item of merchandise are facing, for example, North. The controller 14J may also cooperate with the accelerometer 14F to measure and monitor an acceleration of the item of merchandise.

Based upon the orientation and measured accelerations of the item of merchandise 41, as well as the elapsed time of any movements of the merchandise, the controller 14J may be configured to determine a distance from a given location, such as a designated retail display "home" position. The "home" position may, for example, be established by the item of merchandise 41 being in contact with, or in close proximity to, a display position, surface, stand, holder, platform, charging device, or the like. More particularly, the controller 14J may be programmed directly, for example, via the input device(s) 14C, or alternatively, may be programmed indirectly by an external system or device, so that the location of the display surface is the "home" position of the item of merchandise. The controller 14J may determine the distance the item of merchandise 41 is moved from the "home" position, when the item of merchandise is removed from the "home" position by a customer considering whether to purchase the merchandise.

It should be noted that the "home" position need not be the same location each time. Additionally, or alternatively, there may be more than one "home" position. For example a "home" position may be a display stand, a charging device or station (e.g., charging station 20), or any number of a plurality of "power hotspots," such as inductive power transfer charging stations. Alternatively, or additionally, the "home" position may be a location at which the item of merchandise 41 remains motionless for a period of time and the wireless communications circuitry 141 indicates a minimum threshold power signal. In other words, a "home" position may be established when the electronic item of merchandise 41 is motionless and charging for a predetermined period of time. Alternatively, or in conjunction with establishing one or more "home" positions, the controller 14J may use one or more motion sensors (e.g., accelerometer 14F, orientation sensor 14D, etc.) and motion processing algorithms to establish (i.e. map) a "safe" zone (also boundary, perimeter or area) with or without reference to one or more "home" positions. The controller 14J can then determine, based on subsequent motion processing, whether an item of merchandise 41 is moved from a location within the "safe" zone to a location outside or beyond the established "safe" zone.

In some embodiments, the controller 14J is configured to determine the distance traveled from the "home" position based upon inertial navigation system (INS) techniques, for example, dead reckoning, as will be appreciated by those skilled in the art. As such, no external references, for example, a GPS determined position or RF communication, are required to determine the distance traveled by the item of merchandise 41 from the "home" position. As a result, a security system configured for operation with an item of merchandise in accordance with this embodiment of the invention may be advantageous for use in an indoor environment, for example, a display area of a retail store, where a GPS position cannot always be determined and where RF communications can be obstructed. However, it is understood according to other embodiments disclosed herein that external references may be employed.

The item of merchandise 41 may further include a memory, for example, as a subcomponent of controller 14J, for storing computer-executable instructions and data for processing. The controller 14J may cooperate with the computer-executable instructions in the memory, for example, an algorithm embodied in a software application, to perform the functions described herein. As will be appreciated by those skilled in the art, the controller 14J may be embodied as a hardware component or as a combination of hardware and application software.

Figure 67:
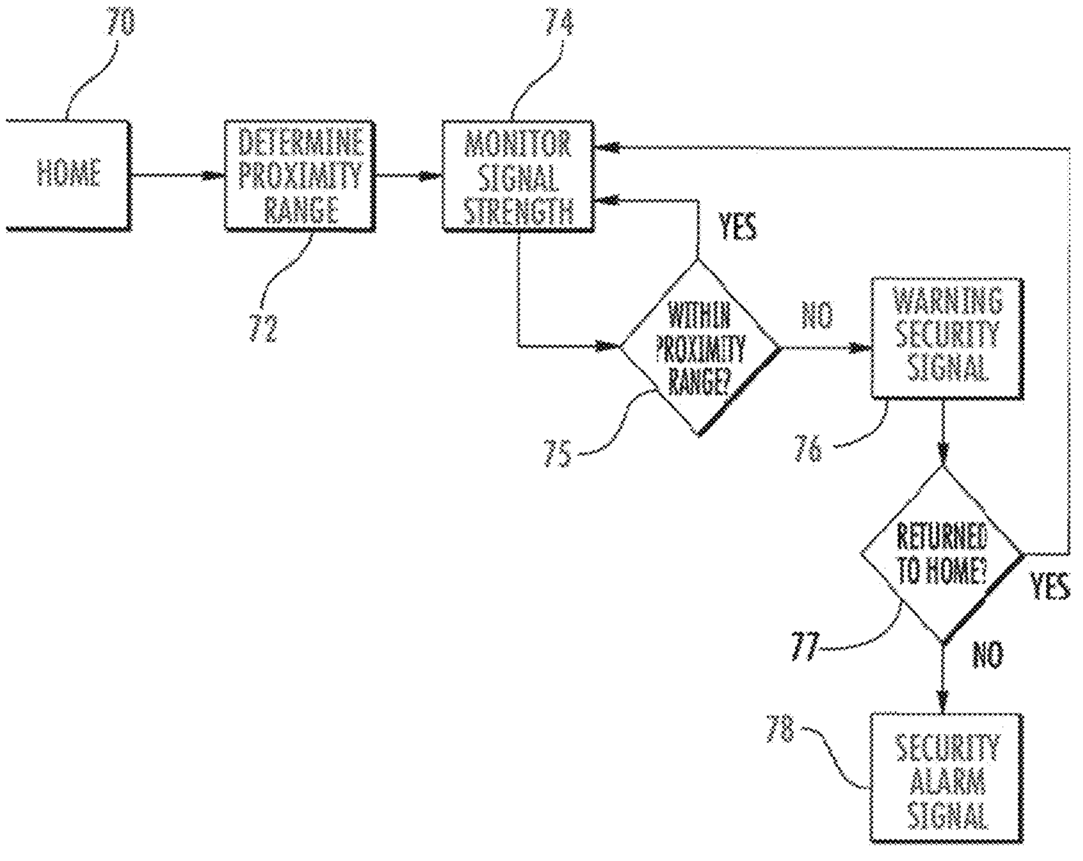
FIG. 67 is a flowchart of a method for securing an item of merchandise from theft in a retail display according to one embodiment of the invention.

As discussed above, the monitoring component 16, 58, 58' (e.g., monitoring device or display stand) and the corresponding sensor 52, 52, 52' may be configured to wirelessly communicate with one another. In some embodiments, the signal strength of communication between the monitoring component 16, 58, 58' and the corresponding sensor 52, 52, 52' may be used to provide security (e.g., via RSSI). One embodiment of a method utilizing signal strength is shown in FIG. 67. For example, a consumer may be permitted to examine an item of merchandise 41 within a predetermined distance from a "home" position indicated in FIG. 67 by reference character 70, such as the monitoring device 43, alarm module 18, charging device 20, display stand 58, or base 58' previously described. As noted above, the home position 70 may correspond to a position where there is no motion of the item of merchandise 41 and the sensor 52, 52, 52' for at least a predetermined time, and/or where an item of merchandise is being charged. Should the signal strength weaken or cease, a security signal may be generated. In some embodiments, the communication between the monitoring component 16, 58, 58' and the sensor 52, 52, 52' may be initiated when a consumer interacts with the item of merchandise 41. For example, communication may begin when a consumer picks up the item of merchandise 41. The monitoring component 16, 58, 58' may detect when the sensor 52, 52, 52' and the item of merchandise 41 begins moving and/or when charging ceases. Upon the item of merchandise 41 being picked up, the monitoring component 16, 58, 58' may be configured to detect this interaction and thereafter determine a proximity range, indicated in FIG. 67 by reference character 72, that is indicative of the strength of the communication signal between the sensor 52, 52, 52' and the monitoring component 16, 58, 58'. For instance, the determined proximity range 72 may be a range between the home position 70 and a maximum allowable position from the home position.

The determined proximity range 72 could be based on any number of factors, such as the environment, the position of the item of merchandise 41 or the consumer when the merchandise is initially picked up, the size of the consumer's hand, etc. For example, the monitoring component 16, 58, 58' may create a range that is defined by upper and lower bounds or set points that are used to determine whether the consumer, and thus, the item of merchandise 41, is within an acceptable proximity to the monitoring component. The proximity range 72 may be a range between an established home position 70 and a position that would initiate a security signal. The proximity range 72 may be determined dynamically, such that the home position 70 and a maximum position from the home position are determined dynamically and may be unique for each item of merchandise 41. The proximity range 72 may utilize the home position 70 and other data when a user initially picks up the item of merchandise 41 (e.g., within 1-2 seconds). This data could be used to determine the maximum value of the proximity range 72. For example, a user with larger hands may hinder the wireless communication more than a user with smaller hands, and thus the user with the larger hands may have a greater proximity range 72. Alternatively, the proximity range 72 need not be determined based on communications between the monitoring component 16, 58, 58' and the item of merchandise 41 and/or sensor 52, 52, 52'. For example, the maximum value of the proximity range 72 may be defined by the retailer and manually input to the security system, such as when the sensor 52, 52' is first positioned on the display stand 58, 58'. The retailer may establish a maximum value of the proximity range to 2 feet, 3 feet, 5 feet, or any desired distance from the home position that is within the field of communications. In some cases, the retailer is able to select a desired range from a plurality of ranges. Furthermore, the proximity range 72 may be based on various assumptions, such as an assumption that the item of merchandise 41 is near to the home position 70 at a particular time, or that the item of merchandise is moving, but is not indicative of a security event.

In another embodiment, a calibration routine may be used to initially set the proximity range or other predetermined range. In this example, the sensor 52, 52, 52' is configured to communicate with the monitoring component 16, 58, 58' to set a proximity range. In particular, a user may activate a security key, similar to that described above, to communicate with the monitoring component 16, 58, 58' to initiate the calibration routine (e.g., a predetermined number of key button presses). An audible and/or a visible signal may be emitted to indicate the calibration routine has been initiated. Following the security key activation, the user may be provided a predetermined period of time to set the proximity range (e.g., about 30 seconds to 1 minute). In this case, the user may move the sensor 52, 52, 52' to a desired distance from the monitoring component 16, 58, 58' and activate the security key to communicate with the sensor. Communication between the key and the sensor 52, 52, 52' sets a flag in a message to be transmitted to the monitoring component 16, 58, 58' indicating that the proximity range is to be determined. The monitoring component 16, 58, 58' receives the flagged message from the sensor 52, 52, 52' and calculates the distance. Thus, the monitoring component 16, 58, 58' and the sensor 52, 52, 52' may be configured to exchange data and/or messages containing various information. Following the predetermined period of time, the proximity range is set and any movement of the sensor 52, 52, 52' relative to the monitoring component 16, 58, 58' will be based on the proximity range set during the calibration routine. Thus, the calibration routine allows for added flexibility in setting the proximity range and provides the user with the ability to dynamically set the proximity range based on his or her own preferences. In some embodiments, the calibration routine may be similar to that disclosed in U.S. Pat. No. 10,223,881, entitled System and Method for Calibrating a Wireless Security Range, the contents of which are incorporated herein by reference.

In one embodiment, the proximity range 72 may be determined by the signal strength between the monitoring component 16, 58, 58' and the sensor 52, 52, 52', and the monitoring component may be configured to monitor the signal strength therebetween, as indicated in FIG. 67 by reference character 74. For instance, the monitoring component 16, 58, 58' may be configured to continuously monitor the signal strength or periodically monitor the signal strength at a predetermined frequency (e.g., 10-100 Hz). The monitoring component 16, 58, 58' may be configured to determine whether the item of merchandise 41 and the sensor 52, 52, 52' are within the determined proximity range 72, as indicated in FIG. 67 by reference character 75, and to initiate the generation of security signals by communicating with the alarm component 18, 58, 58' (e.g., alarm module or display stand) when the proximity range is exceeded. The alarm component 18, 58, 58' may in turn be configured to generate a security signal when the distance between the monitoring component 16, 58, 58' and the sensor 52, 52, 52' is not within the proximity range 72. For example, where the item of merchandise has moved beyond a predetermined allowed distance (as indicated by signal strength), the alarm component 18, 58, 58' may be configured to generate a first warning security signal, as indicated in FIG. 67 by reference character 76. The sensor 52, 52, 52' and/or the item of merchandise 41 could alternatively or additionally initiate or otherwise generate such a warning signal. The monitoring component 16, 58, 58' may be configured to then determine whether the item of merchandise 41 and the sensor 52, 52, 52' are moved to a position within the determined proximity range 72, such as the home position 70, as indicated in FIG. 67 by reference character 77. Should the item of merchandise 41 not be returned to the home position 70 or to a position within the determined proximity range 72, the alarm component 18, 58, 58' may generate a full security alarm signal, as indicated in FIG. 67 by reference character 78. Additionally or alternatively, the item of merchandise 41 and/or sensor 52, 52, 52' may be configured to initiate or otherwise generate a full security alarm signal. Should a valid key (e.g., a valid NFC key) be presented to the alarm component 18, 58, 58' or to the item of merchandise 41 and/or sensor 52, 52, 52', the security alarm signal may be silenced.

In some embodiments, the monitoring component 16, 58, 58' and the sensor 52, 52, 52' are not required to be paired to one another. For example, the sensor 52, 52, 52' may be configured to transmit identifying information when the item of merchandise 41 and sensor are separated from the monitoring component 16, 58, 58', and the consumer interacts with the item of merchandise. The identifying information may be the same or similar information typically transmitted by a Bluetooth enabled device. The sensor 52, 52, 52' may be configured to transmit the identifying information to the monitoring component 16, 58, 58' at a predetermined frequency that is significantly higher than conventional Bluetooth enabled devices. For example, the transmission frequency may be about 20 Hz. In some cases, the monitoring component 16, 58, 58' may be pre-programmed with the identification of the sensor 52, 52, 52' and/or the item of merchandise 41 so that the monitoring component may then detect the RSSI of the desired sensor and/or item of merchandise. In addition, the monitoring component 16, 58, 58' may be configured to filter specific RSSI values or otherwise smooth the received values into meaningful data. In this regard, a filtering algorithm may be employed for smoothing the data.

Figure 68:
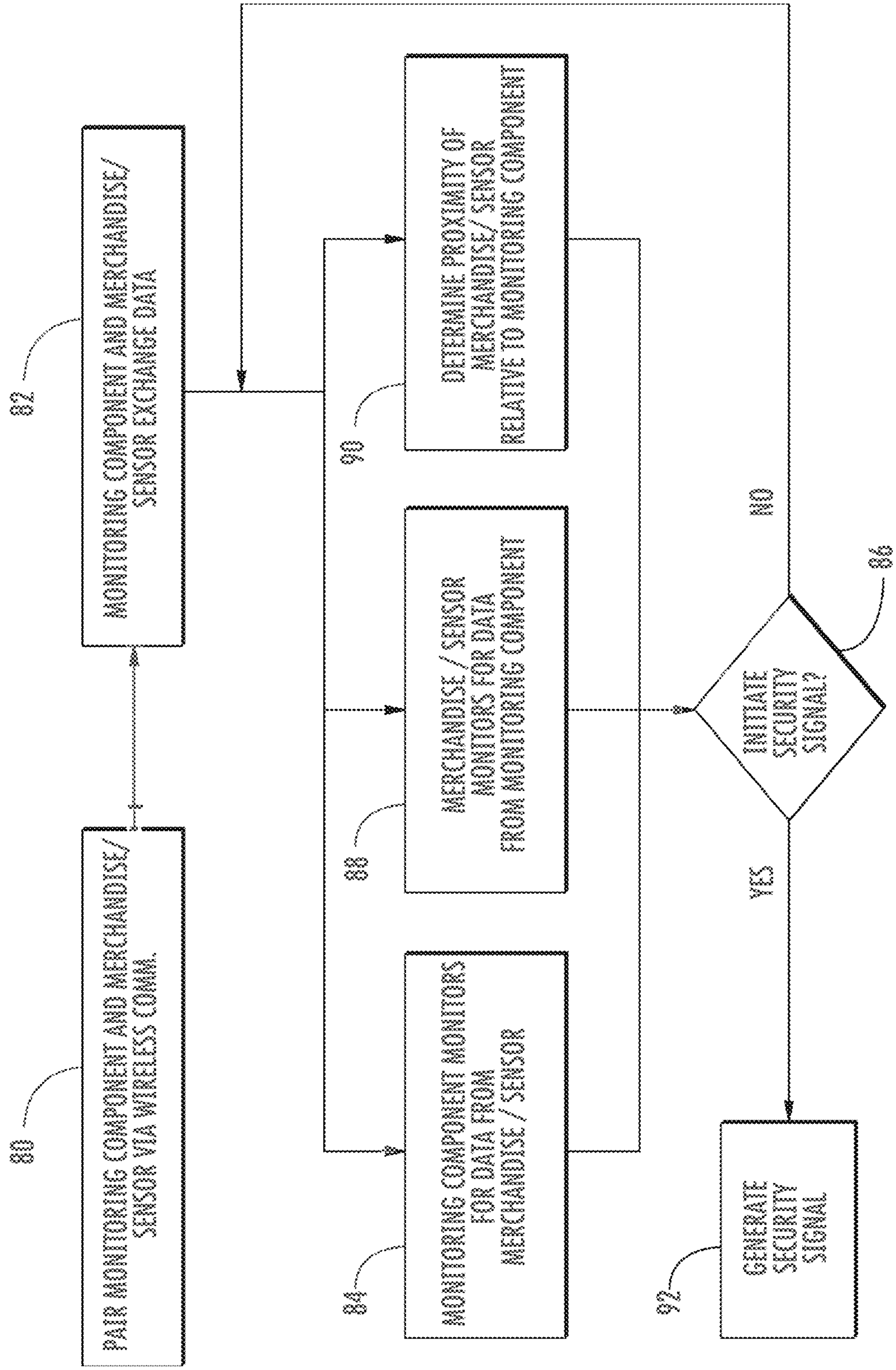
FIG. 68 is a flowchart of a method for securing an item of merchandise from theft in a retail display according to one embodiment of the invention.

In another embodiment of a method according to the invention illustrated in FIG. 68, the monitoring component 16, 58, 58' (i.e., watchtower or "WT") and the item of merchandise 41 (e.g., a cellular phone) and/or sensor 52, 52, 52' are paired (e.g., via Bluetooth communication) and remain in wireless communication with one another, as indicated in FIG. 68 by reference character 80. The monitoring component 16, 58, 58' and the item of merchandise 41 and/or sensor 52, 52, 52' may be configured to exchange data or "heartbeat" ("HB") messages, as indicated in FIG. 68 by reference character 82, at a predetermined frequency or in predetermined increments of time. For example, the data may include, for example, a message indicating that a security signal be generated. The HB messages may include any desired information, such as the identification of the monitoring component 16, 58, 58' or item of merchandise 41, the state of the monitoring component or the item of merchandise (e.g., armed, security breach, alarming, etc.), or a previous signal strength value. The monitoring component 16, 58, 58' (i.e., WT) may be configured to monitor for data transmitted from the sensor 52, 52, 52' and/or the item of merchandise 41 (i.e., cellular phone), as indicated in FIG. 68 by reference character 84, and to determine whether to initiate a security signal, as indicated in FIG. 68 by reference character 86. Likewise, the sensor 52, 52, 52' and/or the item of merchandise 41 may be configured to monitor for data transmitted from the monitoring component 16, 58, 58', as indicated in FIG. 68 by reference character 88. The monitoring component 16, 58, 58', the sensor 52, 52, 52', and/or the item of merchandise 41 may be configured to monitor for data in predetermined increments of time (e.g., 150 msec). In addition, the proximity of the item of merchandise 41 may be determined relative to the monitoring component 16, 58, 58' based on signal strength between the monitoring component and the sensor 52, 52, 52' and/or the item of merchandise 41, as indicated in FIG. 68 by reference character 90. The signal strength may be used to determine the proximity therebetween and be used in conjunction with the exchange of data to secure the item of merchandise 41 from theft. In this example, the monitoring component 16, 58, 58' may be configured to monitor the signal strength with the item of merchandise 41 based on RSSI. However, the monitoring component 16, 58, 58' may alternatively be configured to monitor the signal strength with the item of merchandise 41 based on ultra-wideband "time-of-flight." Depending on the message delivered and/or the signal strength, the monitoring component 16, 58, 58' or the sensor 52, 52, 52' and/or the item of merchandise 41 can initiate or otherwise generate a security signal, as indicated in FIG. 68 by reference character 92. For example, the monitoring component 16, 58, 58' may communicate with the alarm component 18, 58, 58' to generate a security signal (e.g., using a piezoelectric alarm or LED). Similarly, the item of merchandise 41 may be configured to act on the message delivered by the monitoring component 16, 58, 58' and/or the signal strength therebetween, such as by generating a warning security signal, an alarming security signal, or a thank you signal. In addition, the sensor 52, 52, 52' may include an output device (e.g., a piezoelectric alarm), such as those discussed above in conjunction with the alarm component 18, 58, 58' or item of merchandise 41, for generating a security signal, such as in response to removal of the sensor from the item of merchandise 41. In some embodiments, the sensor 52, 52, 52' may initiate a security signal when a security event is detected by the sensor and/or monitoring component 16, 58, 58' and may communicate with an output device for generating the security signal.

In one embodiment, the item of merchandise 41, sensor 52, 52, 52', and/or the monitoring component 16, 58, 58' are configured to be paired with one another. In one example, the sensor 52, 52, 52' and the monitoring component 16, 58, 58' may be paired and configured to communicate with one another (e.g., via Bluetooth communication). The sensor 52, 52, 52' may be configured to communicate with the item of merchandise 41 using the connection between the sensor and the item of merchandise (e.g., a USB connection). Thus, two-way communication between the sensor 52, 52, 52' and the item of merchandise 41 may occur. In this embodiment, the monitoring component 16, 58, 58' may be configured to be paired with any desired item of merchandise 41, such that pre-programming of the identification of the item of merchandise into the monitoring component is not required. In one example, once the sensor 52, 52, 52' is coupled to the item of merchandise 41, the monitoring component 16, 58, 58' may automatically be paired with the sensor in order to exchange data therebetween. In this embodiment, the monitoring component 16, 58, 58' is configured to filter out other data being transmitted by surrounding sensors 12, 52, 52' and items of merchandise 41 in order to be paired with the desired sensor. Thus, where the monitoring component 16, 58, 58' is capable of detecting a plurality of sensors, the monitoring component is able to filter out all other sensors except for the sensor 52, 52, 52' desired to be monitored. In one embodiment, the sensor 52, 52, 52' may be configured to control certain features of the item of merchandise 41, such as, for example, flashing LEDs, generating audible signals, etc. In a further embodiment, the monitoring component 16, 58, 58' may be configured to be simultaneously paired with the sensor 52, 52, 52' and the item of merchandise 41. As such, the monitoring component 16, 58, 58' may be configured to communicate directly with the item of merchandise 41 and the sensor 52, 52, 52'. For example, the monitoring component 16, 58, 58' could exchange data directly with the item of merchandise 41, such as via text and/or audio messages.

Using any one or combination of the aforementioned techniques, the monitoring component 16, 58, 58' may be configured to determine whether the proximity of the item of merchandise 41 relative to the monitoring component has exceeded at least one threshold value based upon the distance traveled by the item of merchandise from the home position 70. For example, the monitoring component 16, 58, 58' may determine whether the item of merchandise 41 has been moved more than a predetermined distance in any radial direction from the home position 70 based on the signal strength and/or data being communicated between the monitoring component and the item of merchandise and/or the sensor 52, 52, 52'. Of course, the threshold proximity may be set to any desired value, or alternatively, to another variable, such as distance, time, acceleration, orientation, etc. In particular, the threshold variable may be set to any desired value of any suitable variable via programming using the input device(s) 14C, or wirelessly via the wireless communications circuitry 141 (see, e.g., FIG. 65). Alternatively, the memory of the controller 14J of the item of merchandise 41 may be pre-programmed with one or more predetermined threshold variables and/or values.

Regardless, when the threshold proximity has been exceeded, the monitoring component 16, 58, 58' may be configured to communicate with the alarm component 18, 58, 58' to generate a security signal, such as a visual, an audible, and/or a haptic alarm. For example, the security signal may be an audible voice message requesting that the item of merchandise 41 be returned to the home position 70 within a specified period of time. The voice message may be customizable in that it may be set to be a male or female voice, and/or may be set to speak in a predetermined language or to speak in one or more of multiple languages. The monitoring component 16, 58, 58' alternatively or additionally may activate other output devices 14E, for example, a haptic (e.g. vibration) device or a visual (e.g. flashing LED) device. The monitoring component 16, 58, 58' may also be configured to communicate with the sensor 52, 52, 52' and/or the item of merchandise 41 to cause the sensor and/or the item of merchandise to initiate or otherwise generate a security signal.

In some embodiments, there may be more than one threshold, for example a first threshold and a second threshold. When the monitoring component 16, 58, 58' determines a first threshold proximity has been exceeded, the monitoring device may initiate an initial "warning" via the sensor 52, 52, 52' and/or the item of merchandise (see, e.g., 76 in FIG. 67). The warning may be a voice, as noted above, and may indicate for example that unless the item of merchandise 41 is returned to the home position 70 or is brought back within the first threshold proximity, an alarm will be activated. If the item of merchandise 41 is not timely returned to the home position or to a location within the first threshold proximity, and instead, the second threshold proximity is exceeded, the monitoring component 16, 58, 58' may initiate a subsequent alarm, such as an audible siren, via the alarm module, the sensor, and/or the item of merchandise (see, e.g., 78 in FIG. 67). The subsequent alarm could be greater in volume and/or frequency than the initial alarm (see, e.g., 76 in FIG. 67). Moreover, the item of merchandise 41 may be configured to generate various security signals as discussed above, such as, for example, a warning message to the consumer that the item of merchandise is secure, a thank-you message to the consumer when a security condition is rectified, an alarming signal, etc. In addition, security signals may be generated in conjunction with any of the aforementioned techniques along with actions that occur in predetermined time increments. For example, the consumer may be allowed a predetermined time period following a warning signal to correct the issue, or a warning signal may be generated when an item of merchandise 41 remains from the home position 70 for longer than a predetermined period of time. Furthermore, visible signals may be generated in response to various conditions, such as a flashing visible signal at the alarm component 18, 58, 58'.

Still further, the monitoring component 16, 58, 58' may cooperate with the sensor 52, 52, 52' and/or the item of merchandise 41 to wirelessly transmit instructions to activate another output device 14E, such as a store alarm remote from the item of merchandise and the display area. As will be appreciated by those skilled in the art, the monitoring component 16, 58, 58' may likewise communicate instructions to other security systems and/or devices to perform additional operations. In one example, the monitoring component 16, 58, 58' may instruct adjacent monitoring components in communication with other sensors 12, 52, 52' and/or items of merchandise 41 to enter a "lockdown mode" so that the other items of merchandise cannot be removed and stolen. Lockdown may be achieved by mechanical, magnetic, electrical, electromechanical or electromagnetic locks, as will be understood by those skilled in the art.

The monitoring component 16, 58, 58' may be configured to deactivate a security signal upon the item of merchandise 41 being returned within the first or second threshold proximity, for example. Alternatively or additionally, the monitoring component 16, 58, 58' may disable the security signal based upon an input from an input device 14C, for example, a security code entered into the item of merchandise 41, or presenting a key to the alarm component 18, 58, 58', sensor 52, 52, 52', and/or the item of merchandise. The monitoring component 16, 58, 58' may also deactivate the security signal wirelessly via the wireless communications circuitry, or via a key, such as a mechanical, magnetic, electrical, optical or infrared key fob device. Of course, the monitoring component 16, 58, 58' may perform additional and/or other communications functions upon an alarm condition, as will be appreciated by those skilled in the art including, for example, disabling one or more functions, capabilities, or operations of the item of merchandise.

Figure 69:
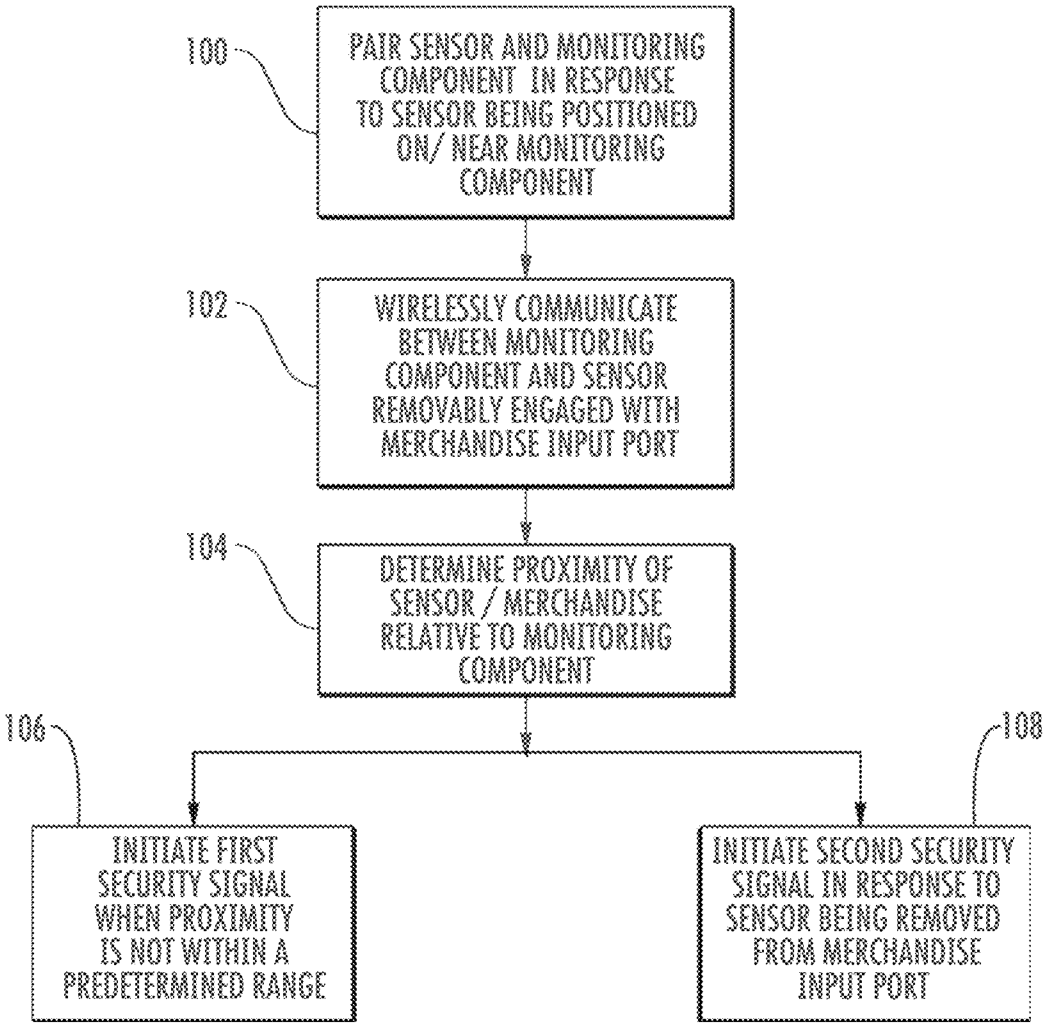
FIG. 69 is a flowchart of another method for securing an item of merchandise from theft in a retail display according to one embodiment of the invention.

In another embodiment of a method according to the invention illustrated in FIG. 69, the sensor 52, 52, 52' and the monitoring component 16, 58, 58' (e.g., monitoring device, display stand, or watchtower or "WT") are paired together in response to the sensor being positioned on or near the monitoring component 16, 58, 58', as indicated in FIG. 69 by reference character 100. The monitoring component 16, 58, 58' and the sensor 52, 52, 52' wirelessly communicate between one another (e.g., via Bluetooth communication) with the sensor being removably engaged with an input port provided on the item of merchandise 41, as indicated in FIG. 69 by reference character 102. The monitoring component 16, 58, 58' continuously determines the proximity of the sensor 52, 52, 52' and the item of merchandise 41 relative to a home position 70, such as the monitoring component, in any manner previously described, as indicated in FIG. 69 by reference character 104. The monitoring component 16, 58, 58' may communicate with the alarm component 18, 58, 58' to initiate or otherwise generate a first security signal when the proximity between the monitoring component and the sensor 52, 52, 52' is not within a predetermined range, as indicated in FIG. 69 by reference character 106. Additionally, or alternatively, the monitoring component 16, 58, 58' may communicate with the alarm component 18, 58, 58' to initiate or otherwise generate a second security signal in response to the sensor 52, 52, 52' being removed from the input port provided on the item of merchandise 41, as indicated in FIG. 69 by reference character 108.

In another embodiment, the sensor and monitoring component may be configured to communicate using a magnetic field. For example, each of the sensor and the monitoring component may have a magnetic emitter and/or magnetic receiver for generating and receiving a magnetic field. In some cases, each of the sensor and the monitoring component includes a magnetic emitter and receiver. Such emitter and receiver may be separate components or could be combined into a single package. The magnetic emitter and receiver of the sensor may be housed within the sensor and receive its power from a power source in the sensor. Similar to the embodiments discussed herein, the monitoring component and the sensor may be configured to communicate with one another to determine proximity, but in this case using the respective magnetic emitter and/or magnetic receiver to determine the proximity of the item of merchandise relative to the monitoring component. Such proximity may be used to determine if the item of merchandise is either within or outside of a predetermined range or threshold. The proximity could be based on the distance between the sensor and the monitoring component or alternatively between the sensor and some initial home position of the item of merchandise. One particular advantage of using magnetic transmitters and receivers is that interference, false alarms, and incorrect measurements are less of a concern, particularly interference caused by a consumer placing his or her body between the sensor and the monitoring component (sometimes referred to as "body blocking"). Other potential advantages include smaller sensor size due to lower power requirements and no regulations relating to radio frequencies.

Additional variables could be used to determine proximity, or could be in addition to determining a variable such as distance between the sensor and monitoring component, such as a volume or X, Y, and Z coordinates between the sensor and the monitoring component. The X, Y, and Z coordinates could be used, for example, to determine whether an irregular shape is detected that is indicative the sensor being in an unauthorized location. In other examples, a security signal could be generated in response to a loss in communication between the magnetic transmitter and receiver of a respective sensor and monitoring component. In some embodiments, the magnetic receiver of the sensor and/or the monitoring component is a three-axis magnetic receiver, the transmitter is a three-axis magnetic transmitter. In one example, the magnetic receiver is configured to measure a natural earth magnetic field, and the sensor and/or the monitoring component is configured to generate a security signal in response to a change in the magnetic field.

In one example, the magnetic transmitter and/or receiver includes one or more coils for generating or receiving a magnetic field. One example of such a coil is a 3D transponder coil. In one embodiment, the magnetic transmitter may have a single coil while the magnetic receiver may have a plurality of coils (e.g., 3 coils) to ensure better reception of the magnetic field as the orientation of the magnetic receiver changes, which may occur when receiving the magnetic field at the sensor as the sensor is manipulated or moved by a consumer.

In some embodiments, the magnetic field is generated using magnetic pulses transmitted by the magnetic transmitter. The frequency of the magnetic pulses may be changed to adjust the strength of the magnetic field. In some instances, the magnetic field generated by the magnetic transmitters may be modulated with a frequency. In other instances, the magnetic field is adjustable, such as varying the power of the magnetic transmitter. In some cases, the sensor and/or monitoring component may be configured to request to change the strength of the magnetic field. For example, if the magnetic receiver in the sensor is receiving a weak signal, the sensor may be configured to request that the monitoring component increase its power for generating a stronger magnetic field. It is understood that the magnetic emitters and/or receivers may cooperate with various types of sensors, some of which were discussed previously, such as gyroscopes, accelerometers, and/or radios, to aid in determining the proximity between the sensor and the monitoring component.

According to some embodiments, the sensor and monitoring component may be paired to one another for facilitating communication between respective magnetic transmitters and receivers. The concept of pairing between the sensor and monitoring component have been discussed in earlier embodiments. In this embodiment, each sensor may be paired to each monitoring component using an ID code or other unique identifier wherein the ID code or identifier could be communicated using the magnetic field (e.g., magnetic pulses may communicate a particular ID code). In some cases, a plurality of sensors may be paired to a single monitoring component. Similarly, a single sensor may be paired to a plurality of monitoring components, or a plurality of sensors may be paired to a plurality of monitoring components. The sensors and monitoring components may communicate using encoded signals. Encoded signals may be used, for instance, to reduce cross talk and to ensure assigned sensors are communicating with assigned monitoring components. Such encoded signals could be communicated by pulsing the magnetic field at unique frequencies or by periodically changing the frequency.

In one embodiment, the magnetic transmitters and receivers are configured to also exchange data between the sensor and the monitoring components. It is understood that various types of data may be transmitted, such as a model, type, or identifier (e.g., serial number) of the item of merchandise, data regarding system health of the sensor and/or item of merchandise, data regarding the security status of the sensor and/or item of merchandise, data regarding consumer interaction (e.g., lifts, duration of interaction, etc.), and/or audit data relating to customer or employee interaction with the sensor and/or item of merchandise. Such data may be transmitted using different magnetic fields than used to determine proximity, however, in some cases the same magnetic fields could be used to transmit data and determine proximity.

In some embodiments, a plurality of sensors and/or monitoring components may be used. Any number of sensors may be configured to function with any number of monitoring components. For example, a subset of sensors may be configured to function with a subset of monitoring components. In some cases, a sensor may be configured to transition from communication from one monitoring component to additional monitoring components without a security signal being generated. The transition between monitoring components could occur, for example, in response to a change in the frequency of communication between the sensor and the monitoring components. In some cases, the sensor may be paired to each of the monitoring components that it is authorized to communicate with.

In some embodiments, the sensor, monitoring component, and/or the alarm component are similar to that disclosed in U.S. Pat. No. 9,437,088, entitled Systems and Methods for Protecting Retail Display Merchandise From Theft, the contents of which are incorporated by reference herein. It is understood that some embodiments are generally directed to "inclusion" areas or zones whereby the sensor is limited to use within the inclusion zone before a security signal is generated. It is also understood that embodiments of the present invention may alternatively used in conjunction with "exclusion" areas or zones whereby the sensor is limited to use outside of an exclusion zone and a security signal may be generated if the sensor approaches or enters the exclusion zone. One example of embodiments where exclusion zones are employed is disclosed in U.S. Publication No. 2018/0182216, entitled Wireless Merchandise Security System, the contents of which are incorporated herein by reference.

It should be noted that the operations executed by the sensor 52, 52, 52', the monitoring component 16, 58, 58', the alarm component 18, 58, 58', and/or the item of merchandise 41 for any of the embodiments disclosed herein may be provided by a computer-readable medium, memory, or other storage medium. Many modifications and other embodiments of the invention will be readily apparent to one skilled in the art having the benefit of the teachings presented in the foregoing descriptions and the associated drawings. Therefore, it is understood and appreciated that the invention is not to be limited to the specific embodiments disclosed herein, and that modifications to the disclosed embodiments and other undisclosed embodiments are intended to be included within the scope of the appended claims.

The foregoing has described several embodiments of systems, devices, computer storage mediums, and methods. Although embodiments of the present invention have been shown and described, it will be apparent to those skilled in the art that various modifications thereto can be made without departing from the spirit and scope of the invention. Accordingly, the foregoing description is provided for the purpose of illustration only, and not for the purpose of limitation.

That which is claimed is:

1. A security system comprising:

a plurality of security devices arranged in a wireless network within a retail store, the plurality of security devices arranged in a planogram and each configured to protect one or more items from theft, each of the plurality of security devices configured to wirelessly communicate data with a remote computing device;

a plurality of electronic keys arranged in the wireless network and configured to wirelessly communicate data with the plurality of security devices and the remote computing device, each of the plurality of electronic keys configured to operate the plurality of security devices;

a hub configured to receive the data from the plurality of security devices and electronic keys via a first private, wireless communication protocol, wherein the hub is configured to communicate the data to the remote computing device via a second wireless communication protocol different than the first private, wireless communication protocol; and at least one alarm mode configured to wirelessly communicate with each of the plurality of security devices using a third wireless communication protocol different than the first and second wireless communication protocols.

2. The security system of claim 1, wherein the hub is configured to communicate with the remote computing device via a cloud network.

3. The security system of claim 1, wherein the data further comprises an identifier of the items.

4. The security system of claim 1, wherein the items are items of merchandise located in a retail store.

5. The security system of claim 1, wherein the data further comprises a system health of the items, the electronic keys, and/or the security devices.

6. The security system of claim 1, wherein the plurality of security devices are locks and/or alarming security displays.

7. The security system of claim 1, wherein the plurality of security devices comprise different types.

8. The security system of claim 1, wherein the data of each of the plurality of security devices is a serial number.

9. The security system of claim 1, wherein the hub is configured to communicate data to the remote computing device comprising a date and time of activation of each electronic key, a user of each electronic key, a serial number of each electronic key, a number of activations of each electronic key, and/or events resulting from activation of each electronic key.

10. The security system of claim 1, wherein at least one of the plurality of electronic keys is configured to be authorized for locking, unlocking, arming, and/or disarming one or more different security devices than at least one other electronic key.

11. The security system of claim 1, wherein each of the plurality of electronic keys is configured to receive a command from the remote computing device for controlling the electronic key.

12. The security system of claim 1, wherein each of the plurality of electronic keys comprises a serial number.

13. The security system of claim 12, wherein the hub is configured to communicate the serial numbers to the remote computing device.

14. The security system of claim 12, wherein one of the plurality of electronic keys is configured to communicate with one of the plurality of security devices for locking, unlocking, arming, and/or disarming the security device based on the serial number.

15. The security system of claim 1, wherein each of the plurality of security devices is configured to receive a command from the remote computing device for controlling the security device.

16. The security system of claim 1, wherein the hub is configured to automatically or in real time communicate the data to the remote computing device.

17. The security system of claim 1, wherein the remote computing device is a tablet or a computer.

18. The security system of claim 1, wherein the third wireless communication protocol is a direct node-to-node communication scheme between the plurality of security devices and the alarm node that does not have to also communicate with the hub.

19. The security system of claim 1, wherein the at least one alarm node is configured to wirelessly communicate with the hub using the first, private wireless communication protocol.

20. The security system of claim 1, further comprising a plurality of alarm nodes, one of the alarm nodes configured to be associated with the plurality of security devices such that the one alarm node is configured to alarm only when receiving a signal from any one of the plurality of security devices.

21. The security system of claim 1, wherein the at least one alarm node is configured to generate an alarm signal upon receipt of a signal from any one of the plurality of security devices.

22. The security system of claim 1, wherein the first private, wireless communication protocol is a sub-Ghz wireless communication protocol, and wherein the second communication protocol is configured to occur over a cloud-based network.

23. A method for protecting items from theft, the method comprising:

a plurality of security devices wirelessly communicating in a wireless network within a retail store, the plurality of security devices arranged in a planogram and each configured to protect one or more items from theft;

a plurality of electronic keys wirelessly communicating in the network;

each of the plurality of security devices and electronic keys wirelessly communicating data;

a hub wirelessly receiving the data via a first private, wireless communication protocol;

the hub wirelessly communicating the data to a remote computing device via a second wireless communication protocol different than the first private, wireless communication protocol; and at least one alarm node wirelessly communicating with each of the plurality of security devices using a third wireless communication protocol different than the first and second wireless communication protocols.

24. The security system of claim 1, wherein the first private, wireless communication protocol is not a public network.

25. The security system of claim 1, wherein the first private, wireless communication protocol is for the exclusive use of the plurality of security devices deployed in the retail store.

26. The security system of claim 1, wherein the first private, wireless communication protocol is separate from any other private or public network operated by the retail store.

27. The security system of claim 1, wherein the first private, wireless communication protocol is a LoRa communication protocol.

28. The security system of claim 1, wherein each of the plurality of electronic keys is configured to communicate with each of the plurality of security devices using a third wireless communication protocol different than the first and second communication protocols to determine whether the electronic key is authorized to operate the security device.

29. The security system of claim 28, wherein the third wireless communication protocol is NFC.

30. The security system of claim 28, wherein the third wireless communication protocol is infrared wireless communication.

31. A security system comprising:

a plurality of security devices arranged in a wireless network within a retail store, each of the plurality of security devices configured to protect one or more items from theft;

a plurality of electronic keys arranged in the wireless network and configured to communicate data to a remote computing device, each of the plurality of electronic keys configured to communicate with each of the plurality of security devices using a first wireless communication protocol to determine whether the electronic key is authorized to operate the security device;

a hub configured to receive the data from the plurality of electronic keys via a second private, wireless communication protocol, wherein the hub is configured to communicate the data to a remote computing device via a third wireless communication protocol; and at least one alarm node configured to wirelessly communicate with each of the plurality of security devices using a fourth wireless communication protocol different than the first, second, and third wireless communication protocols, wherein the first, second, and third wireless communication protocols are different than one another, and wherein the second private, wireless communication protocol is not a public network and is separate from any other private or public network operated by the retail store.

32. The security system of claim 31, wherein the at least one alarm node is configured to generate an alarm signal upon receipt of a signal from any one of the plurality of security devices.

* * * * *